(12) United States Patent
Dai et al.

(10) Patent No.: US 12,197,039 B2
(45) Date of Patent: Jan. 14, 2025

(54) CAMERA LENS GROUP

(71) Applicant: ZHEJIANG SUNNY OPTICAL, CO., LTD, Zhejiang (CN)

(72) Inventors: Fujian Dai, Zhejiang (CN); Kaiyuan Zhang, Zhejiang (CN); Yi Zhang, Zhejiang (CN); Liefeng Zhao, Zhejiang (CN)

(73) Assignee: ZHEJIANG SUNNY OPTICAL, CO., LTD, Zhejiang (CN)

( * ) Notice: Subject to any disclaimer, the term of this patent is extended or adjusted under 35 U.S.C. 154(b) by 9 days.

(21) Appl. No.: 17/043,706

(22) PCT Filed: Oct. 30, 2019

(86) PCT No.: PCT/CN2019/114315
§ 371 (c)(1),
(2) Date: Sep. 30, 2020

(87) PCT Pub. No.: WO2020/199573
PCT Pub. Date: Oct. 8, 2020

(65) Prior Publication Data
US 2022/0050268 A1 Feb. 17, 2022

(30) Foreign Application Priority Data
Apr. 2, 2019 (CN) .......................... 201910260438.6

(51) Int. Cl.
*G02B 9/64* (2006.01)
*G02B 13/00* (2006.01)

(52) U.S. Cl.
CPC ........... *G02B 9/64* (2013.01); *G02B 13/0045* (2013.01)

(58) Field of Classification Search
CPC ............................. G02B 9/64; G02B 13/0045
See application file for complete search history.

(56) References Cited

U.S. PATENT DOCUMENTS

2017/0192200 A1* 7/2017 Hsieh ....................... G02B 9/64
2019/0204557 A1* 7/2019 Jhang ..................... G02B 1/041

FOREIGN PATENT DOCUMENTS

| CN | 106443987 A | 2/2017 |
|---|---|---|
| CN | 206757167 U | 12/2017 |
| CN | 107608059 A | 1/2018 |
| CN | 107703609 A | 2/2018 |
| CN | 107741630 A | 2/2018 |

(Continued)

OTHER PUBLICATIONS

Chinese priority application first search report issued on Oct. 18, 2023.

*Primary Examiner* — Alicia M Harrington
(74) *Attorney, Agent, or Firm* — Samson G. Yu

(57) ABSTRACT

The disclosure discloses a camera lens group, which sequentially includes, from an object side to an image side along an optical axis, a first lens, second lens, third lens, fourth lens, fifth lens, sixth lens, seventh lens and eighth lens with focal power, wherein the first lens, the fourth lens, the sixth lens and the seventh lens have positive focal power; the eighth lens has negative focal power; a total effective focal length f of the camera lens group and a maximum Semi-Field of View (Semi-FOV) of the camera lens group meet fxtan (Semi-FOV)>6.0 mm; and the total effective focal length f of the camera lens group and an effective focal length f7 of the seventh lens meet 0.44/f7<1.2.

19 Claims, 30 Drawing Sheets

(56) References Cited

FOREIGN PATENT DOCUMENTS

| | | |
|---|---|---|
| CN | 108121053 A | 6/2018 |
| CN | 108445610 A | 8/2018 |
| CN | 109343203 A | 2/2019 |
| CN | 109343205 A | 2/2019 |
| CN | 109358413 A | 2/2019 |
| CN | 109490995 A | 3/2019 |
| CN | 109521550 A | 3/2019 |
| CN | 109870788 A | 6/2019 |
| JP | 2005208258 A | 8/2005 |

* cited by examiner

CAMERA LENS GROUP

CROSS-REFERENCE TO RELATED APPLICATIONS

The present application claims priority to Chinese Patent Application No. 201910260438.6, filed to the National Intellectual Property Administration, PRC (CNIPA) on Apr. 2, 2019, the disclosure of which is hereby incorporated by reference in its entirety.

TECHNICAL FIELD

The disclosure relates to a camera lens group, and more particularly to a camera lens group including eight lenses.

BACKGROUND

Along with the popularization of electronic products such as mobile phones and tablets, requirements of users on the portability and light and thin designs of electronic products have increased. Meanwhile, along with the development of sciences and technologies, semiconductor process technologies have been continuously improved, and high-quality imaging lens has gradually become a dominant trend on the market.

For achieving higher imaging quality, market requirements on performance such as a super-large image surface, super thinness and a large aperture are usually met by increasing the number of lenses. Camera lens with multiple lenses (for example, eight lenses) becomes a mainstream product in the high-end market.

SUMMARY

Some embodiments of the disclosure provides a camera lens group applied to a portable electronic product and capable of at least overcoming or partially overcoming at least one shortcoming in a related art.

One embodiment of the disclosure provides a camera lens group, which sequentially includes, from an object side to an image side along an optical axis, a first lens, second lens, third lens, fourth lens, fifth lens, sixth lens, seventh lens and eighth lens with focal power, wherein the first lens, the fourth lens, the sixth lens and the seventh lens may have positive focal power, and the eighth lens may have negative focal power.

In an implementation mode, both an image-side surface of the sixth lens and an object-side surface of the seventh lens are convex surfaces.

In an implementation mode, a total effective focal length f of the camera lens group and an effective focal length f1 of the first lens may meet $0.8<f/f1<1.2$.

In an implementation mode, ImgH is a half of a diagonal length of an effective pixel region on an imaging surface of the camera lens group, TTL is a Total Track Length from an object-side surface of the first lens to the imaging surface of the camera lens group on the optical axis, and ImgH and TTL meet $TTL/ImgH<1.6$. Furthermore, ImgH is the half of the diagonal length of the effective pixel region on the imaging surface of the camera lens group, TTL is the Total Track Length from the object-side surface of the first lens to the imaging surface of the camera lens group on the optical axis, and ImgH and TTL meet $TTL/ImgH<1.4$.

In an implementation mode, the total effective focal length f of the camera lens group and a maximum Semi-Field of View (Semi-FOV) of the camera lens group may meet $f \times \tan(\text{Semi-FOV})>6.0$ mm.

In an implementation mode, the total effective focal length f of the camera lens group and an effective focal length U of the seventh lens may meet $0.4<f/f7<1.2$.

In an implementation mode, an effective focal length f2 of the second lens and an effective focal length f5 of the fifth lens may meet $0.5<f2/f5<1.2$.

In an implementation mode, an effective focal length f3 of the third lens and an effective focal length f4 of the fourth lens may meet $0.3<f/f3+f/f4<0.7$.

In an implementation mode, an effective focal length f6 of the sixth lens and an effective focal length f8 of the eighth lens may meet $-0.8<f6/f8<-3.0$.

In an implementation mode, the total effective focal length f of the camera lens group, an air space T67 of the sixth lens and the seventh lens on the optical axis and an air space T78 of the seventh lens and the eighth lens on the optical axis may meet $2.5<f/(T67+T78)<6$.

In an implementation mode, the total effective focal length f of the camera lens group and an air space T56 of the fifth lens and the sixth lens on the optical axis may meet $11<f/T56<18$.

In an implementation mode, a minimum thickness ET7 min of the seventh lens in a direction parallel to the optical axis and a center thickness CT7 of the seventh lens on the optical axis may meet $0.5<ET7\ min/CT7<1.0$.

In an implementation mode, a curvature radius R5 of an object-side surface of the third lens and a curvature radius R6 of an image-side surface of the third lens may meet $0.45<R5/R6<1.2$.

In an implementation mode, a curvature radius R3 of an object-side surface of the second lens and a curvature radius R4 of an image-side surface of the second lens may meet $0<(R3-R4)/(R3+R4)<0.25$.

In an implementation mode, the total effective focal length f of the camera lens group, a curvature radius R12 of the image-side surface of the sixth lens and a curvature radius R13 of the object-side surface of the seventh lens may meet $0.5<f/|R12|+f/R13<2.0$.

In an Implementation mode, the total effective focal length f of the camera lens group and a curvature radius R15 of an object-side surface of the eighth lens may meet $-3.5<f/R15<-1.5$.

In an implementation mode, the TTL from the object-side surface of the first lens to the imaging surface of the camera lens group on the optical axis and an Entrance Pupil Diameter (EPD) of the camera lens group may meet $2.1<TTL/EPD<2.5$.

In an implementation mode, the total effective focal length f of the camera lens group, a center thickness CT3 of the third lens on the optical axis, a center thickness CT4 of the fourth lens on the optical axis and a center thickness CT5 of the fifth lens on the optical axis may meet $5<f/(CT3+CT4+CT5)<9$.

According to the disclosure, the eight lenses are adopted, and the focal power of each lens, a surface type, a center thickness of each lens, on-axis spaces between the lenses and the like are reasonably configured to achieve at least one beneficial effect of super-large image surface, super thinness, large aperture, high imaging quality and the like of the camera lens group.

BRIEF DESCRIPTION OF THE DRAWINGS

Detailed descriptions are made to unrestrictive implementation modes below in combination with the drawings to make the other characteristics, purposes and advantages of the disclosure more apparent. In the drawings.

DETAILED DESCRIPTION OF THE EMBODIMENTS

Figure 1:
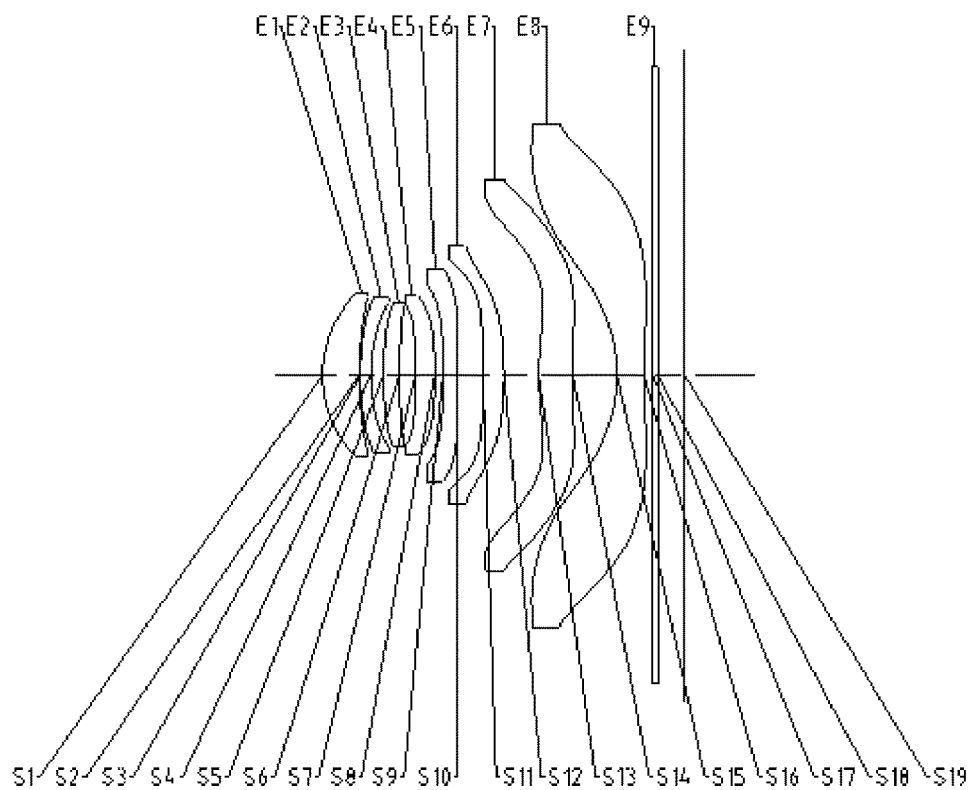
FIG. 1 shows a structure diagram of a camera lens group according to embodiment 1 of the disclosure.

For understanding the present disclosure better, more detailed descriptions will be made to each aspect of the present disclosure with reference to the drawings. It is to be understood that these detailed descriptions are only descriptions about the exemplary implementation modes of the present disclosure and not intended to limit the scope of the present disclosure in any manner. In the whole specification, the same reference sign numbers represent the same components. Expression "and/or" includes any or all combinations of one or more in associated items that are listed.

It should be noted that, in this description, the expressions of first, second, third, etc. are only used to distinguish one feature from another feature, and do not represent any limitation to the feature. Thus, a first lens discussed below could also be referred to as a second lens or a third lens without departing from the teachings of the present disclosure.

In the drawings, the thickness, size and shape of the lens have been slightly exaggerated for ease Illustration. In particular, a spherical shape or an aspherical shape shown in the drawings is shown by some embodiments. That is, the spherical shape or the aspherical shape is not limited to the spherical shape or the aspherical shape shown in the drawings. The drawings are by way of example only and not strictly to scale.

Herein, a paraxial region refers to a region nearby an optical axis. If a lens surface is a convex surface and a position of the convex surface is not defined, it indicates that the lens surface is a convex surface at least in the paraxial region; and if the lens surface is a concave surface and a position of the concave surface is not defined, it Indicates that the lens surface is a concave surface at least in the paraxial region. A surface of each lens closest to an object-side is called an object-side surface of the lens, and a surface of each lens closest to an imaging surface is called an Image-side surface of the lens.

It also should be understood that terms "include", "including", "have", "contain" and/or "containing", used in this description, represent existence of a stated feature, component and/or part but do not exclude existence or addition of one or more other features, components and parts and/or combinations thereof. In addition, expressions like "at least one in . . . " may appear after a list of listed features not to modify an individual component in the list but to modify the listed features. Moreover, when the implementation modes of the present disclosure are described, "may" is used to represent "one or more implementation modes of the present disclosure". Furthermore, term "exemplary" refers to an example or exemplary description.

Unless otherwise defined, all terms (including technical terms and scientific terms) used in the present disclosure have the same meanings usually understood by the general technical personnel in the field of the present disclosure. It also should be understood that the terms (for example, terms defined in a common dictionary) should be explained to have meanings consistent with the meanings in the context of correlation technique and can not be explained with ideal or excessively formal meanings, unless clearly defined like this in the present disclosure.

It should be noted that the embodiments in the present disclosure and features in the embodiments can be combined without conflicts. The present disclosure will be described below with reference to the drawings and in combination with the embodiments in detail.

The features, principles and other aspects of the present disclosure will be described below in detail.

A camera lens group according to an exemplary implementation mode of the disclosure may include, for example, eight lenses with focal power, i.e., a first lens, a second lens, a third lens, a fourth lens, a fifth lens, a sixth lens, a seventh lens and an eighth lens. The eight lenses are sequentially arranged from an object side to an image side along an optical axis. In the first lens to the eighth lens, there is an air space between any two adjacent lenses.

In an exemplary implementation mode, the first lens may have positive focal power; the second lens may have positive focal power or negative focal power; the third lens may have positive focal power or negative focal power; the fourth lens may have positive focal power; the fifth lens has positive focal power or negative focal power; the sixth lens may have positive focal power; the seventh lens may have positive focal power; and the eighth lens may have negative focal power. Proper focal power is selected, so that the camera lens group may correct a preliminary aberration relatively well, the camera lens group may be endowed with high imaging quality and relatively low sensitivity, and in addition, the camera lens group is easier to machine by injection molding and may be assembled with a relatively high yield.

In the exemplary Implementation mode, an object-side surface of the first lens may be a convex surface, and an image-side surface may be a concave surface.

In the exemplary implementation mode, an image-side surface of the fourth lens may be a convex surface.

In the exemplary implementation mode, an image-side surface of the sixth lens may be a convex surface.

In the exemplary implementation mode, an object-side surface of the seventh lens may be a convex surface.

In the exemplary implementation mode, the camera lens group of the disclosure may meet a conditional expression TTL/ImgH<1.6, where ImgH is a half of a diagonal length of an effective pixel region on an imaging surface of the camera lens group, and TTL is a distance from the object-side surface of the first lens to the imaging surface of the camera lens group on the optical axis. More specifically, TTL and ImgH may further meet 0.5<TTL/ImgH<1.6, for example, 1.07% TTL/ImgH≤1.56. Restricting a value of TTL/ImgH may achieve characteristics of super thinness and high resolution of the camera lens group. Furthermore, TTL and ImgH may meet TTL/ImgH<1.4, so that higher characteristics of super thinness and high resolution of the camera lens group are achieved.

In the exemplary implementation mode, the camera lens group of the disclosure may meet a conditional expression f×tan(Semi-FOV)>6.0 mm, where f is a total effective focal length of the camera lens group, and Semi-FOV is a maximum Semi-FOV of the camera lens group. More specifically, f and Semi-FOV may further meet 7.0 mm<f×tan (Semi-FOV)<9.0 mm, for example, 7.15 mm≤f×tan(Semi-FOV)≤8.01 mm. Meeting the conditional expression f×tan (Semi-FOV)>6.0 mm may meet the characteristics of super-large image surface and super thinness of the camera lens group may be achieved.

In the exemplary implementation mode, the camera lens group of the disclosure may meet a conditional expression 0.8</f1<1.2, where f is the total effective focal length of the camera lens group, and f1 is an effective focal length of the first lens. More specifically, f and f1 may further meet 0.88≤f/f1≤1.12. Restricting a range of a ratio of the focal length of the first lens to the total effective focal length of a system may ensure reasonable positive focal power of the first lens for balance with an aberration generated by a rear-end optical element with negative focal power to further achieve high imaging quality.

In the exemplary implementation mode, the camera lens group of the disclosure may meet a conditional expression 0.4<f/f7<1.2, where f is the total effective focal length of the camera lens group, and U is an effective focal length of the seventh lens. For example, f and f7 may meet 0.45<f/f7<1.08. Restricting a range of a ratio of a combined focal length of the seventh lens to the total effective focal length of the system may ensure reasonable positive focal power of the seventh lens for balance with an aberration generated by a front-end optical element with negative focal power to achieve the purposes of reducing the aberration and improving the imaging quality.

In the exemplary implementation mode, the camera lens group of the disclosure may meet a conditional expression 0.5<f2/f5<1.2, where f2 is an effective focal length of the second lens, and f5 is an effective focal length of the fifth lens. More specifically, f2 and 15 may further meet 0.57≤f2/f5≤1.14. Meeting the conditional expression 0.5<f2/f5<1.2 may reasonably restrict spherical aberration and coma aberration contributions of the second lens and the fifth lens and ensure that sensitivities of the two are at a reasonable level after balance. Optionally, the second lens may have negative focal power, and the fifth lens may have negative focal power.

In the exemplary Implementation mode, the camera lens group of the disclosure may meet a conditional expression 0<(R3−R4)/(R3+R4)<0.25, where R3 is a curvature radius of an object-side surface of the second lens, and R4 is a curvature radius of an image-side surface of the second lens. More specifically, R3 and R4 may further meet 0.18≤(R3−R4)/(R3+R4)≤0.23. Meeting the conditional expression 0<(R3−R4)/(R3+R4)<0.25 may control a coma aberration contribution of the second lens in a reasonable range to avoid obvious reduction of the image quality of an on-axis FOV and an off-axis FOV due to the coma aberration contribution. Optionally, the object-side surface of the second lens may be a convex surface, and the image-side surface may be a concave surface.

In the exemplary implementation mode, the camera lens group of the disclosure may meet a conditional expression 0.3<f/f3+f/f4<0.7, where f3 is an effective focal length of the third lens, and f4 is an effective focal length of the fourth lens. More specifically, f, f3 and f4 may further meet 0.36≤f/f3+f/f4≤0.66. Meeting the conditional expression 0.3<f/f3+f/f4<0.7 may reasonably contribute a negative third-order spherical aberration and a positive fifth-order spherical aberration to balance a positive third-order spherical aberration and negative fifth-order spherical aberration generated by the third lens and the fourth lens to make a spherical aberration of the camera lens group relatively low and ensure high imaging quality on the on-axis FOV.

In the exemplary implementation mode, the camera lens group of the disclosure may meet a conditional expression $-8.0<f6/f8<-3.0$, where f6 is an effective focal length of the sixth lens, and f8 is an effective focal length of the eighth lens. More specifically, f6 and f8 may further meet $-7.51 \leq f6/f85 \leq -3.11$. Reasonably restricting a ratio of the effective focal length of the sixth lens to the effective focal length of the eighth lens may reasonably control field curvature contributions of the sixth lens and the eighth lens to balance them at a reasonable level.

In the exemplary implementation mode, the camera lens group of the disclosure may meet a conditional expression $2.1<TTL/EPD<2.5$, where TTL is the distance from the object-side surface of the first lens to the imaging surface of the camera lens group on the optical axis, and EPD is an EPD of the camera lens group. More specifically, TTL and EPD may further meet $2.21 \leq TTL/EPD \leq 2.38$. Meeting the conditional expression $2.1<TTL/EPD<2.5$ may simultaneously achieve the characteristics of super thinness and large aperture of the camera lens group.

In the exemplary implementation mode, the camera lens group of the disclosure may meet a conditional expression $2.5<f/(T67+T78)<6$, wherein f is the total effective focal length of the camera lens group, T67 is an air space of the sixth lens and the seventh lens on the optical axis, and T78 is an air space of the seventh lens and the eighth lens on the optical axis. For example, f, T67 and T78 may meet $2.91 \leq f/(T67+T78) \leq 5.66$. Meeting the conditional expression $2.5<f/(T67+T78)<6$ may balance a field curvature generated by a front-end lens of the camera lens group and a field curvature generated by a rear-end lens, thereby making a field curvature of the camera lens group reasonable.

In the exemplary implementation mode, the camera lens group of the disclosure may meet a conditional expression $11<f/T56<18$, where f is the total effective focal length of the camera lens group, and T56 is an air space of the fifth lens and the sixth lens on the optical axis. For example, f and T56 may meet $11.14 \leq f/T56 \leq 16.64$. Restricting a ratio of f to T56 may effectively balance the field curvature of the camera lens group, thereby making the field curvature of the camera lens group reasonable.

In the exemplary implementation mode, the camera lens group of the disclosure may meet a conditional expression $5<f/(CT3+CT4+CT5)<9$, wherein f is the total effective focal length of the camera lens group, CT3 is a center thickness of the third lens on the optical axis, CT4 is a center thickness of the fourth lens on the optical axis, and CT5 is a center thickness of the fifth lens on the optical axis. For example, f, CT3, CT4 and CT5 may meet $5.37 \leq f/(CT3+CT4+CT5) \leq 8.25$. Meeting the conditional expression $5<f/(CT3+CT4+CT5)<9$ may effectively balance a spherical aberration of the system and ensure the manufacturability of the third lens, the fourth lens and the fifth lens to achieve high imaging quality of the on-axis system of the camera lens group.

In the exemplary implementation mode, the camera lens group of the disclosure may meet a conditional expression $0.5<ET7\ min/CT7<1.0$, where ET7 min is a minimum thickness of the seventh lens in a direction parallel to the optical axis, and CT7 is a center thickness of the seventh lens on the optical axis. For example, ET7 min and CT7 may meet $0.26 \leq ET7\ min/CT7 \leq 0.91$. Meeting the conditional expression $0.5<ET7\ min/CT7<1.0$ may ensure the structural feasibility of the seventh lens and ensure high manufacturability thereof.

In the exemplary implementation mode, the camera lens group of the disclosure may meet a conditional expression $0.45<R5/R6<1.2$, where R5 is a curvature radius of an object-side surface of the third lens, and R6 is a curvature radius of an image-side surface of the third lens. More specifically, R5 and R6 may further meet $0.48 \leq R5/R6 \leq 1.04$. Meeting the conditional expression $0.45<R5/R6<1.2$ may effectively restrict a shape of the third lens and further effectively control aberration contributions of the object-side surface and image-side surface of the third lens to effectively balance an aperture band related aberration of the system and further effectively improve the imaging quality of the system. Optionally, the object-side surface of the third lens may be a convex surface, and the image-side surface may be a concave surface.

In the exemplary implementation mode, the camera lens group of the disclosure may meet a conditional expression $0.5<f/|R12|+f/R13<2.0$, where f is the total effective focal length of the camera lens group, R12 is a curvature radius of the Image-side surface of the sixth lens, and R13 is a curvature radius of an object-side surface of the seventh lens. More specifically, f, R12 and R13 may further meet $0.80 \leq f/|R12|+f/R1351.95$. Meeting the conditional expression $0.54/|R12|+f/R13<2.0$ may control third-order astigmatism contributions thereof to a certain extent to control third-order astigmatism of the sixth lens and the seventh lens in reasonable ranges to achieve the effect of high micro resolving power.

In the exemplary implementation mode, the camera lens group of the disclosure may meet a conditional expression $-3.5<f/R15<-1.5$, where f is the total effective focal length of the camera lens group, and R15 is a curvature radius of an object-side surface of the eighth lens. For example, f and R15 may meet $-3.25 \leq f/R15 \leq -1.83$. Meeting the conditional expression $-3.5<f/R15<-1.5$ may control a field curvature contribution of the object-side surface of the eighth lens in a reasonable range, thereby balancing a field curvature generated by a next lens group. Optionally, the object-side surface of the eighth lens may be a concave surface.

In the exemplary implementation mode, the camera lens group may further include at least one diaphragm. The diaphragm may be arranged at a proper position as required, for example, arranged between the object side and the first lens. Optionally, the camera lens group may further include an optical filter configured to correct a chromatic aberration and/or protective glass configured to protect a photosensitive element on the imaging surface.

The camera lens group according to the implementation mode of the disclosure may adopt multiple lenses, for example, the abovementioned eight. Focal power of each lens, a surface type, a center thickness of each lens, on-axis spaces between the lenses and the like are reasonably configured to effectively reduce the size of an imaging lens, reduce the sensitivity of the imaging lens, improve the manufacturability of the imaging lens and ensure that the camera lens group is more favorable for production and machining and may be applied to a portable electronic product. The disclosure discloses a solution to eight lenses. The camera lens group has the characteristics of large image surface, super thinness, large aperture, high imaging quality and the like, and may be matched with a higher-resolution sensor and a stronger image processing technology.

In the implementation mode of the disclosure, at least one of mirror surfaces of each lens is an aspherical mirror surface, namely at least one of the object-side surface and image-side surface of each lens in the first lens, the second lens, the third lens, the fourth lens, the fifth lens, the sixth lens, the seventh lens and the eighth lens is an aspherical mirror surface. An aspherical lens has a characteristic that a curvature keeps changing from a center of the lens to a periphery of the lens. Unlike a spherical lens with a constant curvature from a center of the lens to a periphery of the lens, an aspherical lens has a better curvature radius characteristic and the advantages of improving distortions and improving astigmatic aberrations. With adoption of the aspherical lens, the astigmatic aberrations during imaging may be eliminated as much as possible, thereby improving the imaging quality. Optionally, both the object-side surface and image-side surface of each lens in the first lens, the second lens, the third lens, the fourth lens, the fifth lens, the sixth lens, the seventh lens and the eighth lens are aspherical mirror surfaces.

However, those skilled in the art should know that the number of the lenses forming the camera lens group may be changed without departing from the technical solutions claimed in the disclosure to achieve each result and advantage described in the specification. For example, although descriptions are made in the implementation mode with eight lenses as an example, the camera lens group is not limited to eight lenses. If necessary, the camera lens group may further include another number of lenses.

Specific embodiments applied to the camera lens group of the implementation mode will further be described below with reference to the drawings.

Embodiment 1

A camera lens group according to embodiment 1 of the disclosure will be described below with reference to FIG. 1 to FIG. 2D. FIG. 1 is a structure diagram of a camera lens group according to embodiment 1 of the disclosure.

convex surface, and an image-side surface S4 is a concave surface. The third lens E3 has positive focal power, an object-side surface S5 thereof is a convex surface, and an Image-side surface S6 is a concave surface. The fourth lens E4 has positive focal power, an object-side surface S7 thereof is a concave surface, and an image-side surface S8 is a convex surface. The fifth lens E5 has negative focal power, an object-side surface S9 thereof is a concave surface, and an image-side surface S10 is a concave surface. The sixth lens E6 has positive focal power, an object-side surface S11 thereof is a concave surface, and an image-side surface S12 is a convex surface. The seventh lens E7 has positive focal power, an object-side surface S13 thereof is a convex surface, and an image-side surface S14 is a concave surface. The eighth lens E8 has negative focal power, an object-side surface S15 thereof is a concave surface, and an Image-side surface S16 is a concave surface. The optical fitter E9 has an object-side surface S17 and an image-side surface S18. Light from an object sequentially penetrates through each of the surfaces S1 to S18 and is finally imaged on the imaging surface S19.

Although not shown, a diaphragm may be arranged between the object side and the first lens E1 to further improve the imaging quality of a camera lens.

Table 1 is a basic parameter table of the camera lens group of embodiment 1, and units of the curvature radius, the thickness and the focal length therein are all millimeter (mm).

TABLE 1

Embodiment 1: f = 7.32 mm, TTL = 8.50 mm

| Surface number | Surface type | Curvature radius | Thickness | Refractive index | Abbe number Abbe number | Focal length | Conic coefficient |
|---|---|---|---|---|---|---|---|
| OBJ | Spherical | Infinite | Infinite | | | | |
| STO | Spherical | Infinite | −0.7566 | | | | |
| S1 | Aspherical | 2.7583 | 0.8567 | 1.547 | 56.1 | 7.33 | 0.0000 |
| S2 | Aspherical | 7.8900 | 0.0305 | | | | 0.0000 |
| S3 | Aspherical | 6.5252 | 0.2500 | 1.680 | 20.4 | −19.35 | 0.0000 |
| S4 | Aspherical | 4.2936 | 0.2951 | | | | 0.0000 |
| S5 | Aspherical | 8.0350 | 0.3764 | 1.547 | 56.1 | 39.12 | 14.1644 |
| S6 | Aspherical | 12.6596 | 0.3754 | | | | −6.1271 |
| S7 | Aspherical | −27.7199 | 0.4551 | 1.571 | 37.3 | 34.62 | 0.0000 |
| S8 | Aspherical | −11.6102 | 0.1880 | | | | 0.0000 |
| S9 | Aspherical | −3921.3205 | 0.3473 | 1.680 | 20.4 | −25.92 | 0.0000 |
| S10 | Aspherical | 17.6923 | 0.5888 | | | | 0.0000 |
| S11 | Aspherical | −228.2634 | 0.4969 | 1.571 | 37.3 | 19.18 | 0.0000 |
| S12 | Aspherical | −10.4604 | 0.8257 | | | | 0.0000 |
| S13 | Aspherical | 6.9295 | 0.7838 | 1.547 | 56.1 | 15.74 | −0.5204 |
| S14 | Aspherical | 34.2481 | 1.0374 | | | | 0.0000 |
| S15 | Aspherical | −3.5457 | 0.6335 | 1.537 | 55.7 | −5.24 | −1.3398 |
| S16 | Aspherical | 14.5160 | 0.2095 | | | | 0.0000 |
| S17 | Spherical | Infinite | 0.1100 | 1.517 | 64.2 | | |
| S18 | Spherical | Infinite | 0.6400 | | | | |
| S19 | Spherical | Infinite | | | | | |

As shown in FIG. 1, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a Herein, f is a total effective focal length of the camera lens group, and TTL is a distance from the object-side surface S1 of the first lens E1 to the imaging surface S19 of the camera lens group on the optical axis.

In embodiment 1, both the object-side surface and image-side surface of any lens in the first lens E1 to the eighth lens E8 are aspherical surfaces, and a surface type x of each aspherical lens may be defined through, but not limited to, the following aspherical surface formula:

$$x = \frac{ch^2}{1+\sqrt{1-(k+1)c^2h^2}} + \sum A_i h^i, \qquad (1)$$

where x is a distance rise between a position of the aspherical surface at a height h in a direction parallel to the optical axis and an aspherical surface vertex; c is a paraxial curvature of the aspherical surface, c=1/R (namely, the paraxial curvature c is a reciprocal of the curvature radius R in Table 1); k is a conic coefficient; and Ai is an k-h-order correction coefficient of the aspherical surface. Table 2 shows high-order coefficients $A_4$, $A_6$, $A_8$, $A_{10}$, $A_{12}$, $A_{14}$, $A_{16}$, $A_{18}$ and $A_{20}$ applied to the aspherical mirror surfaces S1-S16 in embodiment 1.

Figure 3:
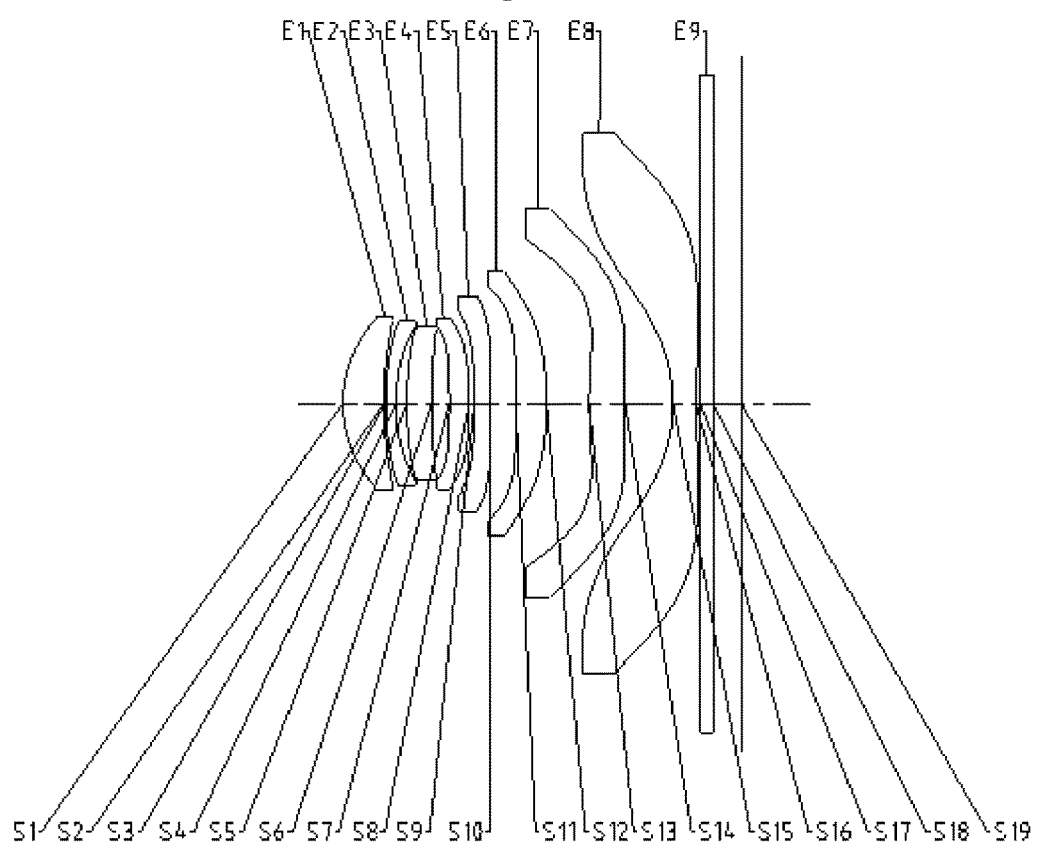
FIG. 3 shows a structure diagram of a camera lens group according to embodiment 2 of the disclosure.

As shown in FIG. 3, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a concave surface, and an image-side surface S8

TABLE 2

| Surface number | A4 | A6 | A8 | A10 | A12 | A14 | A16 | A18 | A20 |
|---|---|---|---|---|---|---|---|---|---|
| S1 | −2.9209E−04 | 1.5545E−03 | −1.0565E−03 | 3.2563E−04 | −4.1718E−05 | −2.0638E−06 | 5.6826E−07 | −5.5261E−08 | 0.0000E+00 |
| S2 | 6.4526E−03 | 1.2909E−02 | 8.3378E−03 | −2.3735E−03 | 2.8035E−04 | −7.9801E−06 | 0.0000E+00 | 0.0000E+00 | 0.0000E+00 |
| S3 | 7.3818E−03 | −1.1486E−02 | −6.4625E−03 | −4.6703E−04 | −5.2829E−04 | 1.4840E−04 | −1.0764E−05 | 0.0000E+00 | 0.0000E+00 |
| S4 | 6.3905E−03 | −1.9203E−03 | 4.1737E−04 | 1.5246E−03 | −9.3061E−04 | 2.3194E−04 | −2.3542E−05 | 0.0000E+00 | 0.0000E+00 |
| S5 | −4.1589E−03 | 2.2329E−03 | −6.5220E−03 | 8.5675E−03 | −6.5192E−03 | 3.2235E−03 | −9.7444E−04 | 1.6594E−04 | −1.2245E−05 |
| S6 | −7.0915E−04 | −2.1865E−03 | 5.1520E−04 | 1.3944E−03 | −2.1394E−03 | 1.5429E−03 | −5.6874E−04 | 1.0660E−04 | −7.5782E−06 |
| S7 | −3.5347E−03 | −8.7546E−03 | −1.4617E−03 | 7.5329E−03 | −9.0625E−03 | 5.5333E−03 | −1.9115E−03 | 3.5797E−04 | −2.8528E−05 |
| S8 | 8.0799E−03 | −4.3556E−02 | 6.0606E−02 | −5.9064E−02 | 3.7291E−02 | −1.5334E−02 | 3.9644E−03 | −5.8314E−04 | 3.7091E−05 |
| S9 | −1.1928E−02 | −2.4760E−02 | 3.2273E−02 | −2.3003E−02 | 1.0282E−02 | −2.9973E−03 | 5.6351E−04 | −6.2626E−05 | 3.1080E−06 |
| S10 | −1.7969E−02 | −5.4529E−03 | 7.0198E−03 | −3.3366E−03 | 8.6138E−04 | −1.2066E−04 | 7.4222E−06 | 4.8823E−08 | −1.9231E−08 |
| S11 | −3.5743E−03 | −3.4033E−03 | −8.9376E−04 | 1.5650E−03 | −7.7856E−04 | 2.0665E−04 | −3.1619E−05 | 2.6110E−06 | −8.9200E−08 |
| S12 | −7.1517E−03 | −2.8319E−03 | 5.7045E−04 | 2.1706E−04 | −1.3321E−04 | 2.9963E−05 | −3.4425E−06 | 2.0073E−07 | −4.7207E−09 |
| S13 | −6.9982E−03 | −3.2174E−03 | 3.9522E−04 | 2.1214E−05 | −9.1753E−06 | 9.4297E−07 | −4.7515E−08 | 1.2066E−09 | −1.2362E−11 |
| S14 | 7.2625E−03 | −4.6377E−03 | 5.7034E−04 | −1.3130E−05 | −3.7184E−06 | 4.3884E−07 | −2.2082E−08 | 5.4830E−10 | −5.4698E−12 |
| S15 | 6.5506E−04 | −1.5069E−03 | 3.1848E−04 | −2.7991E−05 | 1.3733E−06 | −4.0656E−08 | 7.2283E−10 | −7.0997E−12 | 2.9457E−14 |
| S16 | −6.2353E−03 | −1.4539E−04 | 1.0683E−04 | −1.3691E−05 | 8.9372E−07 | −3.3838E−08 | 7.4994E−10 | −8.9987E−12 | 4.4977E−14 |

Figure 2A:
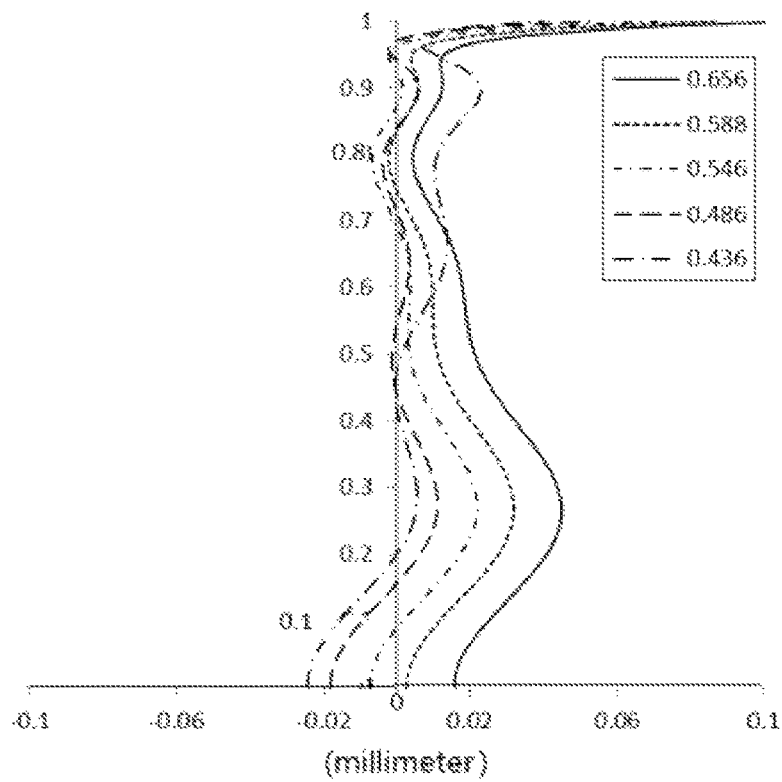
FIG. 2A to FIG. 2D show a longitudinal aberration curve, an astigmatism curve, a distortion curve and a lateral color curve of a camera lens group according to embodiment 1 respectively.
Figure 2B:
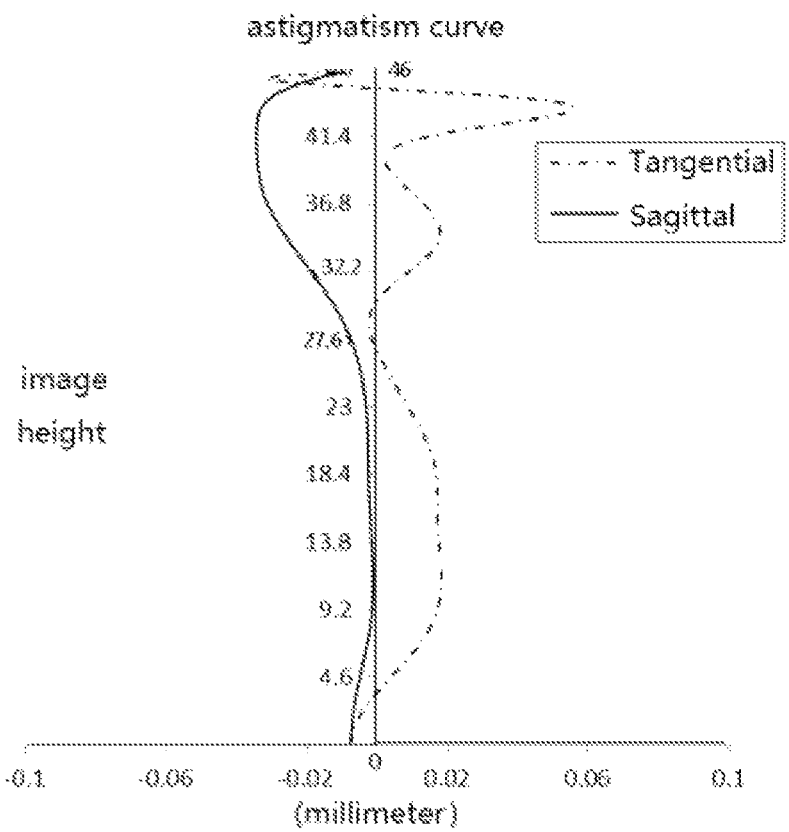
Figure 2C:
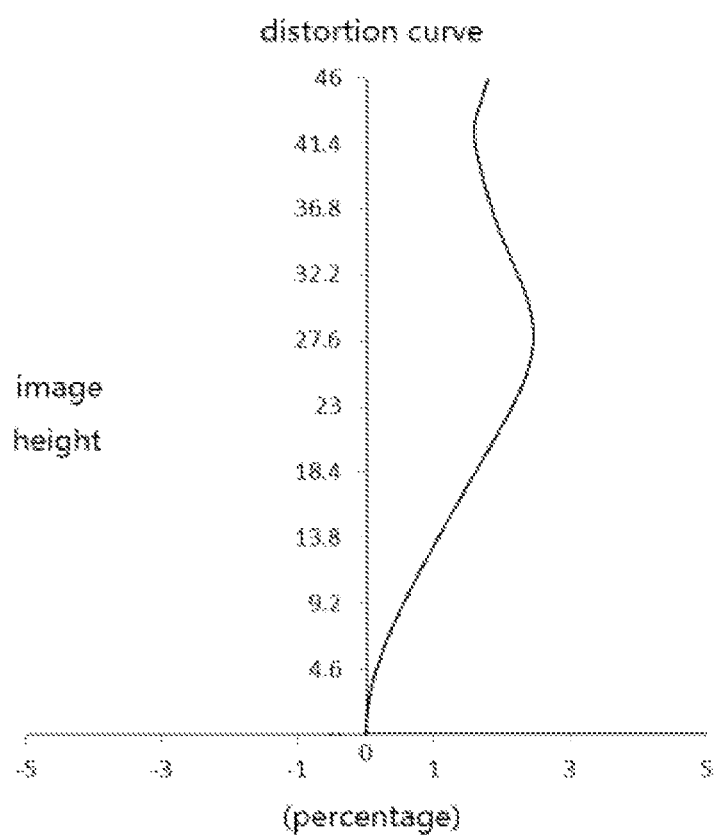
Figure 2D:
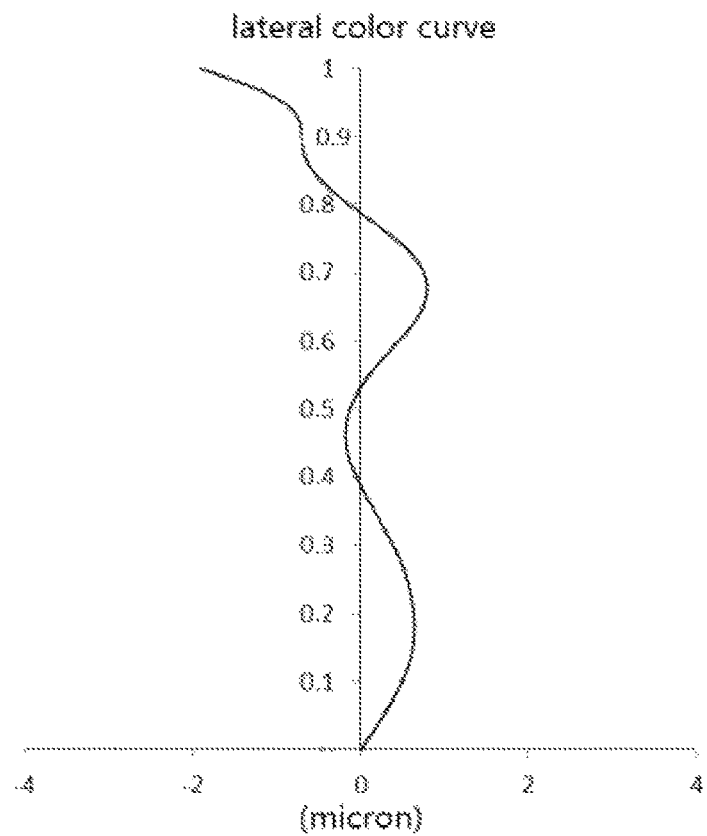

FIG. 2A illustrates a longitudinal aberration curve of the camera lens group according to embodiment 1 to represent deviation of a convergence focal point after light of different wavelengths passes through the lens. FIG. 2B illustrates an astigmatism curve of the camera lens group according to embodiment 1 to represent a meridian image surface curvature and a sagittal image surface curvature. FIG. 2C illustrates a distortion curve of the camera lens group according to embodiment 1 to represent a distortion value under different VOFs. FIG. 2D illustrates a lateral color curve of the camera lens group according to embodiment 1 to represent deviation of different image heights on the imaging surface after the light passes through the lens. According to FIG. 2A to FIG. 2D, it can be seen that high imaging quality of the camera lens group provided in embodiment 1 may be achieved.

Embodiment 2

A camera lens group according to embodiment 2 of the disclosure will be described below with reference to FIG. 3 to FIG. 4D. In the embodiment and the following embodiments, part of descriptions similar to those in embodiment 1 are omitted for simplicity. FIG. 3 is a structure diagram of a camera lens group according to embodiment 2 of the disclosure.

is a convex surface. The fifth lens E5 has negative focal power, an object-side surface S9 thereof is a concave surface, and an image-side surface S10 is a concave surface. The sixth lens E6 has positive focal power, an object-side surface S11 thereof is a concave surface, and an image-side surface S12 is a convex surface. The seventh lens E7 has positive focal power, an object-side surface S13 thereof is a convex surface, and an image-side surface S14 is a convex surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 3 is a basic parameter table of the camera lens group of embodiment 2, and units of the curvature radius, the thickness and the focal length therein are all millimeter (mm). Table 4 shows high-order coefficients applied to each aspherical mirror surface in embodiment 2. A surface type of each aspherical surface may be defined by formula (1) given in embodiment 1.

TABLE 3

Embodiment 2: f = 7.35 mm, TTL = 8.77 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7520 | | | | |
| S1 | Aspherical | 2.7753 | 0.9036 | 1.547 | 56.1 | 7.09 | 0.0000 |
| S2 | Aspherical | 8.6540 | 0.0380 | | | | 0.0000 |
| S3 | Aspherical | 6.7382 | 0.2300 | 1.680 | 20.4 | −17.27 | 0.0000 |
| S4 | Aspherical | 4.2213 | 0.2345 | | | | 0.0000 |
| S5 | Aspherical | 8.2685 | 0.5497 | 1.547 | 56.1 | 37.27 | 14.0180 |
| S6 | Aspherical | 13.5914 | 0.3909 | | | | −72.3659 |
| S7 | Aspherical | −24.543 | 0.4352 | 1.571 | 37.3 | 24.25 | 0.0000 |
| S8 | Aspherical | −8.9521 | 0.1142 | | | | 0.0000 |
| S9 | Aspherical | −39.1905 | 0.3494 | 1.680 | 20.4 | −17.19 | 0.0000 |
| S10 | Aspherical | 16.6998 | 0.5634 | | | | 0.0000 |
| S11 | Aspherical | −337.6916 | 0.6750 | 1.571 | 37.3 | 16.08 | 0.0000 |
| S12 | Aspherical | −8.9462 | 0.9297 | | | | 0.0000 |
| S13 | Aspherical | 10.2213 | 0.7921 | 1.547 | 56.1 | 16.36 | 3.7261 |
| S14 | Aspherical | −69.4344 | 1.0583 | | | | 0.0000 |
| S15 | Aspherical | −3.4917 | 0.5063 | 1.537 | 55.7 | −5.17 | −1.3794 |
| S16 | Aspherical | 14.2610 | 0.0884 | | | | 0.0000 |
| S17 | Spherical | Infinite | 0.2849 | 1.517 | 64.2 | | |
| S18 | Spherical | Infinite | 0.6264 | | | | |
| S19 | Spherical | Infinite | | | | | |

TABLE 4

| Surface number | A4 | A6 | A8 | A10 | A12 | A14 | A16 | A18 | A20 |
|---|---|---|---|---|---|---|---|---|---|
| S1 | −2.8361E−04 | 1.4873E−03 | −9.9606E−04 | 3.0250E−04 | −3.8188E−05 | −1.8616E−06 | 5.0507E−07 | −4.8397E−08 | 0.0000E+00 |
| S2 | 5.7650E−03 | −1.0901E−02 | 6.6554E−03 | 1.7908E−03 | 1.9994E−04 | −5.3793E−06 | 0.0000E+00 | 0.0000E+00 | 0.0000E+00 |
| S3 | 6.9132E−03 | −1.0410E−02 | 5.6681E−03 | −3.9641E−04 | −4.3394E−04 | 1.1796E−04 | −8.2800E−06 | 0.0000E+00 | 0.0000E+00 |
| S4 | 6.0226E−03 | −1.7569E−03 | 3.7069E−04 | 1.3145E−03 | −7.7895E−04 | 1.8847E−04 | −1.8571E−05 | 0.0000E+00 | 0.0000E+00 |
| S5 | −5.2268E−03 | 7.9929E−03 | −1.8458E−02 | 2.6327E−02 | −2.3215E−02 | 1.2859E−02 | −4.3216E−03 | 8.0753E−04 | −6.4330E−05 |
| S6 | 2.3133E−03 | −4.8825E−03 | 8.0271E−03 | −7.5572E−03 | 3.8848E−03 | −8.6642E−04 | −5.3647E−05 | 5.9380E−05 | −6.8562E−06 |
| S7 | −2.1273E−02 | 4.5148E−02 | −1.0378E−01 | 1.3386E−01 | −1.1090E−01 | 5.8783E−02 | −1.9236E−02 | 3.5118E−03 | −2.7136E−04 |
| S8 | −2.6978E−03 | −4.9141E−04 | −1.7435E−02 | 2.7227E−02 | −2.2845E−02 | 1.1610E−02 | −3.5826E03 | 6.1059E−04 | −4.3490E−05 |
| S9 | −1.2434E−02 | −2.5175E−02 | 4.2752E−02 | −4.1426E−02 | 2.5306E−02 | −9.5855E−03 | 2.1513E−03 | −2.6021E−04 | 1.3014E−05 |
| S10 | −2.2588E−03 | −44550E−04 | 5.3559E−03 | −4.7477E−03 | 2.3851E−03 | −7.2489E−04 | 1.2936E−04 | −1.2381E−05 | 4.8813E−07 |
| S11 | −1.2470E−03 | −1.4952E−02 | 1.3630E−02 | −7.2950E−03 | 2.3872E−03 | −4.9119E−04 | 6.1962E−05 | −4.3684E−06 | 1.3163E−07 |
| S12 | −1.7595E−03 | −1.0080E−02 | 5.7476E−03 | −1.6202E−03 | 2.3240E−04 | −1.2419E−05 | −6.8885E−07 | 1.1364E−07 | −3.8651E−09 |
| S13 | −2.3830E−03 | −5.0907E−03 | 4.6963E−04 | 1.5186E−04 | −4.5614E−05 | 5.2863E−06 | −3.1605E−07 | 9.6542E−09 | −1.1930E−10 |
| S14 | 1.0488E−03 | −6.0755E−03 | 7.2728E−04 | 1.3961E−05 | −1.2060E−05 | 1.2934E−06 | −6.5585E−08 | 1.6588E−09 | −1.6822E−11 |
| S15 | 8.5524E−04 | −1.5708E03 | 3.3439E−04 | −3.0180E−05 | 1.5418E−06 | −4.8213E−08 | 9.2001E−10 | −9.8804E−12 | 4.5886E−14 |
| S16 | −5.3024E−03 | −3.5196E−04 | 1.5650E−04 | −1.9793E−05 | 1.3076E−06 | −5.0118E−08 | 1.1198E−09 | −1.3514E−11 | 6.8018E−14 |

Figure 4A:
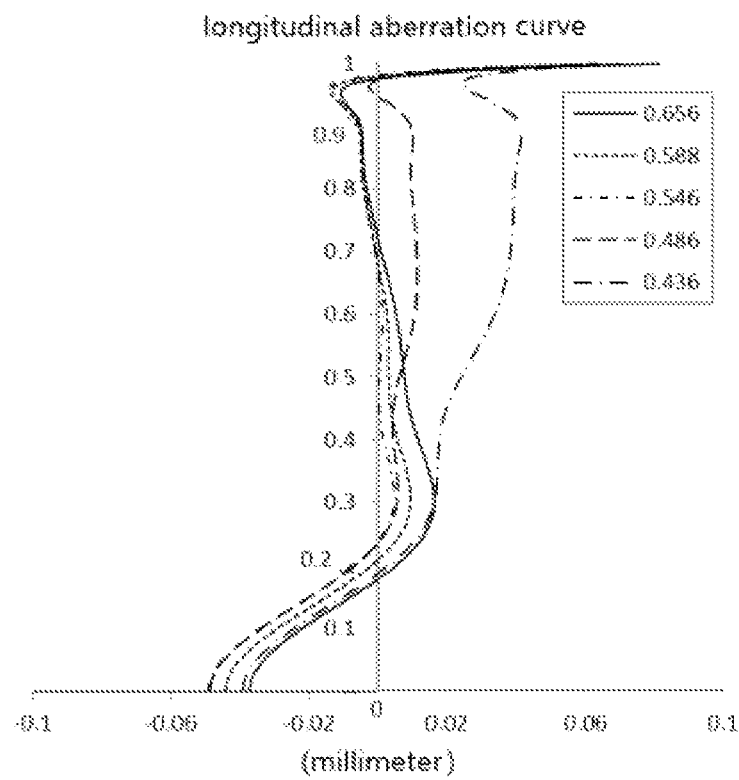
FIG. 4A to FIG. 4D show a longitudinal aberration curve, an astigmatism curve, a distortion curve and a lateral color curve of a camera lens group according to embodiment 2 respectively.
Figure 4B:
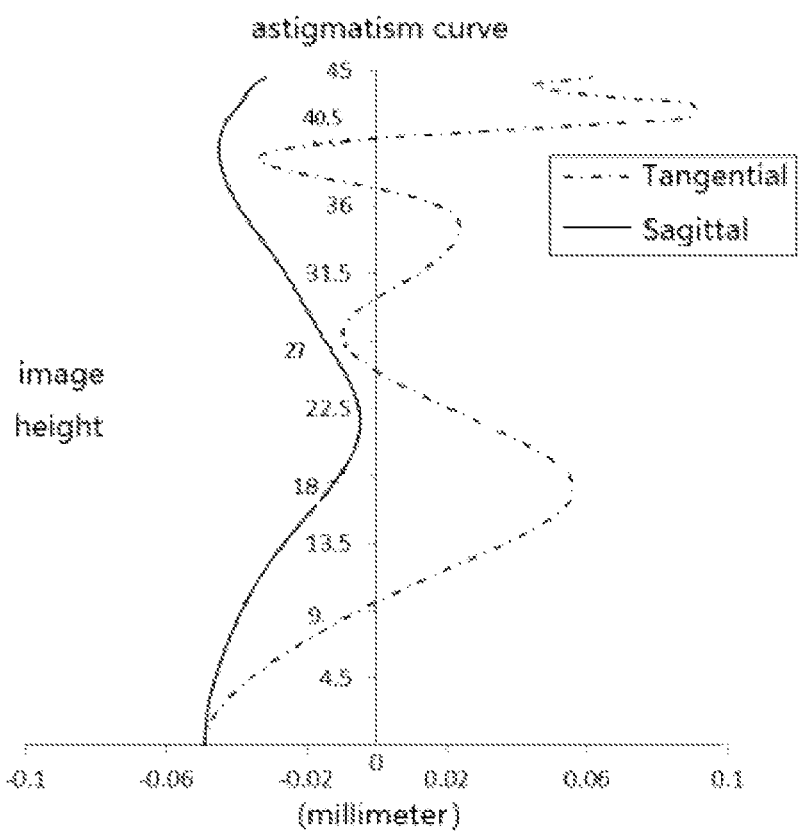
Figure 4C:
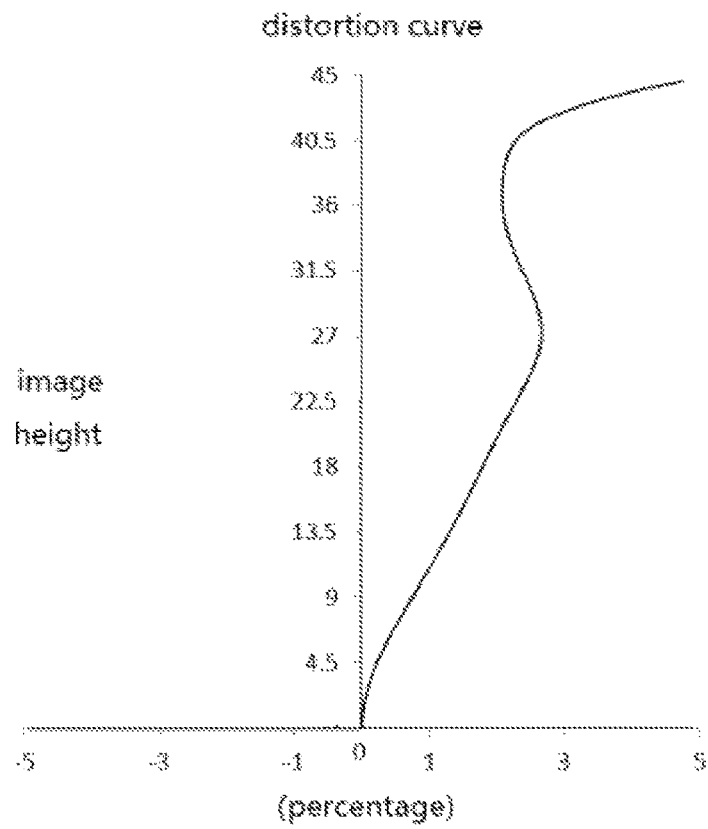
Figure 4D:
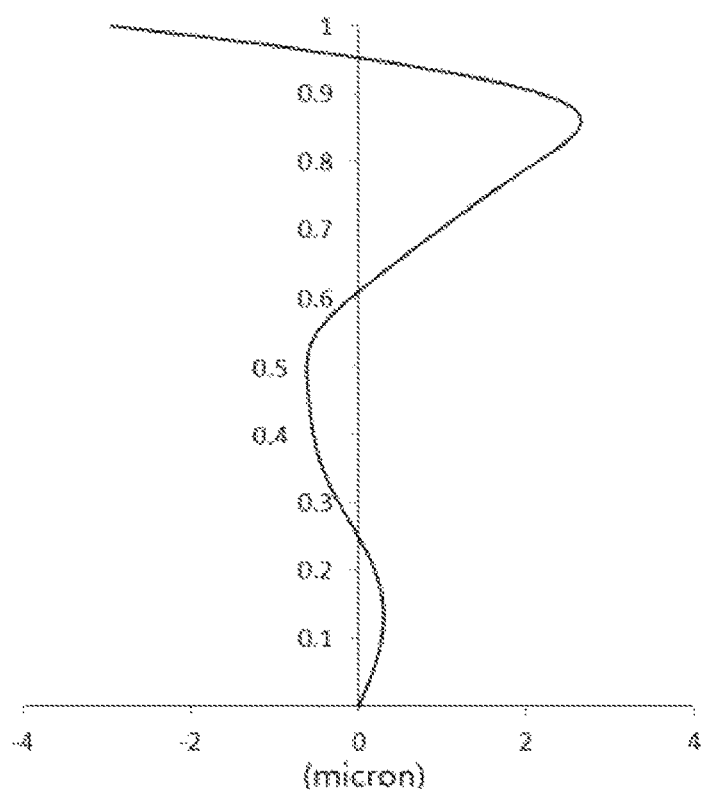

FIG. 4A illustrates a longitudinal aberration curve of the camera tens group according to embodiment 2 to represent deviation of a convergence focal point after light of different wavelengths passes through the lens. FIG. 4B illustrates an astigmatism curve of the camera lens group according to embodiment 2 to represent a meridian image surface curvature and a sagittal image surface curvature. FIG. 4C Illustrates a distortion curve of the camera lens group according to embodiment 2 to represent a distortion value under different VOFs. FIG. 4D illustrates a lateral color curve of the camera lens group according to embodiment 2 to represent deviation of different image heights on the imaging surface after the light passes through the lens. According to FIG. 4A to FIG. 4D, it can be seen that high imaging quality of the camera lens group provided in embodiment 2 may be achieved.

Embodiment 3

Figure 5:
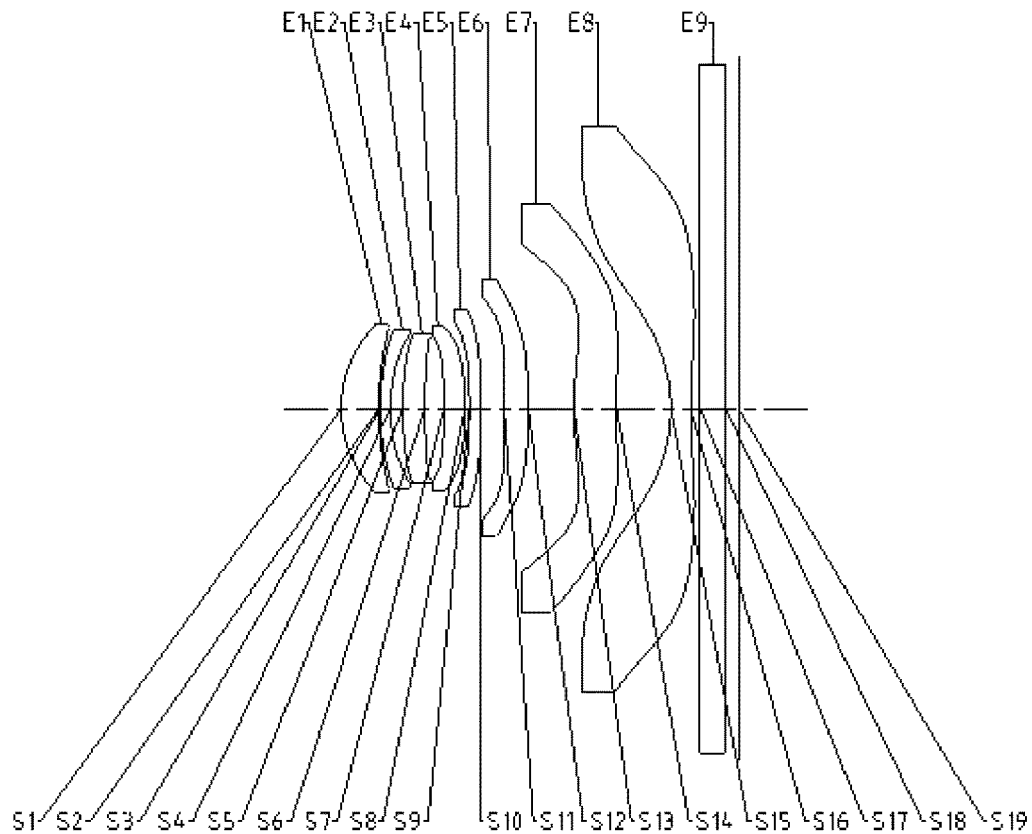
FIG. 5 shows a structure diagram of a camera lens group according to embodiment 3 of the disclosure.

A camera lens group according to embodiment 3 of the disclosure will be described below with reference to FIG. 5 to FIG. 6O. FIG. 5 is a structure diagram of a camera lens group according to embodiment 3 of the disclosure.

As shown in FIG. 5, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an Image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a concave surface, and an image-side surface S8 is a convex surface. The fifth lens E5 has negative focal power, an object-side surface S9 thereof is a concave surface, and an image-side surface S10 is a concave surface.

The sixth lens E6 has positive focal power, an object-side surface S11 thereof is a convex surface, and an image-side surface S12 is a convex surface. The seventh lens E7 has positive focal power, an object-side surface S13 thereof is a convex surface, and an image-side surface S14 is a concave surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 5 is a basic parameter table of the camera lens group of embodiment 3, and units of the curvature radius, the thickness and the focal length therein are all millimeter (mm). Table 6 shows high-order coefficients applied to each aspherical mirror surface in embodiment 3. A surface type of each aspherical surface may be defined by formula (1) given in embodiment 1.

TABLE 5

Embodiment 3: f = 7.40 mm, TTL = 8.77 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7427 | | | | |
| S1 | Aspherical | 2.8274 | 0.8296 | 1.547 | 56.1 | 7.65 | 0.0000 |
| S2 | Aspherical | 7.8193 | 0.0300 | | | | 0.0000 |
| S3 | Aspherical | 6.3216 | 0.2300 | 1.680 | 20.4 | −20.12 | 0.0000 |
| S4 | Aspherical | 4.2592 | 0.2656 | | | | 0.0000 |
| S5 | Aspherical | 7.8382 | 0.4916 | 1.547 | 56.1 | 34.16 | 14.1209 |
| S6 | Aspherical | 13.2115 | 0.4260 | | | | −7.5982 |
| S7 | Aspherical | −22.2791 | 0.4558 | 1.571 | 37.3 | 27.01 | 0.0000 |
| S8 | Aspherical | −9.1842 | 0.1028 | | | | 0.0000 |
| S9 | Aspherical | −29.3418 | 0.2300 | 1.680 | 20.4 | −22.87 | 0.0000 |
| S10 | Aspherical | 33.1308 | 0.5440 | | | | 0.0000 |
| S11 | Aspherical | 66.5267 | 0.5255 | 1.571 | 37.3 | 26.15 | 0.0000 |
| S12 | Aspherical | −19.2124 | 0.9931 | | | | 0.0000 |
| S13 | Aspherical | 7.4956 | 0.9490 | 1.547 | 56.1 | 15.45 | −0.6486 |
| S14 | Aspherical | 63.6269 | 1.2004 | | | | 0.0000 |
| S15 | Aspherical | −3.7208 | 0.4338 | 1.537 | 55.7 | −5.25 | −1.3454 |
| S16 | Aspherical | 12.1418 | 0.2172 | | | | 0.0000 |
| S17 | Spherical | Infinite | 0.5550 | 1.517 | 64.2 | | |
| S18 | Spherical | Infinite | 0.2876 | | | | |
| S19 | Spherical | Infinite | | | | | |

TABLE 6

| Surface number | A4 | A6 | A8 | A10 | A12 | A14 | A16 | A18 | A20 |
|---|---|---|---|---|---|---|---|---|---|
| S1 | −2.8135E−04 | 1.4695E−03 | −9.8024E−04 | 2.9650E−04 | −3.7282E−05 | −1.8101E−06 | 4.8916E−07 | −4.6685E−08 | 0.0000E+00 |
| S2 | 5.8799E−03 | −1.1229E−02 | 6.9234E−03 | −1.8814E−03 | 2.1213E−04 | −5.7640E−06 | 0.0000E+00 | 0.0000E+00 | 0.0000E+00 |
| S3 | 6.7215E−03 | −9.9798E−03 | 5.3581E−03 | −3.6950E−04 | −3.9883E−04 | 1.0690E−04 | −7.3991E−06 | 0.0000E+00 | 0.0000E+00 |
| S4 | 5.9026E−03 | −1.7047E−03 | 3.5607E−04 | 1.2500E−03 | −7.3332E−04 | 1.7565E−04 | −1.7135E−05 | 0.0000E+00 | 0.0000E+00 |
| S5 | −3.0602E−03 | −1.3533E−02 | 2.6599E−03 | −3.3130E−03 | 2.7041E−03 | −1.2672E−03 | 3.4897E−04 | −5.0744E−05 | 2.8863E−06 |
| S6 | −2.3171E−05 | −3.4904E−03 | 5.2231E−03 | −4.6374E−03 | 2.6429E−03 | −9.2517E−04 | 2.1565E−04 | −3.3651E−05 | 3.0325E−06 |
| S7 | −8.3204E−03 | −7.2517E−03 | 4.8659E−03 | −6.2078E−03 | 4.7671E−03 | −2.3434E−03 | 7.0461E−04 | −1.1858E−04 | 8.5167E−06 |
| S8 | 2.8649E−03 | −2.2987E−03 | 2.4692E−02 | −2.4624E−02 | 1.6727E−02 | −7.2924E−03 | 1.9486E−03 | −2.9044E−04 | 1.8501E−05 |
| S9 | −1.2403E−02 | −1.1957E−02 | 1.0890E−02 | −6.3979E−03 | 2.9310E−03 | −9.6631E−04 | 2.0544E−04 | −2.4896E−05 | 1.2939E−06 |
| S10 | −2.0719E−02 | 1.4201E−04 | 7.1625E−04 | 2.6685E−04 | −2.8838E−04 | 9.1964E−05 | −1.4989E−05 | 1.2818E−06 | −4.6354E−08 |
| S11 | −5.7024E−03 | −5.0508E−03 | 3.8933E−03 | −1.9767E−03 | 6.0763E−04 | 1.1768E−04 | 1.4169E−05 | −9.7486E−07 | 2.9543E−08 |
| S12 | −7.9212E−03 | −2.0100E−03 | 1.5870E−03 | −5.6352E04 | 1.0558E−04 | −1.0217E−05 | 4.3474E−07 | −8.0566E−10 | −3.3510E−10 |
| S13 | −7.3770E−03 | −1.3039E−03 | 2.0998E−04 | −1.9182E−05 | 4.3804E−07 | 7.4692E−08 | −6.3634E−09 | 1.9634E−10 | −2.2313E−12 |
| S14 | 3.9986E−03 | −2.6172E−03 | 3.3795E−04 | −2.4378E−05 | 9.3362E−07 | 2.2885E−09 | −1.9395E−09 | 7.5181E−11 | −9.4606E−13 |
| S15 | 1.2619E−03 | −1.6696E−03 | 3.4211E−04 | −3.0269E−05 | 1.5164E−06 | −4.6391E−08 | 8.6372E−10 | −9.0314E−12 | 4.0791E−14 |
| S16 | −5.8140E−03 | 5.7975E−05 | 4.8220E−05 | −5.6746E−06 | 3.1874E−07 | −1.0472E−08 | 2.0504E−10 | −2.2066E−12 | 9.9940E−15 |

Figure 6A:
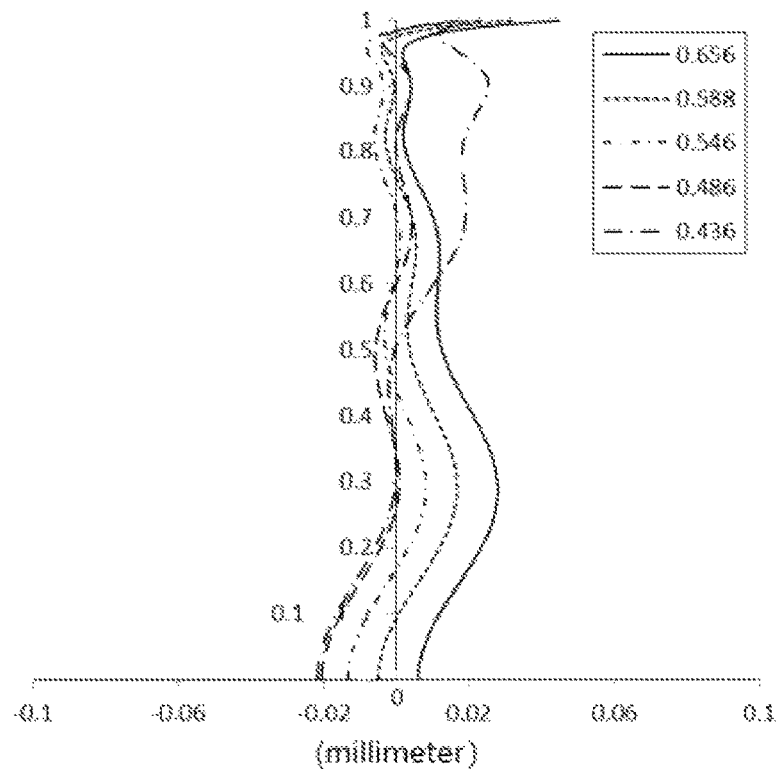
FIG. 6A to FIG. 6D show a longitudinal aberration curve, an astigmatism curve, a distortion curve and a lateral color curve of a camera lens group according to embodiment 3 respectively.
Figure 6B:
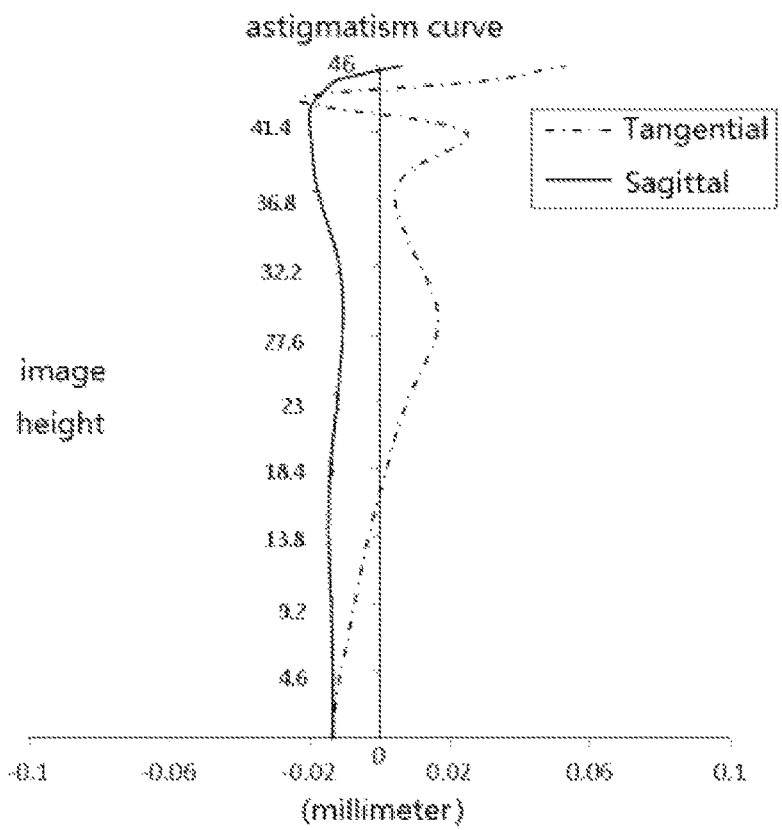
Figure 6C:
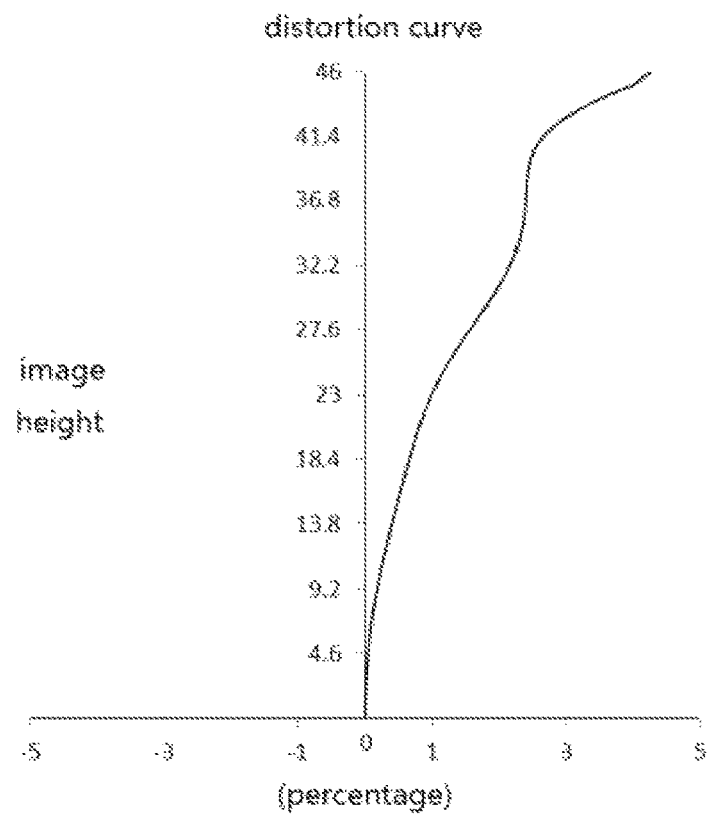
Figure 6D:
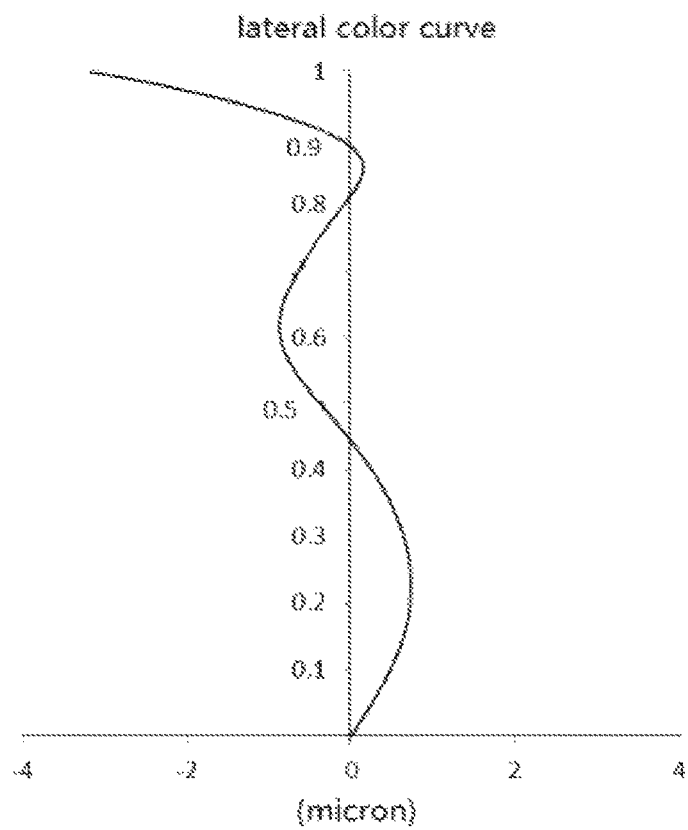

FIG. 6A illustrates a longitudinal aberration curve of the camera lens group according to embodiment 3 to represent deviation of a convergence focal point after light of different wavelengths passes through the lens. FIG. 6B illustrates an astigmatism curve of the camera lens group according to embodiment 3 to represent a meridian image surface curvature and a sagittal image surface curvature. FIG. 6C illustrates a distortion curve of the camera lens group according to embodiment 3 to represent a distortion value under different VOFs. FIG. 6D illustrates a lateral color curve of the camera lens group according to embodiment 3 to represent deviation of different image heights on the imaging surface after the light passes through the lens. According to FIG. 6A to FIG. 6D, it can be seen that high imaging quality of the camera lens group provided in embodiment 3 may be achieved.

Embodiment 4

Figure 7:
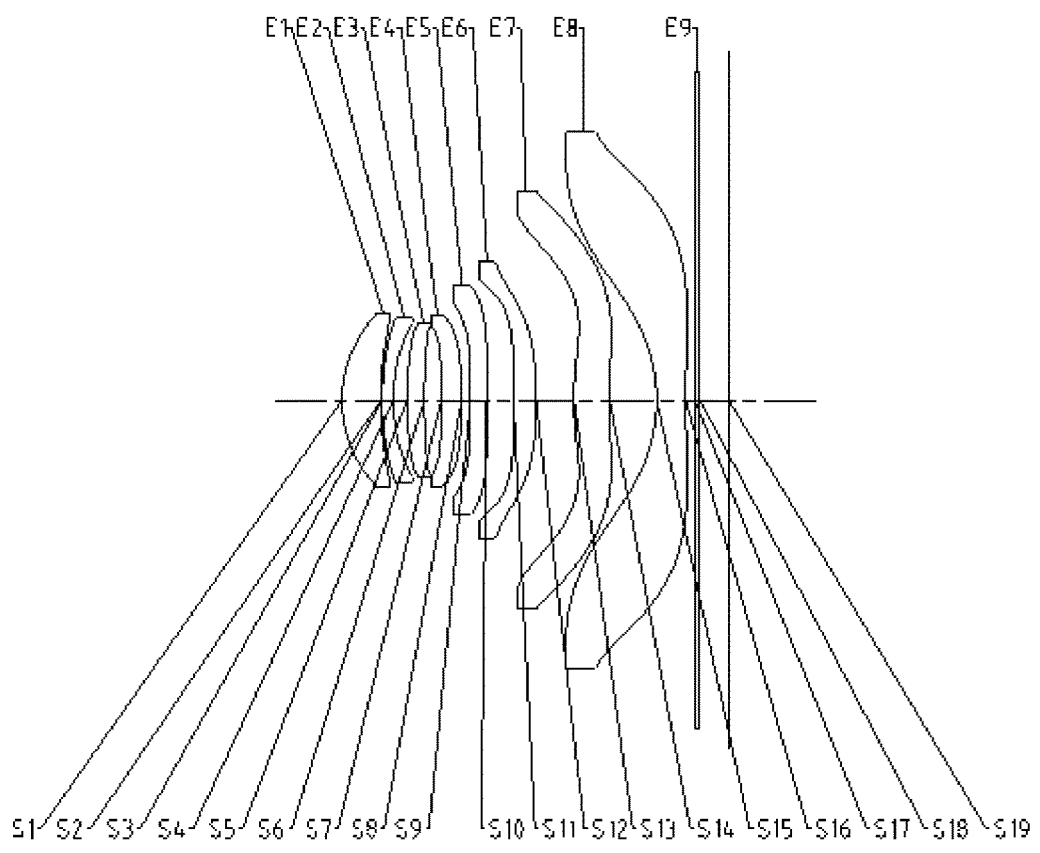
FIG. 7 shows a structure diagram of a camera lens group according to embodiment 4 of the disclosure.

A camera lens group according to embodiment 4 of the disclosure will be described below with reference to FIG. 7 to FIG. 8D. FIG. 7 is a structure diagram of a camera lens group according to embodiment 4 of the disclosure.

As shown in FIG. 7, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a concave surface, and an image-side surface S8 is a convex surface. The fifth lens E5 has negative focal power, an object-side surface S9 thereof is a convex surface, and an image-side surface S10 is a concave surface. The sixth lens E6 has positive focal power, an object-side surface S11 thereof is a concave surface, and an image-side surface S12 is a convex surface. The seventh lens E7 has positive focal power, an object-side surface S13 thereof is a convex surface, and an image-side surface S14 is a concave surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 7 is a basic parameter table of the camera lens group of embodiment 4, and units of the curvature radius, the thickness and the focal length therein are all millimeter (mm). Table 8 shows high-order coefficients applied to each aspherical mirror surface in embodiment 4. A surface type of each aspherical surface may be defined by formula (1) given in embodiment 1.

TABLE 7

Embodiment 4: f = 7.30 mm, TTL = 8.51 mm

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.7624 | | | | |
| S1 | Aspherical | 2.7568 | 0.8557 | 1.547 | 56.1 | 7.31 | 0.0000 |
| S2 | Aspherical | 7.9176 | 0.0305 | | | | 0.0000 |
| S3 | Aspherical | 6.5655 | 0.2493 | 1.680 | 20.4 | −19.21 | 0.0000 |
| S4 | Aspherical | 4.3014 | 0.2969 | | | | 0.0000 |
| S5 | Aspherical | 8.0309 | 0.3772 | 1.547 | 56.1 | 39.89 | 14.1518 |
| S6 | Aspherical | 12.5037 | 0.3769 | | | | −6.1950 |
| S7 | Aspherical | −34.3281 | 0.4507 | 1.571 | 37.3 | 34.80 | 0.0000 |
| S8 | Aspherical | −12.6491 | 0.1898 | | | | 0.0000 |
| S9 | Aspherical | 201.1980 | 0.3521 | 1.680 | 20.4 | −26.31 | 0.0000 |
| S10 | Aspherical | 16.4083 | 0.5926 | | | | 0.0000 |
| S11 | Aspherical | −302.3978 | 0.5017 | 1.571 | 37.3 | 19.16 | 0.0000 |
| S12 | Aspherical | −10.5711 | 0.8284 | | | | 0.0000 |
| S13 | Aspherical | 6.9224 | 0.7837 | 1.547 | 56.1 | 15.73 | −0.5217 |
| S14 | Aspherical | 34.1625 | 1.0366 | | | | 0.0000 |
| S15 | Aspherical | −3.5431 | 0.6339 | 1.537 | 55.7 | −5.24 | −1.3392 |
| S16 | Aspherical | 14.5558 | 0.2047 | | | | 0.0000 |
| S17 | Spherical | Infinite | 0.1171 | 1.517 | 64.2 | | |
| S18 | Spherical | Infinite | 0.6352 | | | | |
| S19 | Spherical | Infinite | | | | | |

TABLE 8

| Surface number | A4 | A6 | A8 | A10 | A12 | A14 | A16 | A18 | A20 |
|---|---|---|---|---|---|---|---|---|---|
| S1 | −2.9328E−04 | 1.5639E−03 | −1.0651E−03 | 3.2894E−04 | −4.2228E−05 | −2.0933E−06 | 5.7753E−07 | −5.6276E−08 | 0.0000E+00 |
| S2 | 6.4458E−03 | −1.2888E−02 | 8.3202E−03 | −2.3673E−03 | 2.7947E−04 | −7.9507E−06 | 0.0000E+00 | 0.0000E+00 | 0.0000E+00 |
| S3 | 7.3601E−03 | −1.1435E−02 | 6.4247E−03 | −4.6362E−04 | −5.2366E−04 | 1.4688E−04 | −1.0638E−05 | 0.0000E+00 | 0.0000E+00 |

TABLE 8-continued

| Surface number | A4 | A6 | A8 | A10 | A12 | A14 | A16 | A18 | A20 |
|---|---|---|---|---|---|---|---|---|---|
| S4 | 6.3948E−03 | −1.9223E−03 | 4.1793E−04 | 1.5271E−03 | −9.3250E−04 | 2.3249E−04 | −2.3605E−05 | 0.0000E+00 | 0.0000E+00 |
| S5 | −4.0932E−03 | 2.3010E−03 | −7.1486E−03 | 9.3610E−03 | −6.8468E−03 | 3.1721E−03 | −8.8797E−04 | 1.3948E−04 | −9.5329E−06 |
| S6 | −3.9040E−04 | −3.2668E−03 | 2.4334E−03 | −7.9829E−04 | −5.5371E−04 | 8.3936E−04 | −3.8423E−04 | 8.0380E−05 | −6.0234E−06 |
| S7 | −3.1624E−03 | −1.3268E−02 | 1.1889E−02 | −1.2702E−02 | 9.0709E−03 | −4.4307E−03 | 1.3856E−03 | −2.4522E−04 | 1.8340E−05 |
| S8 | 8.3622E−03 | −4.5591E−02 | 6.5286E−02 | −6.4448E−02 | 4.0916E−02 | −1.6822E−02 | 4.3304E−03 | −6.3264E−04 | 3.9919E−05 |
| S9 | −1.2869E−02 | −2.2115E−02 | 2.9242E−02 | −2.1208E−02 | 9.7119E−03 | −2.9125E−03 | 5.6322E−04 | −6.4060E−05 | 3.2295E−06 |
| S10 | −1.8869E−02 | −3.0109E−03 | 4.3537E−03 | −1.7947E−03 | 3.3044E−04 | −8.0181E−06 | −7.0221E−06 | 1.0751E−06 | −5.0221E−08 |
| S11 | −3.8943E−03 | −3.0401E−03 | −1.0156E−03 | 1.5829E−03 | −7.8738E−04 | 2.1140E−04 | −3.2733E−05 | 2.7280E−06 | −9.3819E−08 |
| S12 | −6.8171E−03 | −3.5748E−03 | 1.2100E−03 | −7.1212E−04 | −5.7908E−05 | 1.8152E−05 | −2.3445E−06 | 1.4496E−07 | −3.5284E−09 |
| S13 | −7.0701E−03 | −3.2524E−03 | 4.0548E−04 | 1.9945E−05 | −9.1031E−06 | 9.4249E−07 | −4.7653E−08 | 1.2125E−09 | −1.2438E−11 |
| S14 | 7.3093E−03 | −4.6519E−03 | 5.7130E−04 | −1.2853E−05 | −3.7784E−06 | 4.4383E−07 | −2.2292E−08 | 5.5268E−10 | −5.5051E−12 |
| S15 | 6.6425E−04 | −1.5122E−03 | 3.1953E−04 | −2.8099E−05 | 1.3797E−06 | −4.0882E−08 | 7.2763E−10 | −7.1563E−12 | 2.9747E−14 |
| S16 | −6.2218E−03 | −1.4946E−04 | 1.0740E−04 | −1.3730E−05 | 8.9506E−07 | −3.3857E−08 | 7.4986E−10 | −8.9930E−12 | 4.4931E−14 |

Figure 8A:
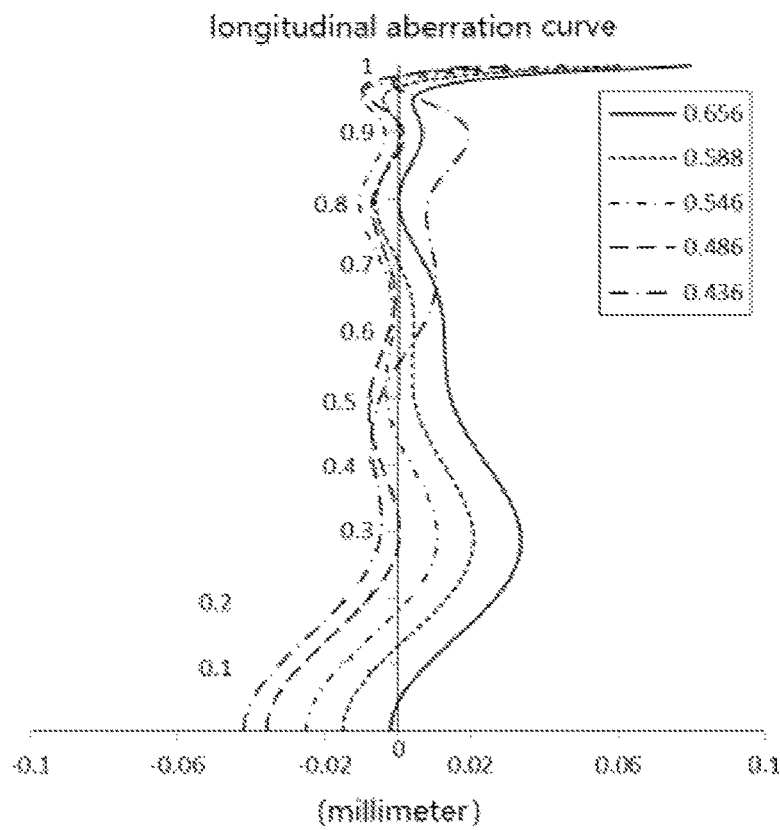
FIG. 8A to FIG. 8D show a longitudinal aberration curve, an astigmatism curve, a distortion curve and a lateral color curve of a camera lens group according to embodiment 4 respectively.
Figure 8B:
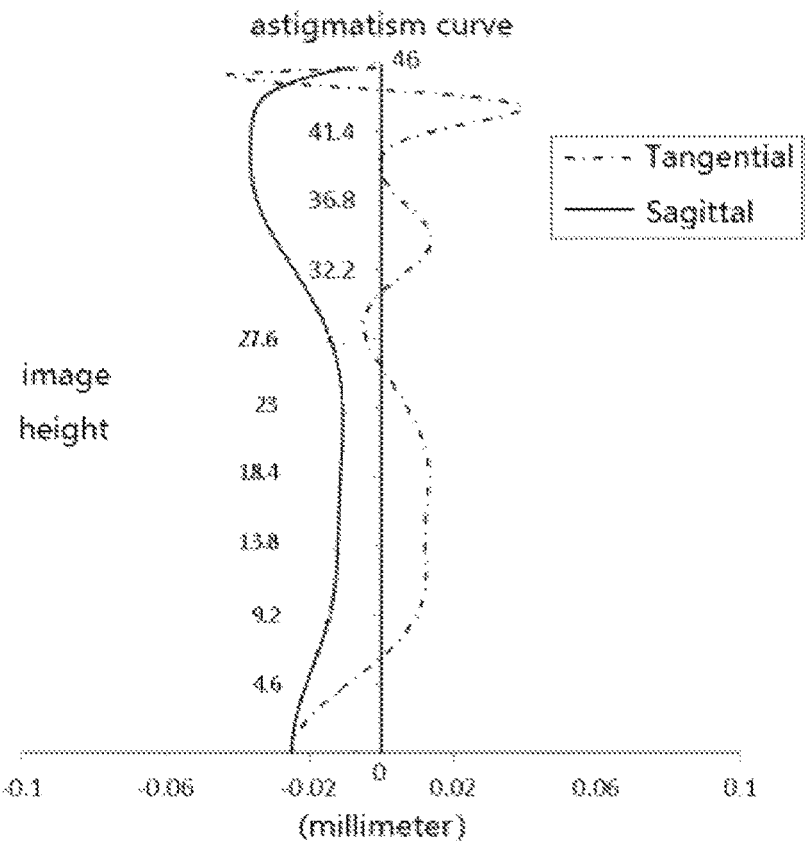
Figure 8C:
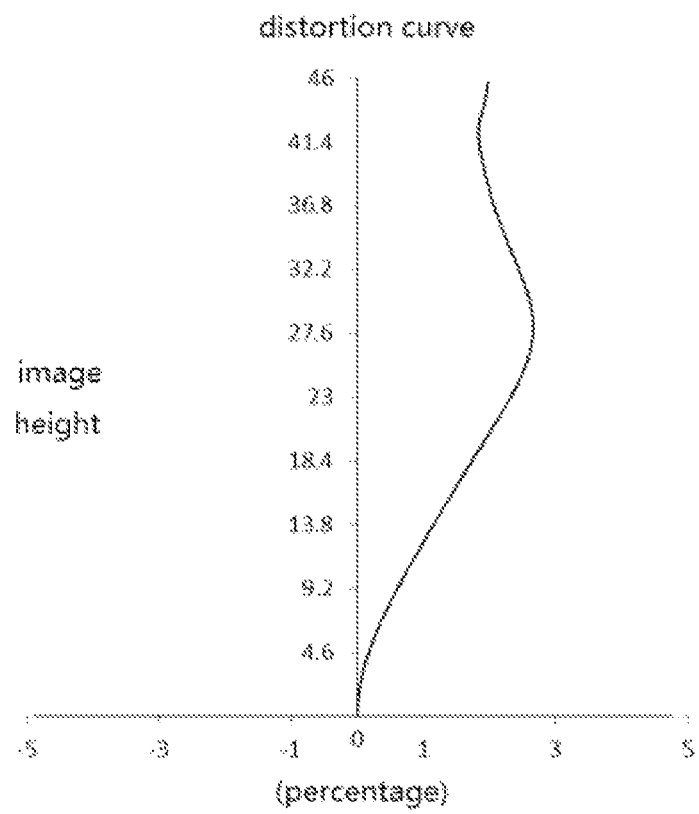
Figure 8D:
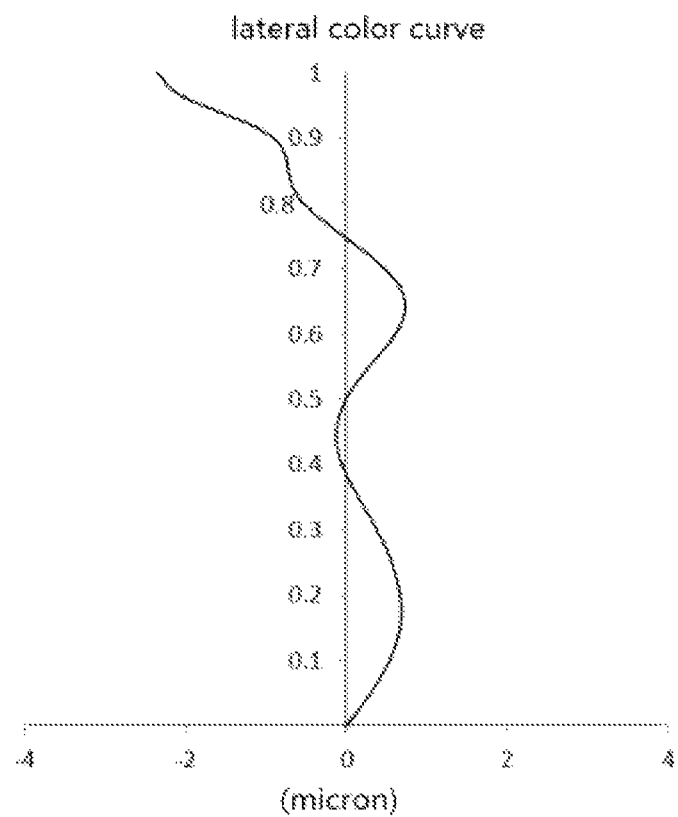

FIG. 8A illustrates a longitudinal aberration curve of the camera lens group according to embodiment 4 to represent deviation of a convergence focal point after light of different wavelengths passes through the lens. FIG. 8B illustrates an astigmatism curve of the camera lens group according to embodiment 4 to represent a meridian image surface curvature and a sagittal image surface curvature. FIG. 8C illustrates a distortion curve of the camera lens group according to embodiment 4 to represent a distortion value under different VOFs. FIG. 8D illustrates a lateral color curve of the camera lens group according to embodiment 4 to represent deviation of different image heights on the imaging surface after the light passes through the lens. According to FIG. 8A to FIG. 8D, it can be seen that high imaging quality of the camera lens group provided in embodiment 4 may be achieved.

Embodiment 5

Figure 9:
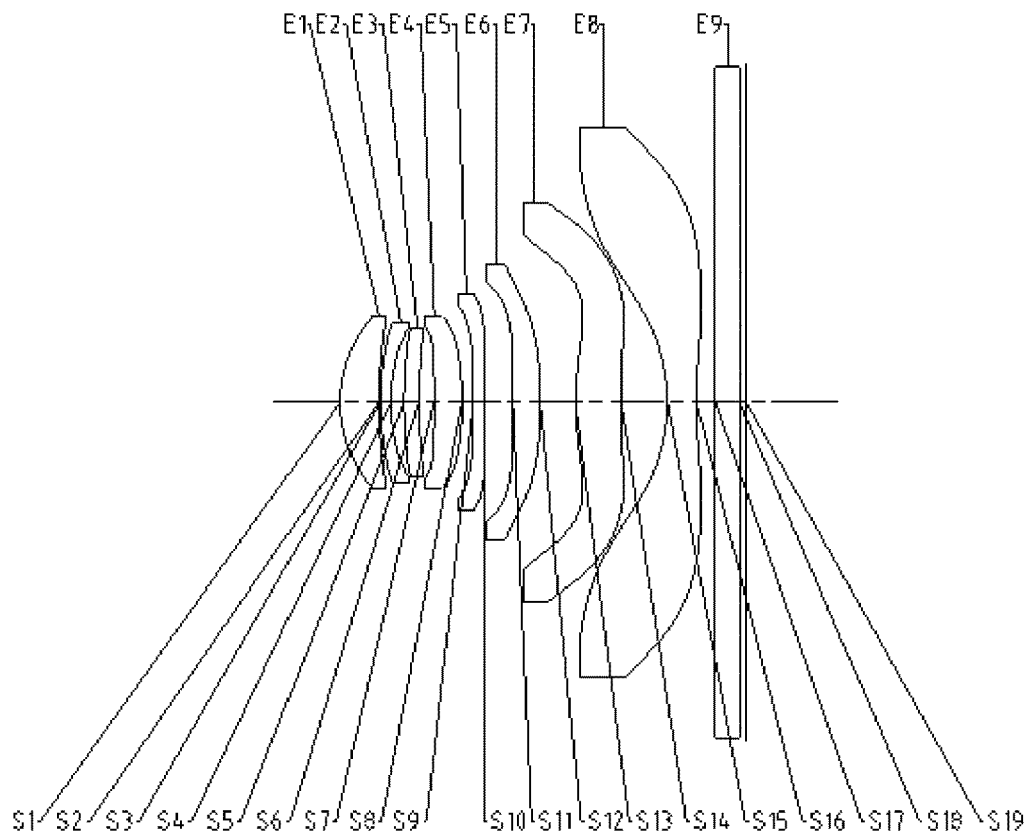
FIG. 9 shows a structure diagram of a camera lens group according to embodiment 5 of the disclosure.

A camera lens group according to embodiment 5 of the disclosure will be described below with reference to FIG. 9 to FIG. 10D. FIG. 9 is a structure diagram of a camera lens group according to embodiment 5 of the disclosure.

As shown in FIG. 9, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has negative focal power, an object-side surface S5 thereof is a convex surface, and an image-side surface S6 is a concave surface. The fourth lens E4 has positive focal power, an object-side surface S7 thereof is a convex surface, and an image-side surface S8 is a convex surface. The fifth lens E5 has negative focal power, an object-side surface S9 thereof is a convex surface, and an image-side surface S10 is a concave surface. The sixth lens E6 has positive focal power, an object-side surface S11 thereof is a convex surface, and an image-side surface S12 is a convex surface. The seventh lens E7 has positive focal power, an object-side surface S13 thereof is a convex surface, and an image-side surface S14 is a concave surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 9 is a basic parameter table of the camera lens group of embodiment 5, and units of the curvature radius, the thickness and the focal length therein are all millimeter (mm). Table 10 shows high-order coefficients applied to each aspherical mirror surface in embodiment 5. A surface type of each aspherical surface may be defined by formula (1) given in embodiment 1.

TABLE 9

Embodiment 5: f = 7.30 mm, TTL = 8.99 mm

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.5177 | | | | |
| S1 | Aspherical | 2.9923 | 0.8638 | 1.547 | 56.1 | 7.14 | 0.0029 |
| S2 | Aspherical | 11.5141 | 0.0317 | | | | −0.1401 |
| S3 | Aspherical | 6.9000 | 0.2346 | 1.680 | 20.4 | −18.97 | 0.0941 |
| S4 | Aspherical | 4.4325 | 0.2865 | | | | −0.0252 |
| S5 | Aspherical | 9.4354 | 0.3259 | 1.547 | 56.1 | −711.56 | 5.7227 |
| S6 | Aspherical | 9.0994 | 0.3381 | | | | −98.7768 |
| S7 | Aspherical | 195.8708 | 0.6273 | 1.571 | 37.3 | 15.84 | 0.0000 |
| S8 | Aspherical | −9.4745 | 0.2480 | | | | 0.0000 |
| S9 | Aspherical | 101.6101 | 0.2346 | 1.680 | 20.4 | −21.40 | 0.0000 |

TABLE 9-continued

Embodiment 5: f = 7.30 mm, TTL = 8.99 mm

| Surface number | Surface type | Curvature radius | Thickness | Material Refractive index | Abbe number | Focal length | Conic coefficient |
|---|---|---|---|---|---|---|---|
| S10 | Aspherical | 12.7096 | 0.6396 | | | | 0.0000 |
| S11 | Aspherical | 703.9900 | 0.6034 | 1.571 | 37.3 | 30.76 | 0.0000 |
| S12 | Aspherical | −18.0151 | 0.7680 | | | | 0.0000 |
| S13 | Aspherical | 5.8680 | 1.0164 | 1.547 | 56.1 | 12.83 | −3.3425 |
| S14 | Aspherical | 33.7108 | 1.0306 | | | | 0.0000 |
| S15 | Aspherical | −3.9853 | 0.6412 | 1.537 | 55.7 | −5.39 | −1.2962 |
| S16 | Aspherical | 11.2310 | 0.4217 | | | | 0.0000 |
| S17 | Spherical | Infinite | 0.5358 | 1.517 | 64.2 | | |
| S18 | Spherical | Infinite | 0.1455 | | | | |
| S19 | Spherical | Infinite | | | | | |

TABLE 10

| Surface number | A4 | A6 | A8 | A10 | A12 | A14 | A16 | A18 | A20 |
|---|---|---|---|---|---|---|---|---|---|
| S1 | −7.0789E−04 | 4.5347E−03 | −7.9718E−03 | 8.1107E−03 | −5.0106E−03 | 1.9001E−03 | −4.3386E−04 | 5.4833E−05 | −2.9563E−06 |
| S2 | 5.7665E−03 | −1.4084E−02 | 1.5877E−02 | −1.2552E−02 | 7.2109E−03 | −2.8535E−03 | 7.2453E−04 | −1.0521E−04 | 6.5908E−06 |
| S3 | 7.1482E−03 | −1.5385E−02 | 1.98.93E−02 | −1.7926E−02 | 1.1321E−02 | −4.6796E−03 | 1.2039E−03 | −1.7552E−04 | 1.1093E−05 |
| S4 | 4.8566E−03 | −2.3203E−03 | 4.0746E−03 | −4.6909E−03 | 3.9653E−03 | −2.0680E−03 | 6.4138E−04 | −1.0868E−04 | 7.6927E−06 |
| S5 | −7 9421E−03 | 3.9255E−03 | −5.5400E−03 | 6.8104E−03 | −5.0672E−03 | 2.3854E−03 | −6.8424E−04 | 1.1167E−04 | −7.9461E−06 |
| S6 | 3.4082E−03 | −5.2974E−04 | −7.6342E−03 | 1.2156E−02 | −1.0151E−02 | 5.1576E−03 | −1.5774E−03 | 2.6788E−04 | −1.9271E−05 |
| S7 | −1.4443E−02 | 1.2459E−02 | −2.8343E−02 | 3.1682E−02 | −2.2565E−02 | 1.0202E−02 | −2.8550E−03 | 4.5288E−04 | −3.1322E−05 |
| S8 | −2.1740E−03 | −1.9613E−02 | 2.8636E−02 | −2.8909E−02 | 1.8375E−02 | −7.3516E−03 | 1.7936E−03 | −2.4333E−04 | 1.4052E−05 |
| S9 | −1.4628E−02 | −1.0593E−02 | 1.1721E−02 | −6.8519E−03 | 2.6430E−03 | −6.8045E−04 | 1.1173E−04 | −1.0467E−05 | 4.1486E−07 |
| S10 | −1.5517E−02 | −4.9795E−03 | 5.9750E−03 | −3.1740E−03 | 1.0819E−03 | −2.4602E−04 | 3.5641E−05 | −2.9468E−06 | 1.0487E−07 |
| S11 | −3.7976E−03 | −7.2344E−04 | −9.2172E−04 | 8.1637E−04 | −3.4706E−04 | 8.3850E−05 | −1.1735E−05 | 8.7730E−07 | −2.6832E−08 |
| S12 | −1.0610E−02 | 1.5748E−04 | −9.6724E−05 | 1.2650E−04 | −4.9549E−05 | 9.8292E−06 | −1.0323E−06 | 5.4974E−08 | −1.1748E−09 |
| S13 | −6.3779E−03 | −2.8602E−04 | −3.6789E−04 | 9.2721E−05 | −8.9350E−06 | 2.3230E−07 | 1.9740E−08 | −1.4440E−09 | 2.6616E−11 |
| S14 | 6.8206E−03 | −1.6184E−03 | −2.6358E−04 | 9.3606E−05 | −1.1355E−05 | 7.4008E−07 | −2.7418E−08 | 5.4233E−10 | −4.4313E−12 |
| S15 | 1.3228E−03 | −1.5653E−03 | 3.0921E−04 | −2.6569E−05 | 1.2920E−06 | −3.8275E−08 | 6.8784E−10 | −6.9157E−12 | 2.9884E−14 |
| S16 | −2.6992E−03 | −1.1654E−03 | 2.4256E−04 | −2.2695E−05 | 1.2045E−06 | −3.8412E−08 | 7.2794E−10 | −7.5391E−12 | 3.2790E−14 |

Figure 10A:
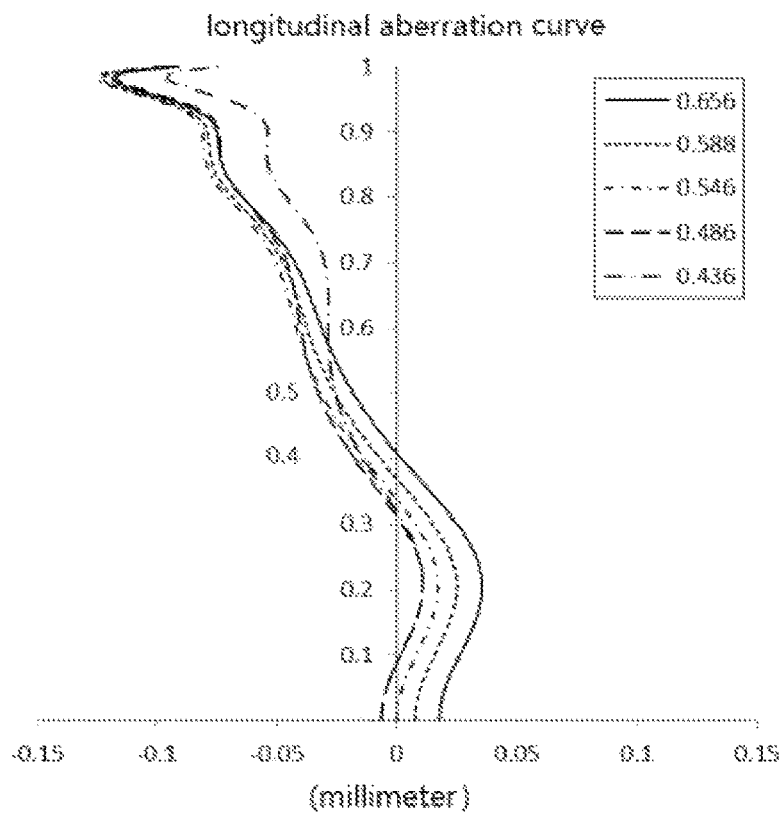
FIG. 10A to FIG. 10D show a longitudinal aberration curve, an astigmatism curve, a distortion curve and a lateral color curve of a camera lens group according to embodiment 5 respectively.
Figure 10B:
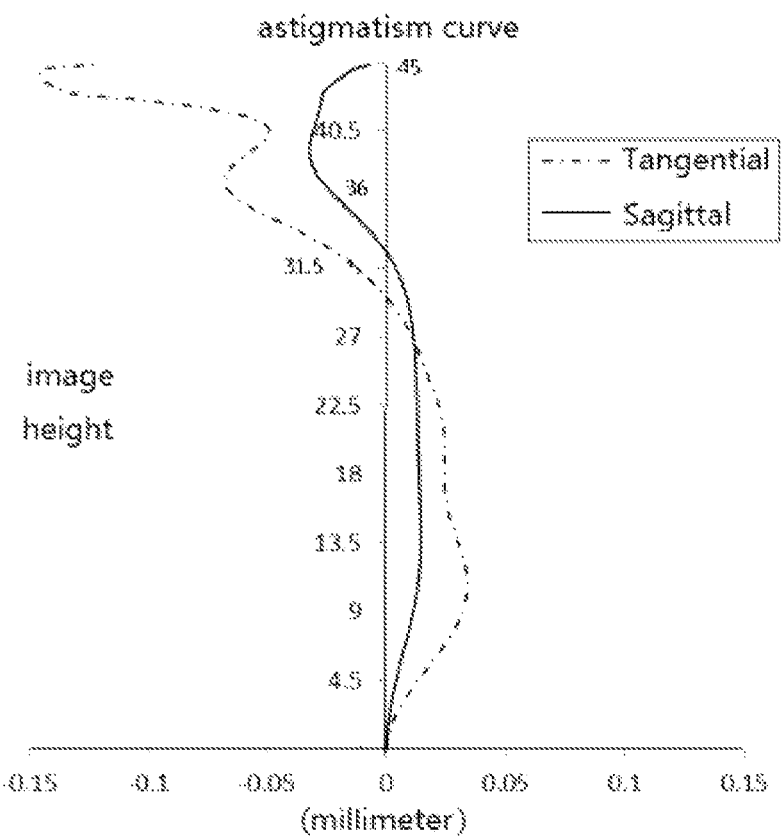
Figure 10C:
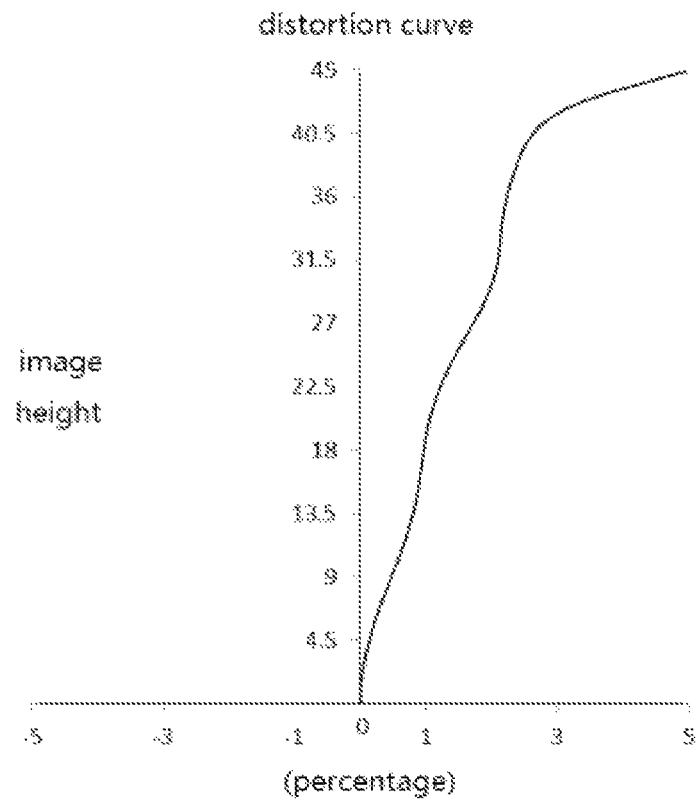
Figure 10D:
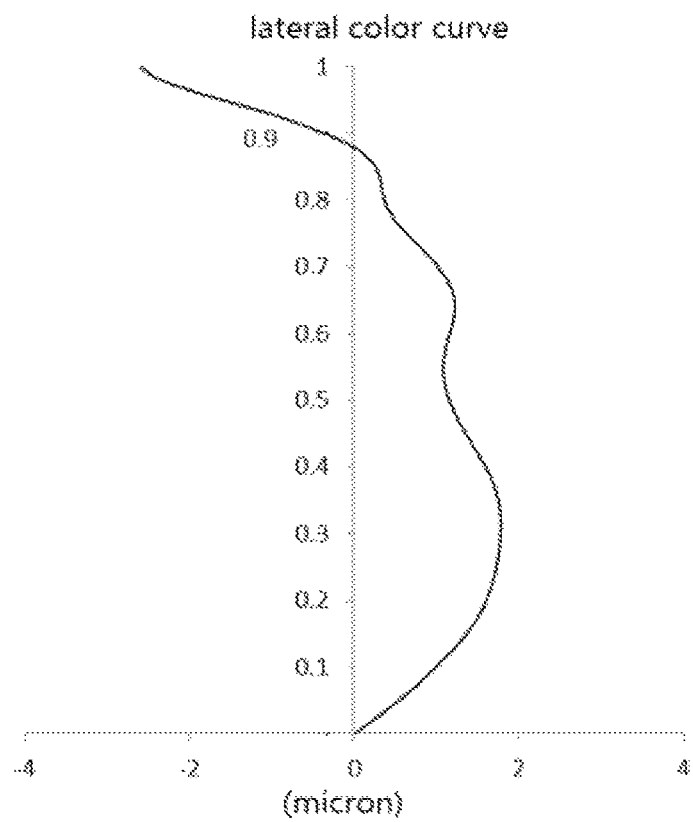

FIG. 10A illustrates a longitudinal aberration curve of the camera lens group according to embodiment 5 to represent deviation of a convergence focal point after light of different wavelengths passes through the lens. FIG. 10B illustrates an astigmatism curve of the camera lens group according to embodiment 5 to represent a meridian image surface curvature and a sagittal image surface curvature. FIG. 10C illustrates a distortion curve of the camera lens group according to embodiment 5 to represent a distortion value under different VOFs. FIG. 10O illustrates a lateral color curve of the camera lens group according to embodiment 5 to represent deviation of different image heights on the imaging surface after the light passes through the lens. According to FIG. 10A to FIG. 10D, it can be seen that high imaging quality of the camera lens group provided in embodiment 5 may be achieved.

Embodiment 6

Figure 11:
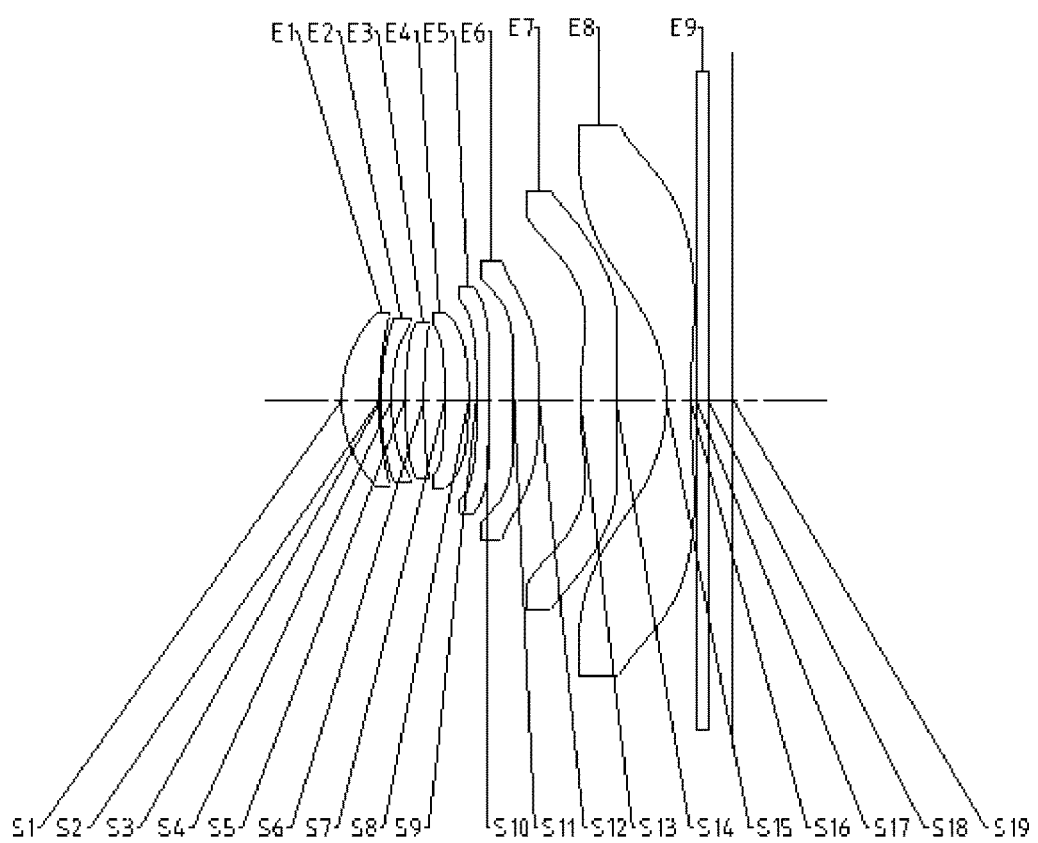
FIG. 11 shows a structure diagram of a camera lens group according to embodiment 6 of the disclosure.

A camera lens group according to embodiment 6 of the disclosure will be described below with reference to FIG. 11 to FIG. 12D. FIG. 11 is a structure diagram of a camera lens group according to embodiment 6 of the disclosure.

As shown in FIG. 11, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a concave surface, and an image-side surface S8 is a convex surface. The fifth lens E5 has negative focal power, an object-side surface S9 thereof is a convex surface, and an image-side surface S10 is a concave surface. The sixth lens E6 has positive focal power, an object-side surface S11 thereof is a convex surface, and an image-side surface S12 is a convex surface. The seventh lens E7 has positive focal power, an object-side surface S13 thereof is a convex surface, and an image-side surface S14 is a concave surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 11 is a basic parameter table of the camera lens group of embodiment 6, and units of the curvature radius, the thickness and the focal length therein are all millimeter (mm). Table 12 shows high-order coefficients applied to each aspherical mirror surface in embodiment 6. A surface type of each aspherical surface may be defined by formula (1) given in embodiment 1.

TABLE 11

Embodiment 6: f = 7.30 mm, TTL = 8.61 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | −0.7437 | | | | |
| S1 | Aspherical | 2.7926 | 0.8333 | 1.547 | 56.1 | 7.38 | 0.0000 |
| S2 | Aspherical | 8.1310 | 0.0300 | | | | 0.0000 |
| S3 | Aspherical | 6.6190 | 0.2300 | 1.680 | 20.4 | −18.86 | 0.0000 |
| S4 | Aspherical | 4.3036 | 0.2968 | | | | 0.0000 |
| S5 | Aspherical | 7.9863 | 0.4181 | 1.547 | 56.1 | 36.00 | 14.3534 |
| S6 | Aspherical | 13.1950 | 0.4603 | | | | 1.2321 |
| S7 | Aspherical | −24.1488 | 0.5222 | 1.571 | 37.3 | 31.76 | 0.0000 |
| S8 | Aspherical | −10.4406 | 0.1734 | | | | 0.0000 |
| S9 | Aspherical | 54.9779 | 0.2601 | 1.680 | 20.4 | −25.40 | 0.0000 |
| S10 | Aspherical | 13.1111 | 0.5660 | | | | 0.0000 |
| S11 | Aspherical | 160.3333 | 0.5609 | 1.571 | 37.3 | 21.61 | 0.0000 |
| S12 | Aspherical | −13.3566 | 0.8925 | | | | 0.0000 |
| S13 | Aspherical | 6.7255 | 0.7960 | 1.547 | 56.1 | 15.75 | −0.6456 |
| S14 | Aspherical | 29.5026 | 1.1039 | | | | 0.0000 |
| S15 | Aspherical | −3.7226 | 0.5260 | 1.537 | 55.7 | −5.22 | −1.3251 |
| S16 | Aspherical | 11.9577 | 0.1288 | | | | 0.0000 |
| S17 | Spherical | Infinite | 0.2546 | 1.517 | 64.2 | | |
| S18 | Spherical | Infinite | 0.5592 | | | | |
| S19 | Spherical | Infinite | | | | | |

TABLE 12

| Surface number | A4 | A6 | A8 | A10 | A12 | A14 | A16 | A18 | A20 |
|---|---|---|---|---|---|---|---|---|---|
| S1 | −2.9143E−04 | 1.5492E−03 | −1.0518E−03 | 3.2379E−04 | −4.1436E−05 | −2.0475E−06 | 5.6314E−07 | −5.4701E−08 | 0.0000E+00 |
| S2 | 6.1140E−03 | −1.1906E−02 | 7.4855E−03 | −2.0742E−03 | 2.3848E−04 | −6.6078E−06 | 0.0000E+00 | 0.0000E+00 | 0.0000E+00 |
| S3 | 6.9966E−03 | −1.0599E−02 | 5.8057E−03 | −4.0848E−04 | −4.4984E−04 | 1.2302E−04 | −8.6869E−06 | 0.0000E+00 | 0.0000E+00 |
| S4 | 6.2490E−03 | −1.8569E−03 | 3.9910E−04 | 1.4416E−03 | −8.7017E−04 | 2.1446E−04 | −2.1525E−05 | 0.0000E+00 | 0.0000E+00 |
| S5 | −3.6308E−03 | 1.1858E−03 | −3.8794E−03 | 5.8320E−03 | −4.7516E−03 | 2.4432E−03 | −7.4863E−04 | 1.2664E−04 | −9.1622E−06 |
| S6 | −1.0662E−03 | −2.8702E−03 | 4.2268E−03 | −4.0095E−03 | 2.6528E−03 | −1.1226E−03 | 3.2570E−04 | −5.9250E−05 | 5.3475E−06 |
| S7 | −7.7452E−03 | −8.8926E−03 | 4.1664E−03 | −2.2199E−03 | 1.4609E−05 | 5.7167E−04 | −3.1252E−04 | 7.4742E−05 | −7.1127E−06 |
| S8 | 8.2814E−04 | −2.2585E−02 | 2.3700E−02 | −2.0623E−02 | 1.2143E−02 | −4.7589E−03 | 1.1841E−03 | −1.6780E−04 | 1.0250E−05 |
| S9 | −1.4818E−02 | −1.1349E−02 | 1.2141E−02 | −6.4940E−03 | 2.1401E−03 | −4.6808E−04 | 7.0658E−05 | −6.9445E−06 | 3.2297E−07 |
| S10 | −2.0712E−02 | −1.3059E−03 | 2.7380E−03 | −8.8385E−04 | 6.6655E−05 | 2.4121E−05 | −6.4563E−06 | 5.9135E−07 | −1.8789E−08 |
| S11 | −7.1343E−03 | −9.7331E−04 | −5.8341E−04 | 5.1226E−04 | −2.5442E−04 | 7.6256E−05 | 1.3280E−05 | 1.2127E−06 | −4.4189E−08 |
| S12 | −1.0071E−02 | 3.5250E−05 | 3.5775E−04 | −2.2876E−04 | 6.3261E−05 | −8.8038E−06 | 6.7452E−07 | −2.7878E−08 | 5.0019E−10 |
| S13 | −1.0930E−03 | −4.2299E−04 | −9.9484E−05 | 3.5788E−05 | −3.2567E−06 | 6.4766E−08 | 7.2515E−09 | −4.5249E−10 | 7.6078E−12 |
| S14 | 1.5579E−03 | −1.7769E−03 | −1.6192E−05 | 5.0093E−05 | −7.4077E−06 | 5.4047E−07 | −2.2175E−08 | 4.8901E−10 | −4.5106E−12 |
| S15 | 1.1840E−03 | −1.6992E−03 | 3.5092E−04 | −3.1191E−05 | 1.5678E−06 | −4.8048E−08 | 8.9465E−10 | −9.3376E−12 | 4.1995E−14 |
| S16 | −5.2041E−03 | −2.8764E−04 | 1.1029E−04 | −1.1987E−05 | 6.9334E−07 | −2.3772E−08 | 4.8455E−10 | −5.4134E−12 | 2.5448E−14 |

Figure 12A:
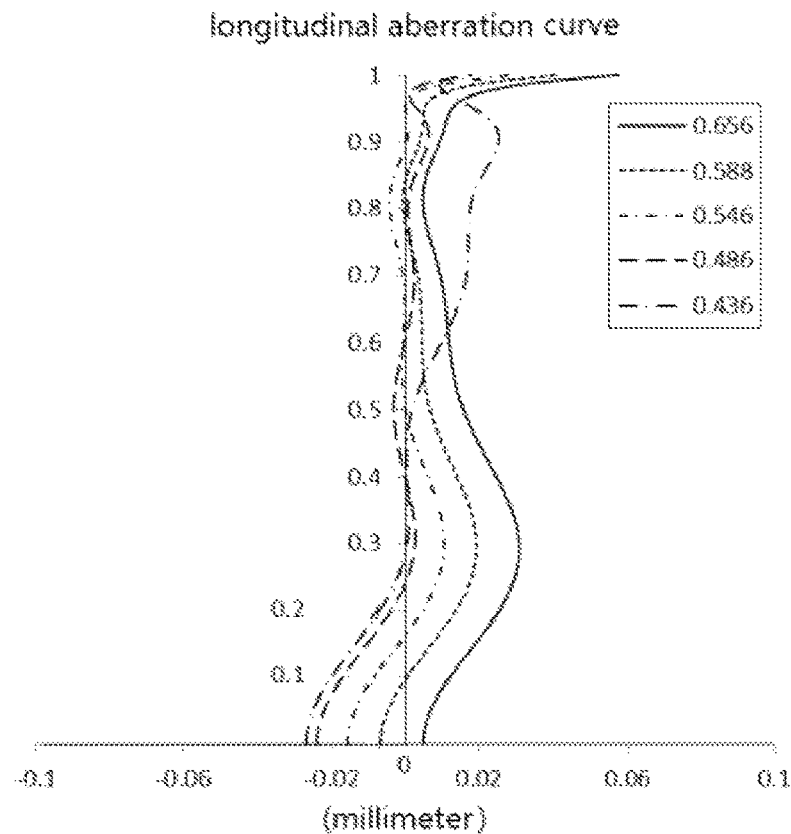
FIG. 12A to FIG. 12D show a longitudinal aberration curve, an astigmatism curve, a distortion curve and a lateral color curve of a camera lens group according to embodiment 6 respectively.
Figure 12B:
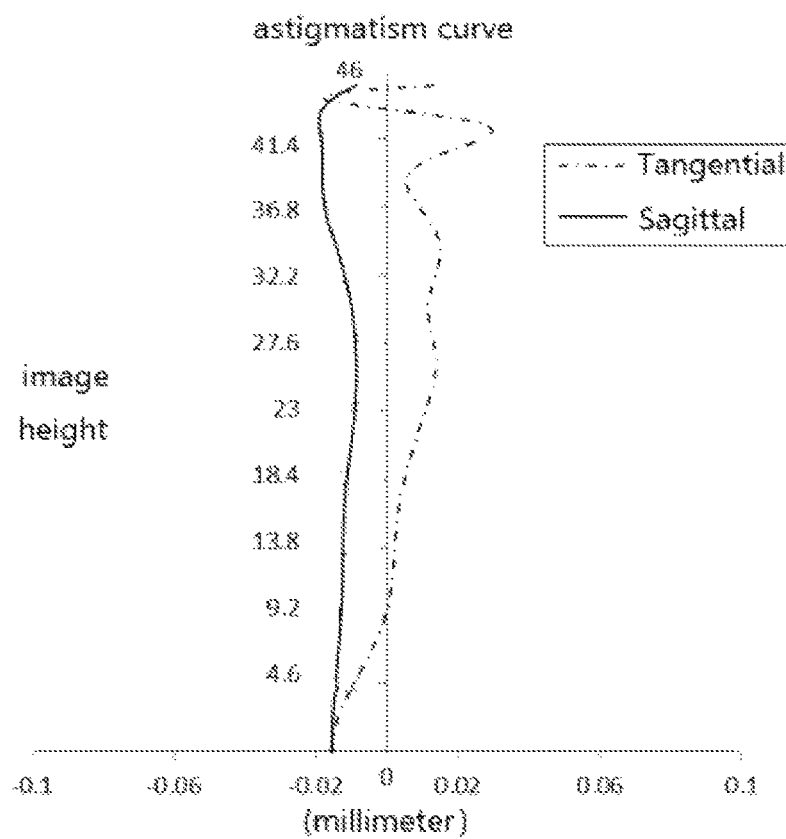
Figure 12C:
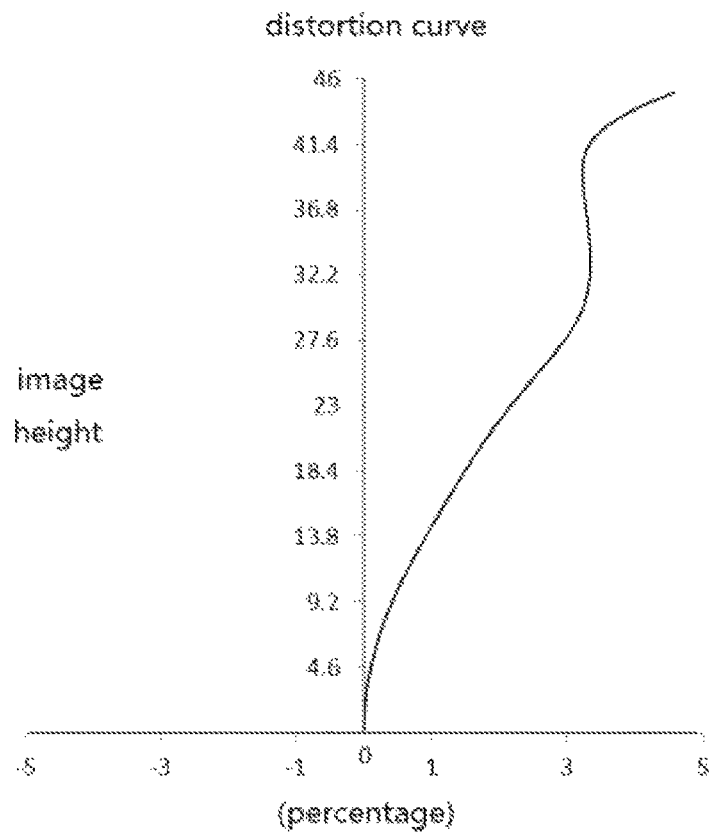
Figure 12D:
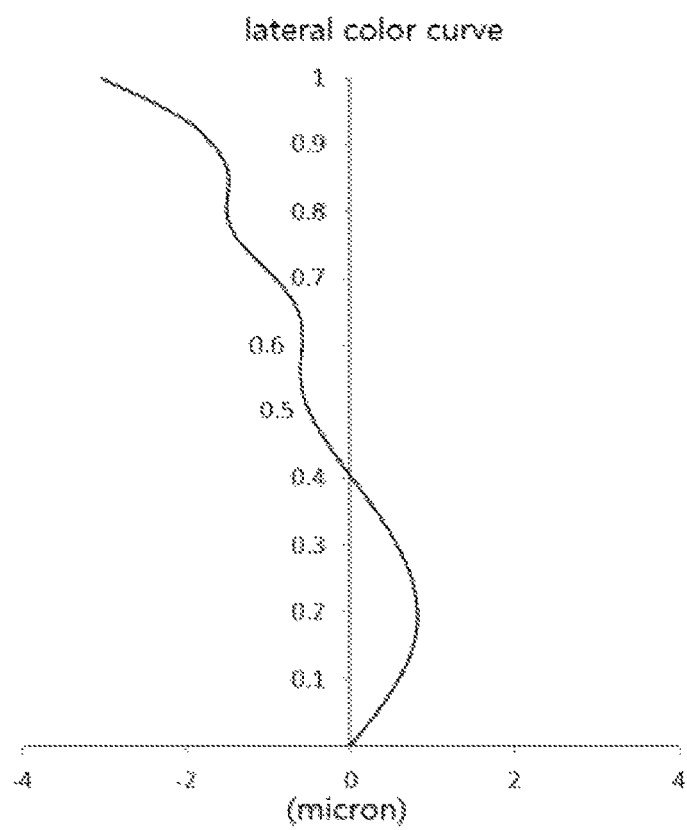

FIG. 12A illustrates a longitudinal aberration curve of the camera lens group according to embodiment 6 to represent deviation of a convergence focal point after light of different wavelengths passes through the lens. FIG. 12B illustrates an astigmatism curve of the camera lens group according to embodiment 6 to represent a meridian image surface curvature and a sagittal image surface curvature. FIG. 12C illustrates a distortion curve of the camera lens group according to embodiment 6 to represent a distortion value under different VOFs. FIG. 12D illustrates a lateral color curve of the camera lens group according to embodiment 6 to represent deviation of different image heights on the imaging surface after the light passes through the lens. According to FIG. 12A to FIG. 12D, it can be seen that high imaging quality of the camera lens group provided in embodiment 6 may be achieved.

Embodiment 7

Figure 13:
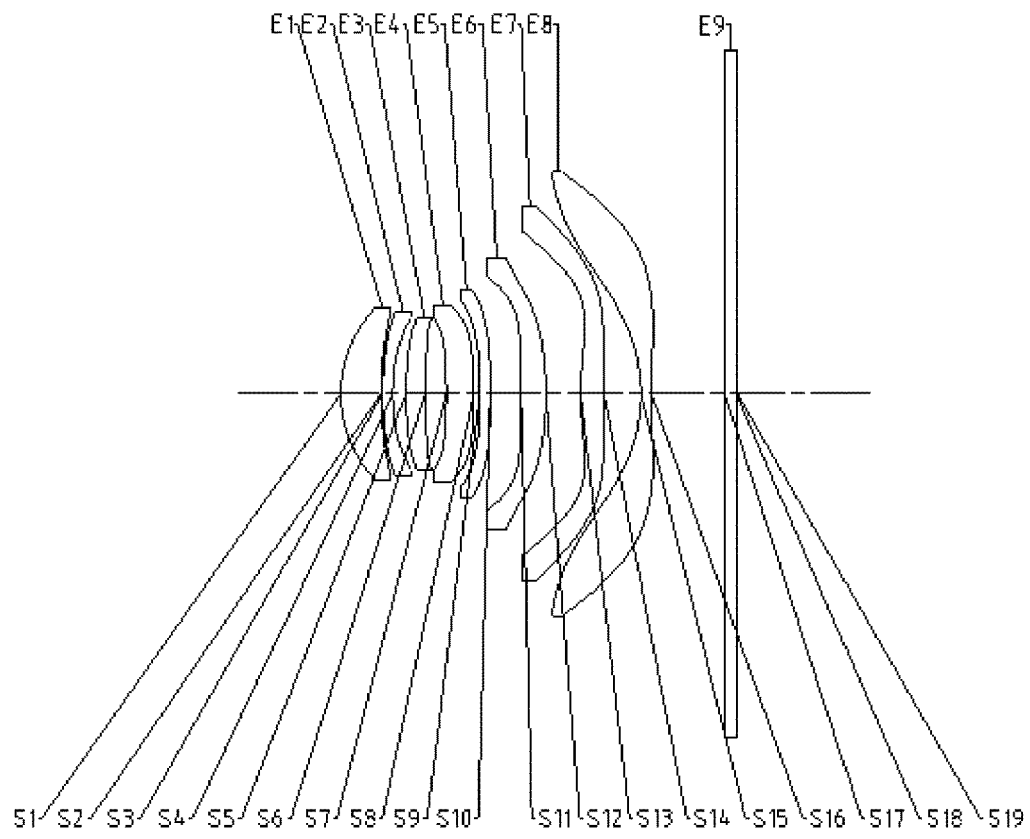
FIG. 13 shows a structure diagram of a camera lens group according to embodiment 7 of the disclosure.

A camera lens group according to embodiment 7 of the disclosure will be described below with reference to FIG. 13 to FIG. 14D. FIG. 13 is a structure diagram of a camera lens group according to embodiment 7 of the disclosure.

As shown in FIG. 13, the camera lens group sequentially includes, from an object side to an Image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a concave surface, and an image-side surface S8 is a convex surface. The fifth lens E5 has negative focal power, an object-side surface S9 thereof is a concave surface, and an image-side surface S10 is a convex surface. The sixth lens E6 has positive focal power, an object-side surface S11 thereof is a concave surface, and an image-side surface S12 is a convex surface. The seventh lens E7 has positive focal power, an object-side surface S13 thereof is a convex surface, and an image-side surface S14 is a convex surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 13 is a basic parameter table of the camera lens group of embodiment 7, and units of the curvature radius, the thickness and the focal length therein are all millimeter (mm). Table 14 shows high-order coefficients applied to each aspherical mirror surface in embodiment 7. A surface type of each aspherical surface may be defined by formula (1) given in embodiment 1.

TABLE 13

Embodiment 7: f = 7.68 mm, TTL = 8.79 mm

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.7392 | | | | |
| S1 | Aspherical | 2.7934 | 0.8936 | 1.547 | 56.1 | 7.40 | 0.0000 |
| S2 | Aspherical | 8.0171 | 0.0300 | | | | 0.0000 |
| S3 | Aspherical | 7.0158 | 0.2300 | 1.680 | 20.4 | −18.21 | 0.0000 |
| S4 | Aspherical | 4.4178 | 0.2951 | | | | 0.0000 |
| S5 | Aspherical | 7.8017 | 0.4249 | 1.547 | 56.1 | 31.86 | 14.0675 |
| S6 | Aspherical | 13.8650 | 0.4713 | | | | −0.4726 |
| S7 | Aspherical | −19.1775 | 0.6100 | 1.571 | 37.3 | 50.10 | 0.0000 |
| S8 | Aspherical | −11.6160 | 0.1325 | | | | 0.0000 |
| S9 | Aspherical | −20.7488 | 0.2300 | 1.680 | 20.4 | −32.07 | 0.0000 |
| S10 | Aspherical | −435.5679 | 0.6861 | | | | 0.0000 |
| S11 | Aspherical | −83.8721 | 0.5462 | 1.571 | 37.3 | 19.01 | 0.0000 |
| S12 | Aspherical | −9.6356 | 0.7603 | | | | 0.0000 |
| S13 | Aspherical | 6.6506 | 0.5194 | 1.547 | 56.1 | 11.37 | −5.6500 |
| S14 | Aspherical | −91.9830 | 0.8195 | | | | 0.0000 |
| S15 | Aspherical | −3.6944 | 0.2300 | 1.537 | 55.7 | −5.31 | −1.3105 |
| S16 | Aspherical | 12.8082 | 1.6341 | | | | 0.0000 |
| S17 | Spherical | Infinite | 0.2500 | 1.517 | 64.2 | | |
| S18 | Spherical | Infinite | 0.0300 | | | | |
| S19 | Spherical | Infinite | | | | | |

TABLE 14

| Surface number | A4 | A6 | A8 | A10 | A12 | A14 | A16 | A18 | A20 |
|---|---|---|---|---|---|---|---|---|---|
| S1 | −2.7887E−04 | 1.4501E−03 | −9.6306E−04 | 2.9002E−04 | −3.6306E−05 | −1.7550E−06 | 4.7216E−07 | −4.4864E−08 | 0.0000E+00 |
| S2 | 6.0095E−03 | −1.1602E−02 | 7.2320E−03 | −1.9868E−03 | 2.2647E−04 | −6.2212E−06 | 0.0000E+00 | 0.0000E+00 | 0.0000E+00 |
| S3 | 6.9039E−03 | −1.0389E−02 | 5.6529E−03 | −3.9508E−04 | −4.3219E−04 | 1.1741E−04 | −8.2355E−06 | 0.0000E+00 | 0.0000E+00 |
| S4 | 6.0185E−03 | −1.7551E−03 | 3.7019E−04 | 1.3123E−03 | −7.7737E−04 | 1.8602E−04 | −1.8520E−05 | 0.0000E+00 | 0.0000E+00 |
| S5 | −9.7917E−03 | 2.4470E−02 | −4.7121E−03 | 5.3105E−02 | −3.6767E−02 | 1.6023E−02 | −4.2577E−03 | 6.3085E−04 | −3.9959E−05 |
| S6 | 4.0583E−04 | −1.2518E−02 | 2.9623E−02 | −3.7636E−02 | 2.8427E−02 | −1.3059E−02 | 3.6232E−03 | −5.5947E−04 | 3.7415E−05 |
| S7 | −1 6047E−02 | 1.8168E−02 | −4.9497E−02 | 6.2693E−02 | −4.9052E−02 | 2.3922E−02 | −7.1114E−03 | 1.1814E−03 | −8.4290E−05 |
| S8 | 1.3915E−02 | −5.9417E−02 | 7.8465E−02 | −6.9218E−02 | 3.9471E−02 | −1.4604E−02 | 3.3795E−03 | −4.4246E−04 | 2.4933E−05 |
| S9 | −1.1155E−02 | −2.3882E−02 | 2.6300E−02 | −1.5487E−02 | 5.9623E−03 | 1.6415E−03 | 3.1981E−04 | −3.8444E−05 | 2.0485E−06 |
| S10 | −2.1661E−02 | −2.8923E−03 | 4.1674E−03 | −1.1979E−03 | 4.3811E−05 | 4.1125E−05 | −8.0422E−06 | 5.1185E−07 | −6.3287E−09 |
| S11 | −7.2063E−03 | 2.2967E−03 | −4.0531E−03 | 2.4422E−03 | −9.1256E−04 | 2.1654E−04 | −3.1568E−05 | 2.5438E−06 | −8.5404E−08 |
| S12 | −1.2293E−02 | 2.8734E−03 | −1.4255E−03 | 4.8669E−04 | −1.1662E−04 | 1.9565E−05 | −2.0311E−06 | 1.1359E−07 | −2.5957E−09 |
| S13 | −1.1307E−02 | −4.4616E−04 | −4.3686E−04 | 1.3900E−04 | −1.7513E−05 | 1.1706E−06 | −4.2174E−08 | 7.3299E−10 | −4.1961E−12 |
| S14 | 6.3836E−03 | −3.4475E−03 | 2.0125E−04 | 4.4659E−05 | −9.1660E−06 | 7.6218E−07 | −3.3818E−08 | 7.8412E−10 | −7.4667E−12 |
| S15 | 3.3108E−05 | −1.4162E−03 | 3.1543E−04 | −2.8388E−05 | 1.4206E−06 | −4.2922E−08 | 7.8140E−10 | −7.9113E−12 | 3.4242E−14 |
| S16 | −9.7345E−03 | 3.5550E−04 | 1.1909E−05 | −3.5129E−06 | 2.3581E−07 | −5.7364E−09 | −8.0818E−11 | 6.8605E−12 | −9.7226E−14 |

Figure 14A:
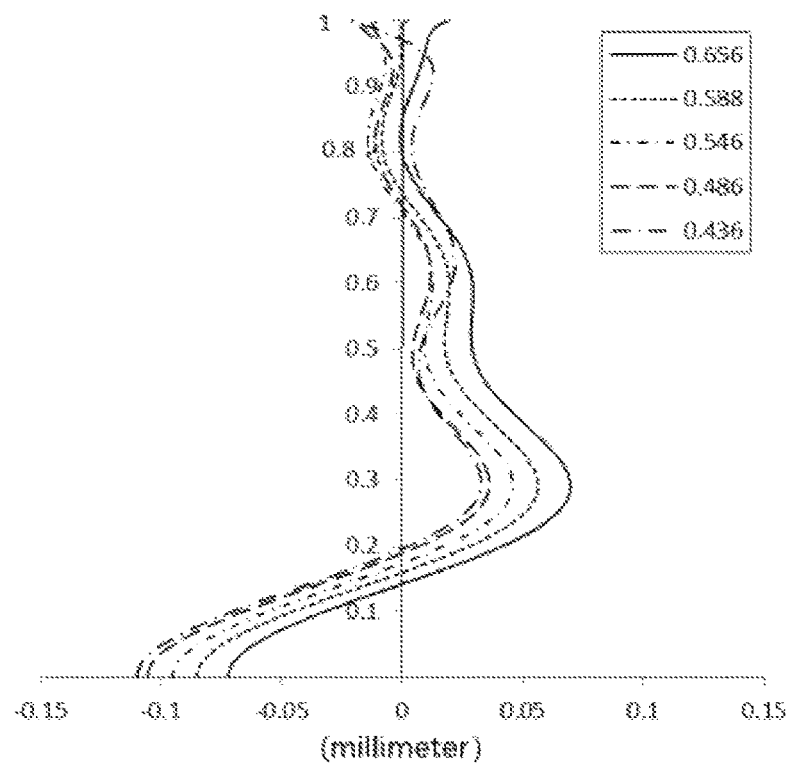
FIG. 14A to FIG. 14D show a longitudinal aberration curve, an astigmatism curve, a distortion curve and a lateral color curve of a camera lens group according to embodiment 7 respectively.
Figure 14B:
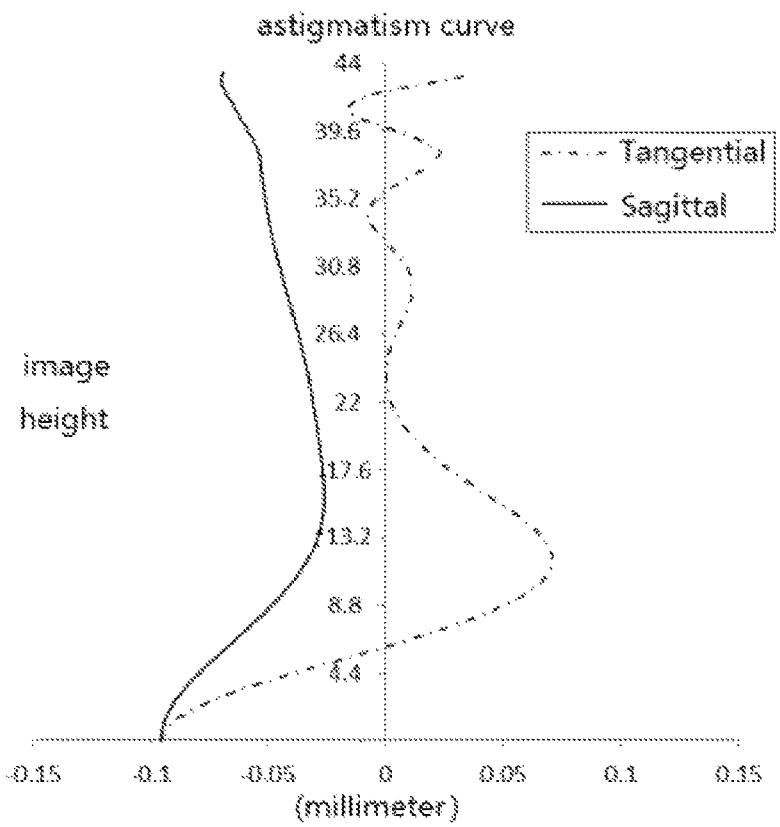
Figure 14C:
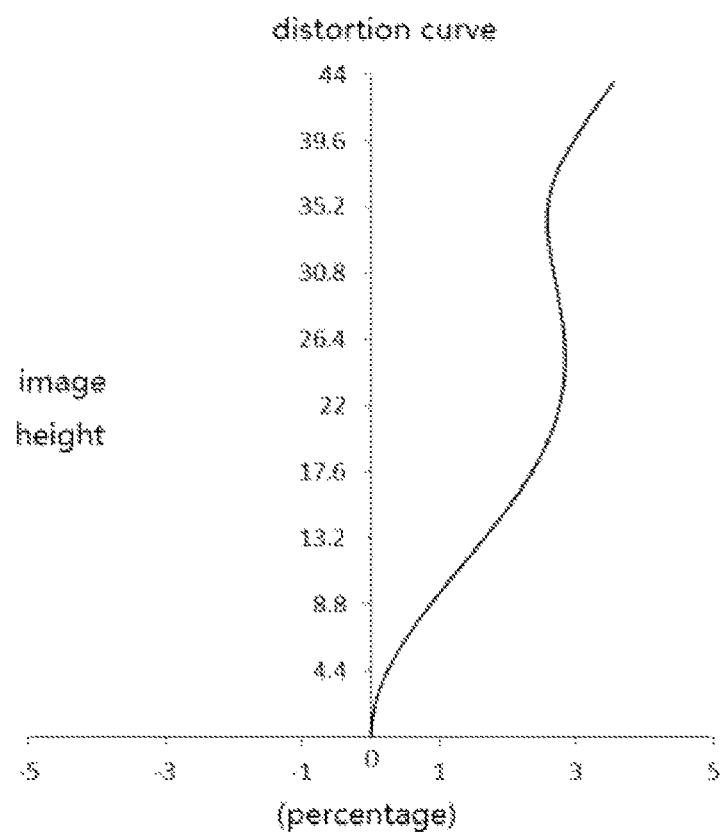
Figure 14D:
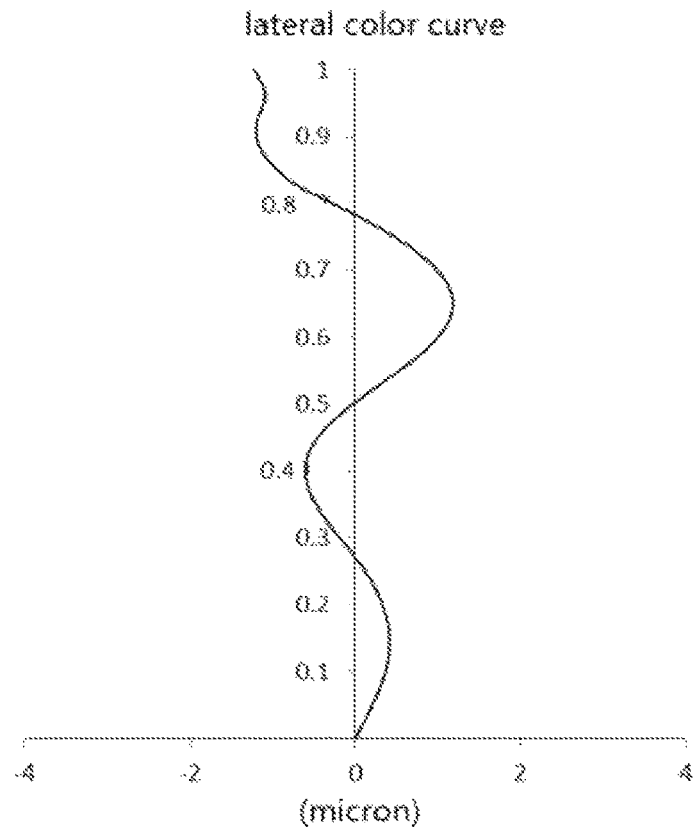

FIG. 14A illustrates a longitudinal aberration curve of the camera lens group according to embodiment 7 to represent deviation of a convergence focal point after light of different wavelengths passes through the lens. FIG. 14B illustrates an astigmatism curve of the camera lens group according to embodiment 7 to represent a meridian image surface curvature and a sagittal image surface curvature. FIG. 14C illustrates a distortion curve of the camera lens group according to embodiment 7 to represent a distortion value under different VOFs. FIG. 14D illustrates a lateral color curve of the camera lens group according to embodiment 7 to represent deviation of different image heights on the imaging surface after the light passes through the lens. According to FIG. 14A to FIG. 14D, it can be seen that high imaging quality of the camera lens group provided in embodiment 7 may be achieved.

Embodiment 8

Figure 15:
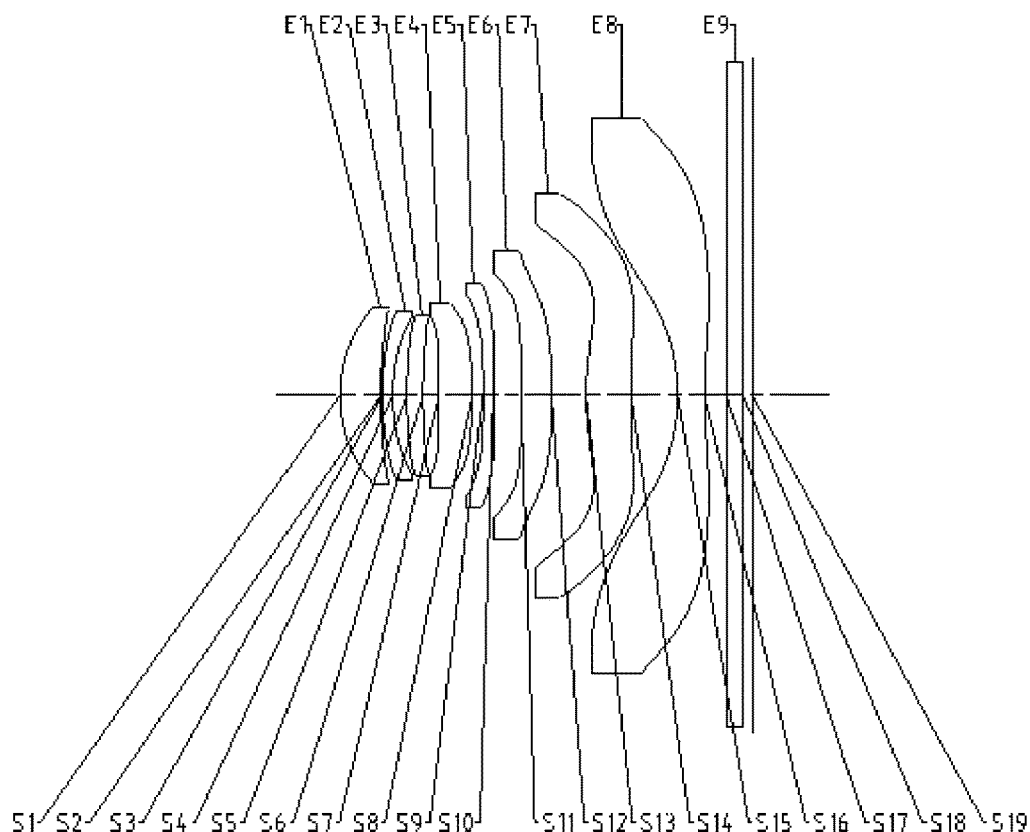
FIG. 15 shows a structure diagram of a camera lens group according to embodiment 8 of the disclosure.

A camera lens group according to embodiment 8 of the disclosure will be described below with reference to FIG. 15 to FIG. 16D. FIG. 15 is a structure diagram of a camera lens group according to embodiment 8 of the disclosure.

As shown in FIG. 15, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a convex surface, and an image-side surface S8 is a convex surface. The fifth lens E5 has negative focal power, an object-side surface S9 thereof is a convex surface, and an image-side surface S10 is a concave surface. The sixth lens E6 has positive focal power, an object-side surface S11 thereof is a convex surface, and an image-side surface S12 is a convex surface. The seventh lens E7 has positive focal power, an object-side surface S13 thereof is a convex surface, and an image-side surface S14 is a concave surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 15 is a basic parameter table of the camera lens group of embodiment 8, and units of the curvature radius, the thickness and the focal length therein are all millimeter (mm). Table 16 shows high-order coefficients applied to each aspherical mirror surface in embodiment 8. A surface type of each aspherical surface may be defined by formula (1) given in embodiment 1.

TABLE 15

Embodiment 8: f = 7.61 mm, TTL = 9.13 mm

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.7092 | | | | |
| S1 | Aspherical | 2.9921 | 0.9035 | 1.547 | 56.1 | 7.17 | 0.0027 |
| S2 | Aspherical | 11.2941 | 0.0343 | | | | 0.1537 |
| S3 | Aspherical | 6.6509 | 0.2309 | 1.680 | 20.4 | −18.77 | 0.5104 |
| S4 | Aspherical | 4.3102 | 0.3152 | | | | 0.0554 |
| S5 | Aspherical | 9.2870 | 0.3578 | 1.547 | 56.1 | 195.38 | 6.0321 |
| S6 | Aspherical | 10.0332 | 0.3512 | | | | 98.9825 |
| S7 | Aspherical | 2060.0000 | 0.7370 | 1.571 | 37.3 | 20.10 | 0.0000 |
| S8 | Aspherical | −11.5435 | 0.2402 | | | | 0.0000 |
| S9 | Aspherical | 2183.8241 | 0.2300 | 1.680 | 20.4 | −26.61 | 0.0000 |
| S10 | Aspherical | 17.9351 | 0.6149 | | | | 0.0000 |
| S11 | Aspherical | 376.5110 | 0.6757 | 1.571 | 37.3 | 40.65 | 0.0000 |
| S12 | Aspherical | −24.7318 | 0.7532 | | | | 0.0000 |
| S13 | Aspherical | 5.9405 | 0.9982 | 1.547 | 56.1 | 12.81 | 3.3641 |
| S14 | Aspherical | 36.8583 | 1.0377 | | | | 0.0000 |
| S15 | Aspherical | −4.0169 | 0.5845 | 1.537 | 55.7 | −5.41 | 1.2964 |
| S16 | Aspherical | 11.0561 | 0.4880 | | | | 0.0000 |
| S17 | Spherical | Infinite | 0.3728 | 1.517 | 64.2 | | |
| S18 | Spherical | Infinite | 0.2087 | | | | |
| S19 | Spherical | Infinite | | | | | |

TABLE 16

| Surface number | A4 | A6 | A8 | A10 | A12 | A14 | A16 | A18 | A20 |
|---|---|---|---|---|---|---|---|---|---|
| S1 | 1.6948E−05 | 1.5657E−03 | −2.4498E−03 | 2.2534E−03 | −1.3098E−03 | 4.7987E−04 | −1.0839E−04 | 1.3768E−05 | −7.5258E−07 |
| S2 | 3.1136E−03 | −9.7061E−03 | 1.2607E−02 | −1.0531E−02 | 5.8299E−03 | −2.0996E−03 | 4.7268E−04 | −6.0411E−05 | 3.3435E−06 |
| S3 | 3.9226E−03 | −9.8666E−03 | 1.5286E−02 | −1.4462E−02 | 9.1299E−03 | −3.7523E−03 | 9.6474E−04 | −1.4077E−04 | 8.8668E−06 |

TABLE 16-continued

| Surface number | A4 | A6 | A8 | A10 | A12 | A14 | A16 | A18 | A20 |
|---|---|---|---|---|---|---|---|---|---|
| S4 | 3.4763E−03 | −1.6964E−03 | 5.6565E−03 | −6.6126E−03 | 4.9974E−03 | −2.3896E−03 | 7.0014E−04 | −1.1336E−04 | 7.6176E−06 |
| S5 | −7.5605E−03 | 2.4243E−03 | −2.3027E−03 | 3.1102E−03 | −2.4643E−03 | 1.2489E−03 | −3.9017E−04 | 7.0852E−05 | −5.6676E−06 |
| S6 | 3.7453E−03 | −4.1427E−03 | 1.3898E−03 | 5.9969E−05 | −9.8691E−05 | −8.7628E−05 | 8.7951E−05 | −2.6354E−05 | 2.9256E−06 |
| S7 | −9 6117E−03 | −2.0743E−03 | −2.1531E−04 | −5.5110E−04 | 7.0119E−04 | −4.4010E−04 | 1.4531E−04 | −2.4515E−05 | 1.6114E−06 |
| S8 | −5.2738E−03 | −1.0622E−02 | 1.1165E−02 | −9.1498E−03 | 4.8019E−03 | −1.6149E−03 | 3.3708E−04 | −3.9681E−05 | 2.0022E−06 |
| S9 | −1.4837E−02 | −8.0829E−03 | 7.5887E−03 | −3.3334E−03 | 7.9559E−04 | −7.6287E−05 | −7.0335E−06 | 2.3260E−06 | −1.6350E−07 |
| S10 | −1.3854E−02 | −6.0813E−03 | 6.2089E−03 | −2.9741E−03 | 9.1980E−04 | −1.9137E−04 | 2.5860E−05 | −2.0473E−06 | 7.1474E−08 |
| S11 | −3.9146E−03 | −2.6588E−03 | 9.2497E−04 | −2.2220E−04 | 1.1498E−05 | 7.4110E−06 | −1.9672E−06 | 1.9587E−07 | −6.9409E−09 |
| S12 | −1.0093E−02 | −2.2755E−04 | 3.2843E−04 | −9.8645E−05 | 1.7470E−05 | −1.8236E−06 | 1.2538E−07 | −5.7059E−09 | 1.2597E−10 |
| S13 | −6.3302E−03 | −7.0317E−04 | −3.4840E−05 | −5.8009E−06 | 6.4692E−06 | −1.1282E−06 | 8.7221E−08 | −3.1877E−09 | 4.4807E−11 |
| S14 | 6.3389E−03 | −1.8493E−03 | −7.5379E−05 | 4.3550E−05 | −4.4855E−06 | 2.0119E−07 | −2.9102E−09 | −6.1004E−11 | 1.7956E−12 |
| S15 | 1.9029E−03 | −1.7940E−03 | 3.5015E−04 | −3.0643E−05 | 1.5369E−06 | −4.7385E−08 | 8.9303E−10 | −9.4804E−12 | 4.3547E−14 |
| S16 | −3.8584E−03 | −8.9194E−04 | 2.0186E−04 | −1.8892E−05 | 9.9315E−07 | 3.1419E−08 | 5.9280E−10 | −6.1342E−12 | 2.6740E−14 |

Figure 16A:
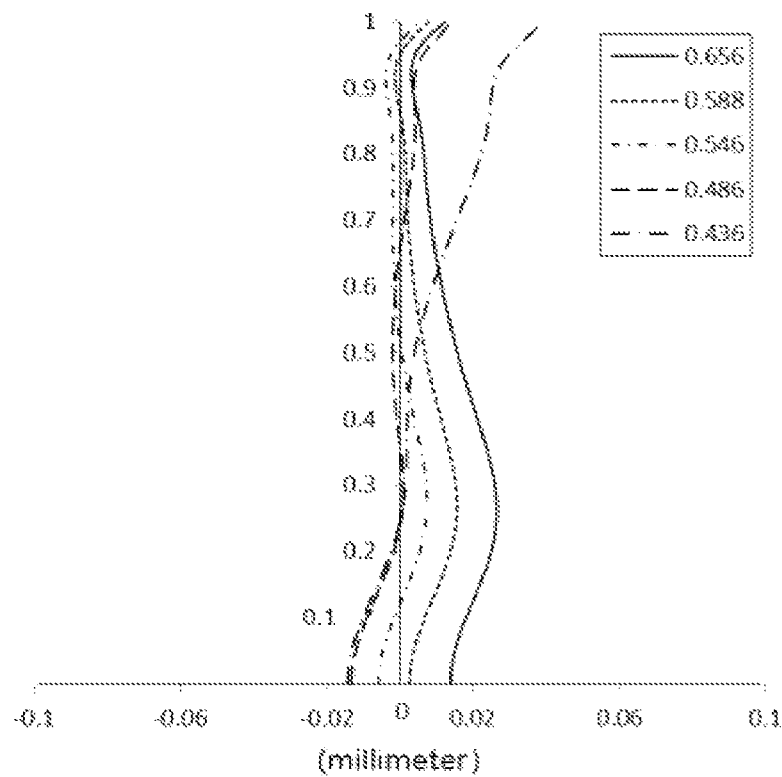
FIG. 16A to FIG. 16D show a longitudinal aberration curve, an astigmatism curve, a distortion curve and a lateral color curve of a camera lens group according to embodiment 8 respectively.
Figure 16B:
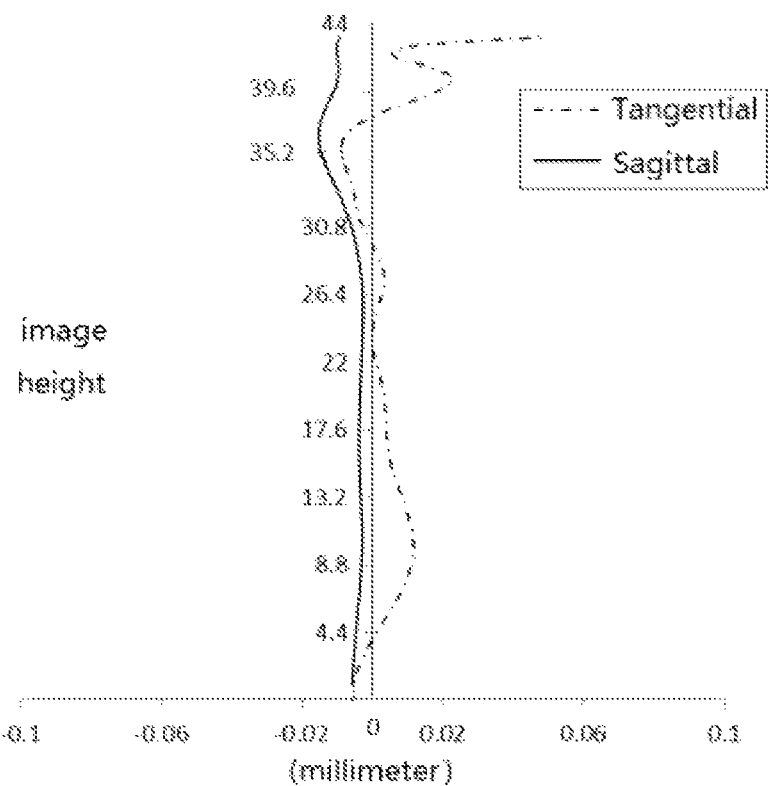
Figure 16C:
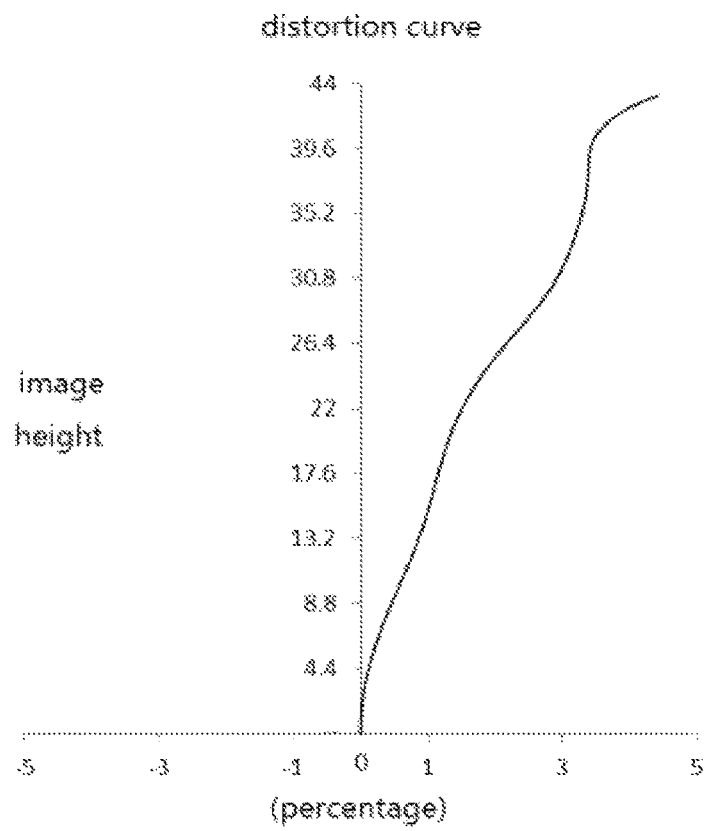
Figure 16D:
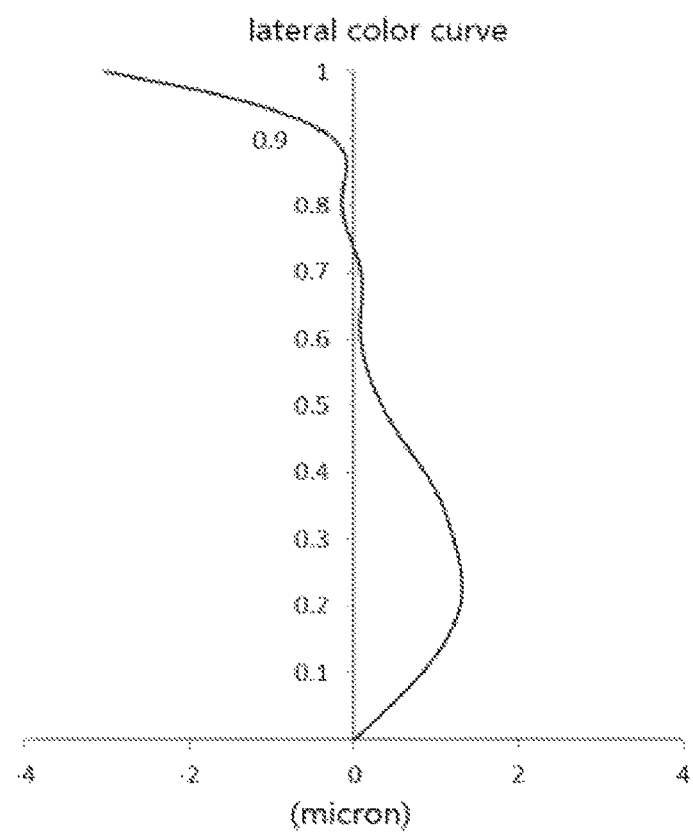

FIG. 16A illustrates a longitudinal aberration curve of the camera lens group according to embodiment 8 to represent deviation of a convergence focal point after light of different wavelengths passes through the lens. FIG. 16B illustrates an astigmatism curve of the camera lens group according to embodiment 8 to represent a meridian image surface curvature and a sagittal image surface curvature. FIG. 16C illustrates a distortion curve of the camera lens group according to embodiment 8 to represent a distortion value under different VOFs. FIG. 16D illustrates a lateral color curve of the camera lens group according to embodiment 8 to represent deviation of different image heights on the imaging surface after the light passes through the lens. According to FIG. 16A to FIG. 16D, it can be seen that high imaging quality of the camera lens group provided in embodiment 8 may be achieved.

Embodiment 9

Figure 17:
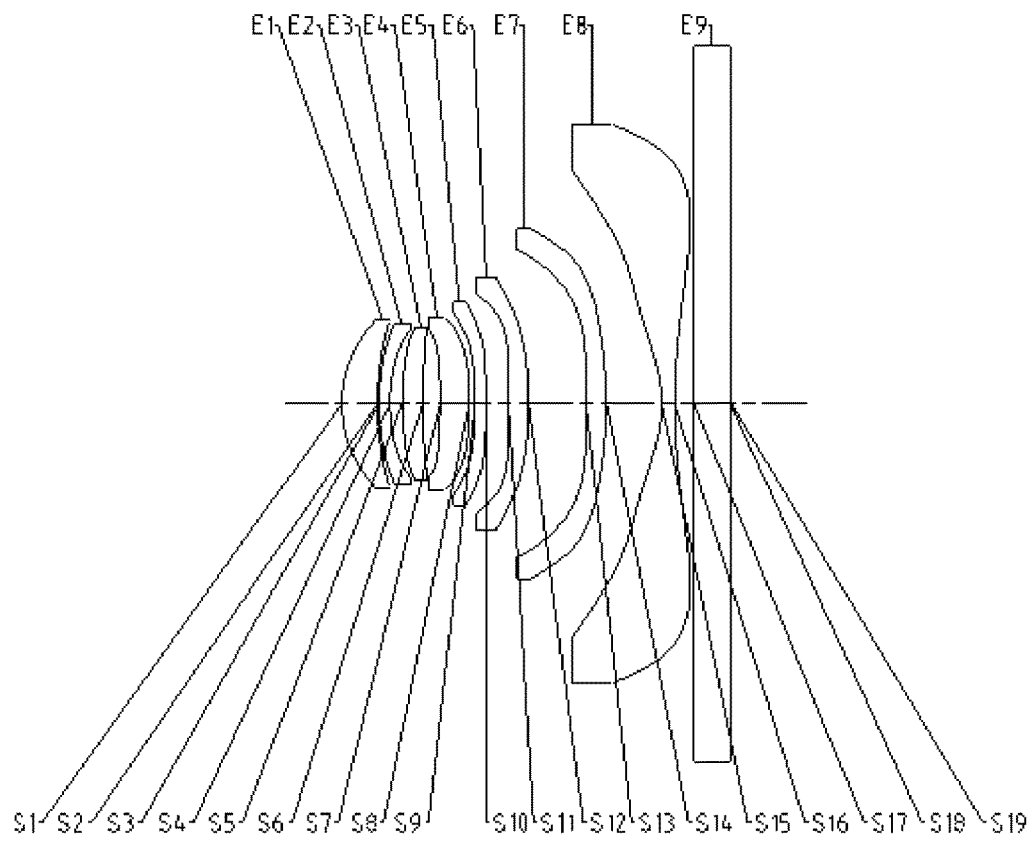
FIG. 17 shows a structure diagram of a camera lens group according to embodiment 9 of the disclosure.

A camera lens group according to embodiment 9 of the disclosure will be described below with reference to FIG. 17 to FIG. 18D. FIG. 17 is a structure diagram of a camera lens group according to embodiment 9 of the disclosure.

As shown in FIG. 17, the camera lens group sequentially includes, from an object side to an Image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a concave surface, and an image-side surface S8 is a convex surface. The fifth lens E5 has negative focal power, an object-side surface S9 thereof is a concave surface, and an image-side surface S10 is a convex surface. The sixth lens E6 has positive focal power, an object-side surface S11 thereof is a convex surface, and an image-side surface S12 is a convex surface. The seventh lens E7 has positive focal power, an object-side surface S13 thereof is a convex surface, and an image-side surface S14 is a convex surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 17 is a basic parameter table of the camera lens group of embodiment 9, and units of the curvature radius, the thickness and the focal length therein are all millimeter (mm). Table 18 shows high-order coefficients applied to each aspherical mirror surface in embodiment 9. A surface type of each aspherical surface may be defined by formula (1) given in embodiment 1.

TABLE 17

Embodiment 9: f = 7.22 mm, TTL = 8.61 mm

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −0.7355 | | | | |
| S1 | Aspherical | 2.7616 | 0.7875 | 1.547 | 56.1 | 8.06 | 0.0000 |
| S2 | Aspherical | 6.6604 | 0.0416 | | | | 0.0000 |
| S3 | Aspherical | 5.7448 | 0.2300 | 1.680 | 20.4 | −19.32 | 0.0000 |
| S4 | Aspherical | 3.9315 | 0.2758 | | | | 0.0000 |
| S5 | Aspherical | 6.8558 | 0.4565 | 1.547 | 56.1 | 23.65 | 12.2865 |
| S6 | Aspherical | 14.2561 | 0.3836 | | | | −79.8427 |
| S7 | Aspherical | −21.9920 | 0.6484 | 1.571 | 37.3 | 20.31 | 0.0000 |
| S8 | Aspherical | −7.6759 | 0.1306 | | | | 0.0000 |
| S9 | Aspherical | 10.3366 | 0.2300 | 1.680 | 20.4 | −17.60 | 0.0000 |

TABLE 17-continued

Embodiment 9: f = 7.22 mm, TTL = 8.61 mm

| Surface number | Surface type | Curvature radius | Thickness | Material Refractive index | Abbe number | Focal length | Conic coefficient |
|---|---|---|---|---|---|---|---|
| S10 | Aspherical | −76.8354 | 0.5059 | | | | 0.0000 |
| S11 | Aspherical | 149.8887 | 0.4423 | 1.571 | 37.3 | 16.59 | 0.0000 |
| S12 | Aspherical | −10.1058 | 1.2613 | | | | 0.0000 |
| S13 | Aspherical | 72.8070 | 0.4541 | 1.547 | 56.1 | 15.96 | −2.5167E+09 |
| S14 | Aspherical | −9.8888 | 1.2204 | | | | 0.0000 |
| S15 | Aspherical | −3.0695 | 0.2832 | 1.537 | 55.7 | −4.72 | −1.3951 |
| S16 | Aspherical | 15.1418 | 0.4314 | | | | 0.0000 |
| S17 | Spherical | Infinite | 0.8011 | 1.517 | 64.2 | | |
| S18 | Spherical | Infinite | 0.0300 | | | | |
| S19 | Spherical | Infinite | | | | | |

TABLE 18

| Surface number | A4 | A6 | A8 | A10 | A12 | A14 | A16 | A18 | A20 |
|---|---|---|---|---|---|---|---|---|---|
| S1 | −2.9992E−04 | 1.6174E−03 | −1.1139E−03 | 3.4787E−04 | −4.5162E−05 | −2.2639E−06 | 6.3165E−07 | −6.2242E−08 | 0.0000E+00 |
| S2 | 5.8212E−03 | −1.1061E−02 | 6.7859E−03 | −1.8348E−03 | 2.0584E−04 | −5.5652E−06 | 0.0000E+00 | 0.0000E+00 | 0.0000E+00 |
| S3 | 7.1158E−03 | −1.0871E−02 | 6.0052E−03 | −4.2609E−04 | −4.7322E−04 | 1.3051E−04 | −9.2941E−06 | 0.0000E+00 | 0.0000E+00 |
| S4 | 6.9553E−03 | −2.1804E−03 | 4.9440E−04 | 1.8841E−03 | −1.1998E−03 | 3.1196E−04 | −3.3034E−05 | 0.0000E+00 | 0.0000E+00 |
| S5 | −4.0816E−03 | −5.6997E−04 | −1.4612E−03 | 3.1179E−03 | −2.9011E−03 | 1.6775E−03 | −5.7618E−04 | 1.1058E−04 | −9.2533E−06 |
| S6 | 2.1172E−03 | −6.1942E−03 | 9.1211E−03 | −1.0395E−02 | 8.0071E−03 | −3.9741E−03 | 1.2574E−03 | −2.3008E−04 | 1.8936E−05 |
| S7 | −5.9789E−03 | −1.3913E−02 | 1.6450E−02 | −1.7747E−02 | 1.2162E−02 | −5.3323E−03 | 1.4217E−03 | −2.0661E−04 | 1.2013E−05 |
| S8 | 2.7499E−02 | −7.2709E−02 | 8.0513E−02 | −6.1544E−02 | 3.0841E−02 | −1.0051E−02 | 2.0653E−03 | −2.4414E−04 | 1.2655E−05 |
| S9 | 3.1789E−02 | −1.0150E−01 | 1.1115E−01 | −7.6263E−02 | 3.8739E−02 | −9.6978E−03 | 1.7312E−03 | −1.7549E−04 | 7.6981E−06 |
| S10 | 4.3050E−03 | −5.0444E−02 | 5.1887E−02 | −3.1555E−02 | 1.2360E−02 | −3.1349E−03 | 4.9617E−04 | −4.4386E−05 | 1.7060E−06 |
| S11 | −3.0907E−03 | −7.5016E−03 | 1.3384E−03 | 5.0482E−04 | −3.6968E−04 | 9.5791E−05 | −1.2940E−05 | 8.4746E−07 | −1.6687E−08 |
| S12 | −1.0862E−03 | −2.6101E−03 | −7.1455E−04 | 8.3610E−04 | −2.8131E−04 | 5.1099E−05 | −5.3537E−06 | 3.0360E−07 | −7.1885E−09 |
| S13 | −1.1240E−02 | 5.9023E−04 | −1.8860E−04 | 1.4953E−05 | 3.5617E−06 | −7.6619E−07 | 5.5828E−08 | −1.7876E−09 | 2.1260E−11 |
| S14 | −3.2500E−03 | 1.5850E−03 | −1.7474E−04 | −2.8546E−05 | 8.2093E−06 | −8.2455E−07 | 4.1746E−08 | −1.0550E−09 | 1.0565E−11 |
| S15 | 1.1584E−02 | 1.7761E−04 | −1.5066E−04 | 1.3092E−05 | −5.5606E−07 | 1.3386E−08 | −1.8494E−10 | 1.3655E−12 | −4.1769E−15 |
| S16 | 1.0054E−03 | −2.7023E−04 | 1.7937E−05 | −6.9870E−07 | 1.6653E−08 | −2.7806E−10 | 3.1533E−12 | −2.0911E−14 | 5.9406E−17 |

Figure 18A:
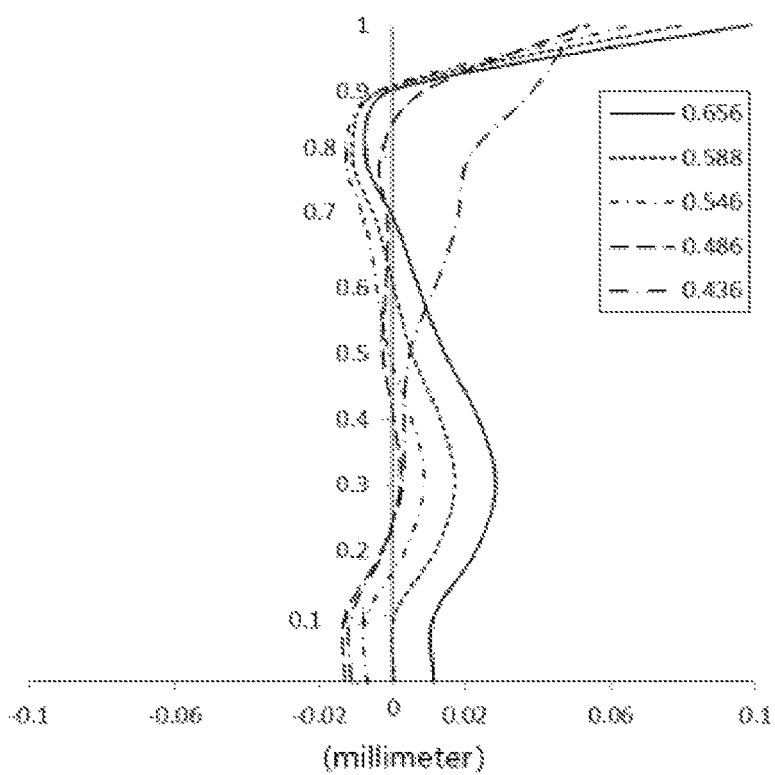
FIG. 18A to FIG. 18D show a longitudinal aberration curve, an astigmatism curve, a distortion curve and a lateral color curve of a camera lens group according to embodiment 9 respectively.
Figure 18B:
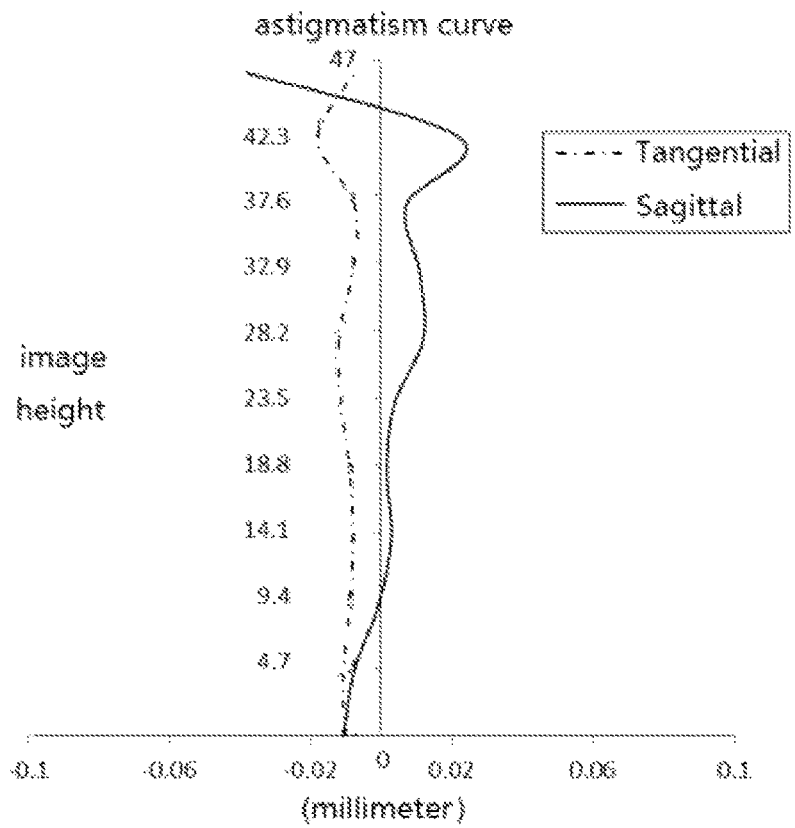
Figure 18C:
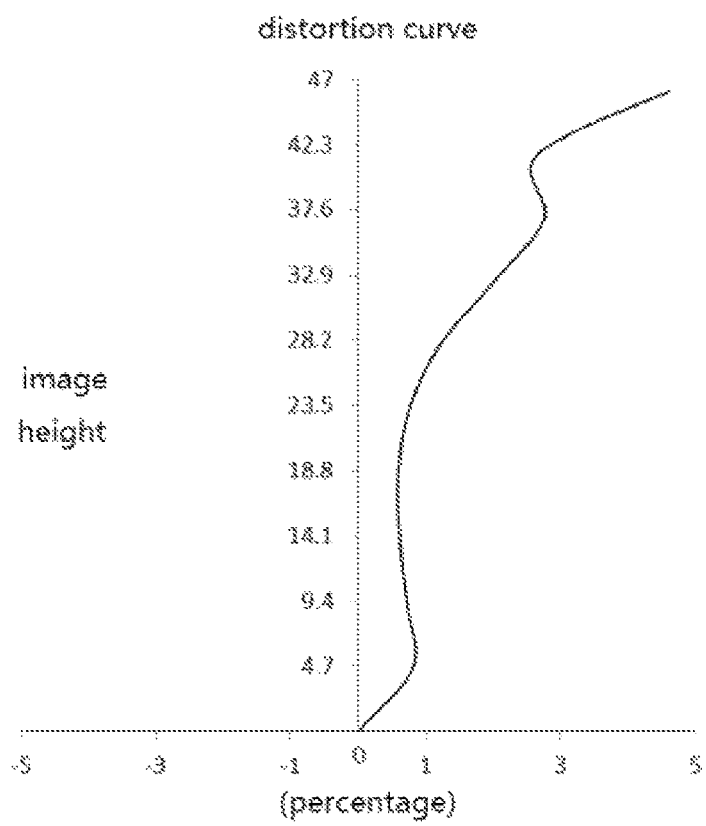
Figure 18D:
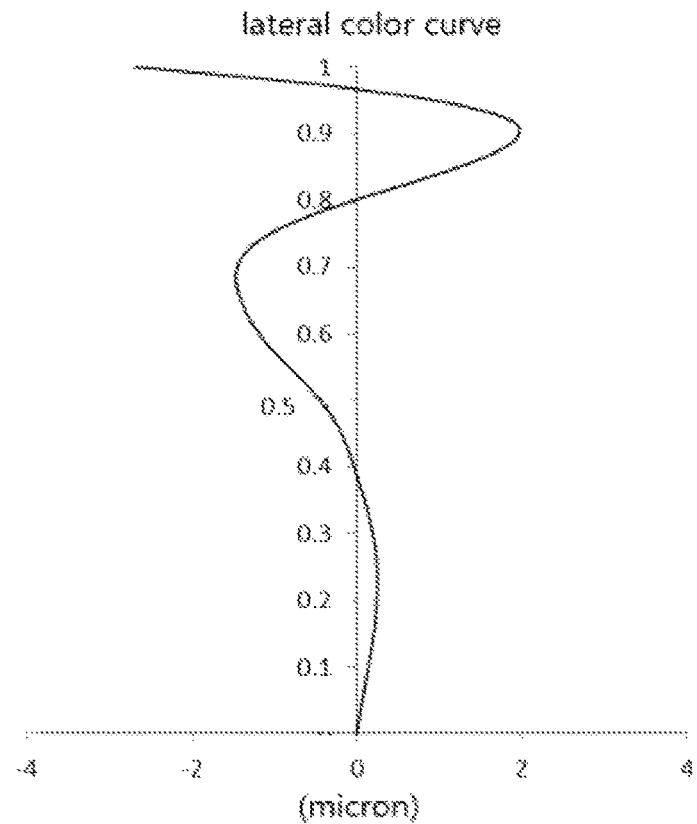

FIG. 18A illustrates a longitudinal aberration curve of the camera lens group according to embodiment 9 to represent deviation of a convergence focal point after light of different wavelengths passes through the lens. FIG. 18B illustrates an astigmatism curve of the camera lens group according to embodiment 9 to represent a meridian image surface curvature and a sagittal image surface curvature. FIG. 18C illustrates a distortion curve of the camera lens group according to embodiment 9 to represent a distortion value under different VOFs. FIG. 18D illustrates a lateral color curve of the camera lens group according to embodiment 9 to represent deviation of different image heights on the imaging surface after the light passes through the lens. According to FIG. 18A to FIG. 18D, it can be seen that high imaging quality of the camera lens group provided in embodiment 9 may be achieved.

Embodiment 10

Figure 19:
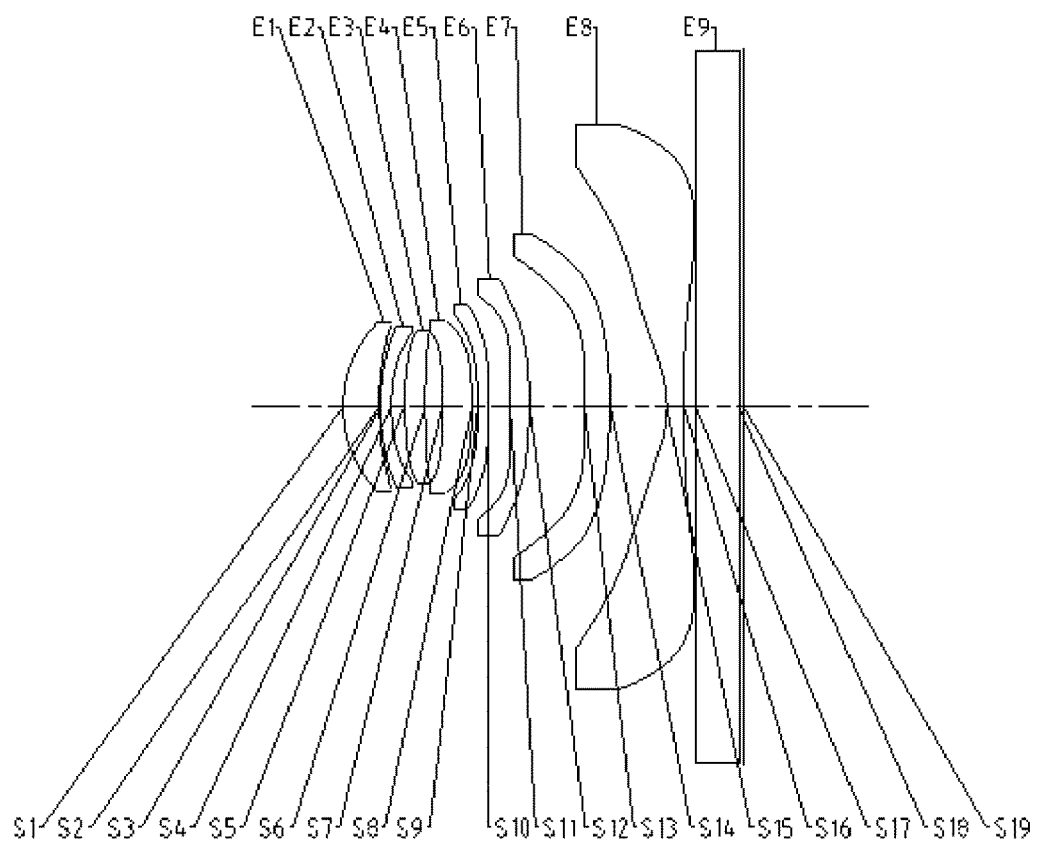
FIG. 19 shows a structure diagram of a camera lens group according to embodiment 10 of the disclosure.

A camera lens group according to embodiment 10 of the disclosure will be described below with reference to FIG. 19 to FIG. 20D. FIG. 19 is a structure diagram of a camera lens group according to embodiment 10 of the disclosure.

As shown in FIG. 19, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a concave surface, and an image-side surface S8 is a convex surface. The fifth lens E5 has negative focal power, an object-side surface S9 thereof is a concave surface, and an image-side surface S10 is a convex surface. The sixth lens E6 has positive focal power, an object-side surface S11 thereof is a convex surface, and an image-side surface S12 is a convex surface. The seventh lens E7 has positive focal power, an object-side surface S13 thereof is a convex surface, and an image-side surface S14 is a convex surface. The eighth lens E8 has negative focal power, an object-side surface S15 thereof is a concave surface, and an image-side surface S16 is a convex surface. The optical filter E9 has an object-side surface S17 and an image-side surface S18. Light from an object sequentially penetrates through each of the surfaces S1 to S18 and is finally image on the Imaging surface S19.

Although not shown, a diaphragm may be arranged between the object side and the first lens E1 to further improve the imaging quality of a camera lens.

Table 19 is a basic parameter table of the camera lens group of embodiment 10, and units of the curvature radius, the thickness and the focal length therein are all millimeter (mm). Table 20 shows high-order coefficients applied to each aspherical mirror surface in embodiment 10. A surface type of each aspherical surface may be defined by formula (1) given in embodiment 1.

TABLE 19

Embodiment 10: f = 7.19 mm, TTL = 8.82 mm

| Surface number | Surface type | Curvature radius | Thickness | Material Refractive index | Abbe number | Focal length | Conic coefficient |
|---|---|---|---|---|---|---|---|
| OBJ | Spherical | Infinite | Infinite | | | | |
| STO | Spherical | Infinite | 0.7439 | | | | |
| S1 | Aspherical | 2.7546 | 0.7858 | 1.547 | 56.1 | 8.14 | 0.0000 |
| S2 | Aspherical | 6.5076 | 0.0405 | | | | 0.0000 |
| S3 | Aspherical | 5.5072 | 0.2300 | 1.680 | 20.4 | −19.98 | 0.0000 |
| S4 | Aspherical | 3.8517 | 0.2911 | | | | 0.0000 |
| S5 | Aspherical | 6.8563 | 0.4604 | 1.547 | 56.1 | 23.80 | 12.1915 |
| S6 | Aspherical | 14.1584 | 0.3865 | | | | −79.7042 |
| S7 | Aspherical | −24.5626 | 0.6487 | 1.571 | 37.3 | 21.10 | 0.0000 |
| S8 | Aspherical | −8.1644 | 0.1315 | | | | 0.0000 |
| S9 | Aspherical | −9.8625 | 02300 | 1.680 | 20.4 | −18.15 | 0.0000 |
| S10 | Aspherical | −49.7218 | 0.4847 | | | | 0.0000 |
| S11 | Aspherical | 54.6452 | 0.4243 | 1.571 | 37.3 | 17.54 | 0.0000 |
| S12 | Aspherical | −12.2330 | 1.1979 | | | | 0.0000 |
| S13 | Aspherical | 31.8177 | 0.5729 | 1.547 | 56.1 | 15.51 | −1.5743E+09 |
| S14 | Aspherical | −11 4820 | 1.2477 | | | | 0.0000 |
| S15 | Aspherical | −2.5574 | 0.3796 | 1.537 | 55.7 | −4.89 | −1.2931 |
| S16 | Aspherical | −99.6400 | 0.2562 | | | | 0.0000 |
| S17 | Spherical | Infinite | 0.9446 | 1.517 | 64.2 | | |
| S18 | Spherical | Infinite | 0.1104 | | | | |
| S19 | Spherical | Infinite | | | | | |

TABLE 20

| Surface number | A4 | A6 | A8 | A10 | A12 | A14 | A16 | A18 | A20 |
|---|---|---|---|---|---|---|---|---|---|
| S1 | −2.9258E−04 | 1.5583E−03 | −1.0600E−03 | 3.2698E−04 | −4.1927E−05 | −2.0758E−06 | 5.7205E−07 | −5.5675E−08 | 0.0000E+00 |
| S2 | 5.6559E−03 | −1.0593E−02 | 6.4059E−03 | −1.7073E−03 | 1.8880E−04 | −5.0313E−06 | 0.0000E+00 | 0.0000E+00 | 0.0000E+00 |
| S3 | 6.9498E−03 | −1.0493E−02 | 5.7283E−03 | −4.0168E−04 | 1.2016E−04 | −8.4568E−06 | 0.0000E+00 | 0.0000E+00 | 0.0000E+00 |
| S4 | 6.8697E−03 | −2.1403E−03 | 4.8231E−04 | 1.8266E−03 | −1.1560E−03 | 2.9873E−04 | −3.1438E−05 | 0.0000E+00 | 0.0000E+00 |
| S5 | −4.5075E−03 | 9.8244E−04 | −4.5043E−03 | 6.7681E−03 | −5.6357E−03 | 2.9460E−03 | −9.2796E−04 | 1.6348E−04 | −1.2544E−05 |
| S6 | 1.9478E−03 | −6.0650E−03 | 9.9639E−03 | −1.2438E−02 | 1.0216E−02 | −5.2968E−03 | 1.7105E−03 | −3.1285E−04 | 2.5125E−05 |
| S7 | −5.7459E−03 | −1.4662E−02 | 1.9675E−02 | −2.3825E−02 | 1.8507E−02 | −9.2071E−03 | 2.7985E−03 | −4.6976E−04 | 3.2873E−05 |
| S8 | 2.6575E−02 | −7.0931E−02 | 7.5841E−02 | −5.5763E−02 | 2.6842E−02 | −8.4395E−03 | 1.6877E−03 | −1.9600E−04 | 1.0032E−05 |
| S9 | 3.3118E−02 | −1.0488E−01 | 1.1288E−01 | −7.5252E−02 | 3.2339E−02 | 8.9779E−03 | 1.5646E−03 | −1.5623E−04 | 6.8110E−06 |
| S10 | 6.8367E−03 | −5.5990E−02 | 5.7047E−02 | −3.4077E−02 | 1.3088E−02 | −3.2653E−03 | 5.1081E−04 | −4.5354E−05 | 1.7352E−06 |
| S11 | 1.6280E−03 | −1.3865E−02 | 5.4763E−03 | −9.2125E−04 | −1.2553E−04 | 9.2117E−05 | −1.9166E−05 | 1.8595E−06 | −6.8785E−08 |
| S12 | 3.0481E−03 | −7.6582E−03 | 2.2395E−03 | −1.7126E−04 | −6.6845E−05 | 2.2082E−05 | −2.9166E−06 | 1.8725E−07 | −4.7721E−09 |
| S13 | −8.8160E−03 | −2.4459E−03 | 6.3371E−04 | −1.0520E−04 | 1.2144E−05 | −8.8423E−07 | 3.7065E−08 | −7.9657E−10 | 6.6327E−12 |
| S14 | −1.4960E−03 | −1.0786E−03 | 5.7189E−04 | −1.4387E−04 | 1.9282E−05 | −1.5073E−06 | 6.8273E−08 | −1.6432E−09 | 1.6187E−11 |
| S15 | 2.0483E−02 | −1.5374E−03 | 3.6955E−05 | 1.3048E−06 | −1.1370E−07 | 3.3137E−09 | −4.8963E−11 | 3.6669E−13 | −1.1059E−15 |
| S16 | 8.6917E−03 | −1.2334E−03 | 9.3510E−05 | −4.5101E−06 | 1.4183E−07 | 2.9075E−09 | 3.6972E−11 | −2.6313E−13 | 7.9844E−16 |

Figure 20A:
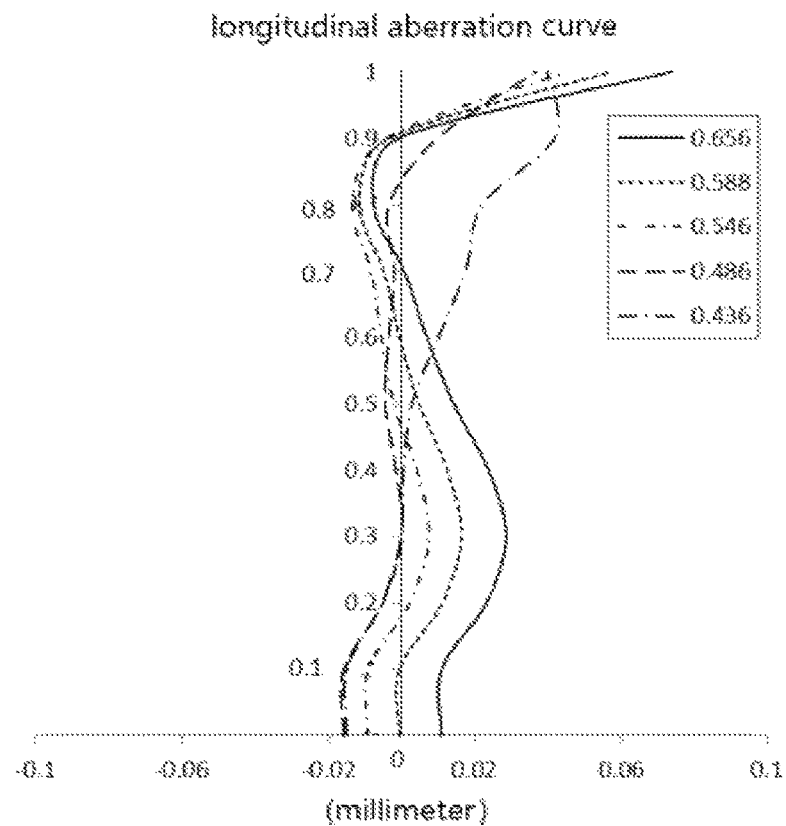
FIG. 20A to FIG. 20D show a longitudinal aberration curve, an astigmatism curve, a distortion curve and a lateral color curve of a camera lens group according to embodiment 10 respectively.
Figure 20B:
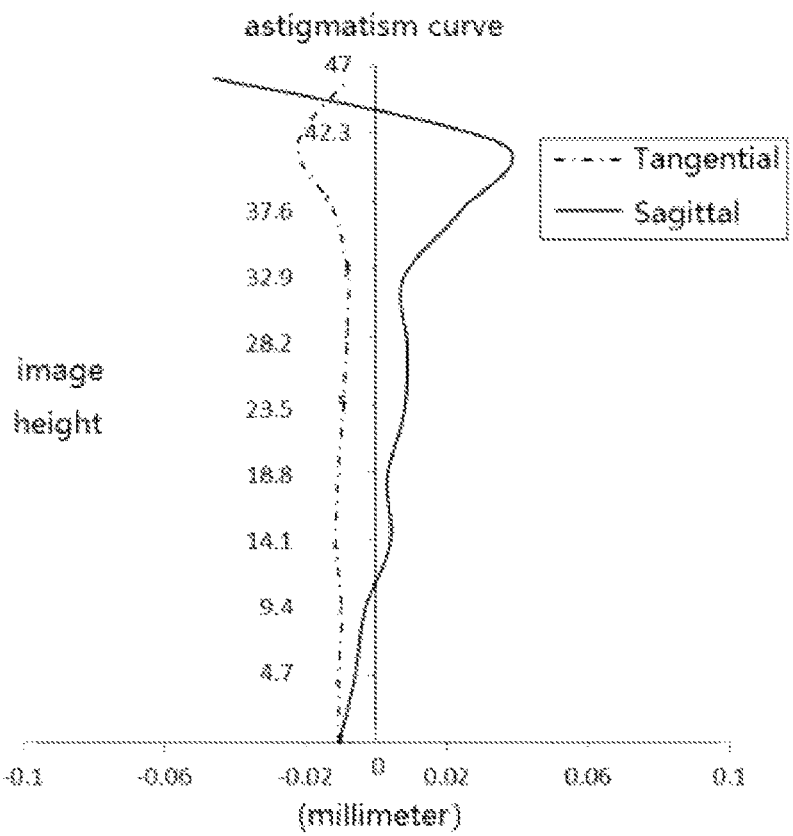
Figure 20C:
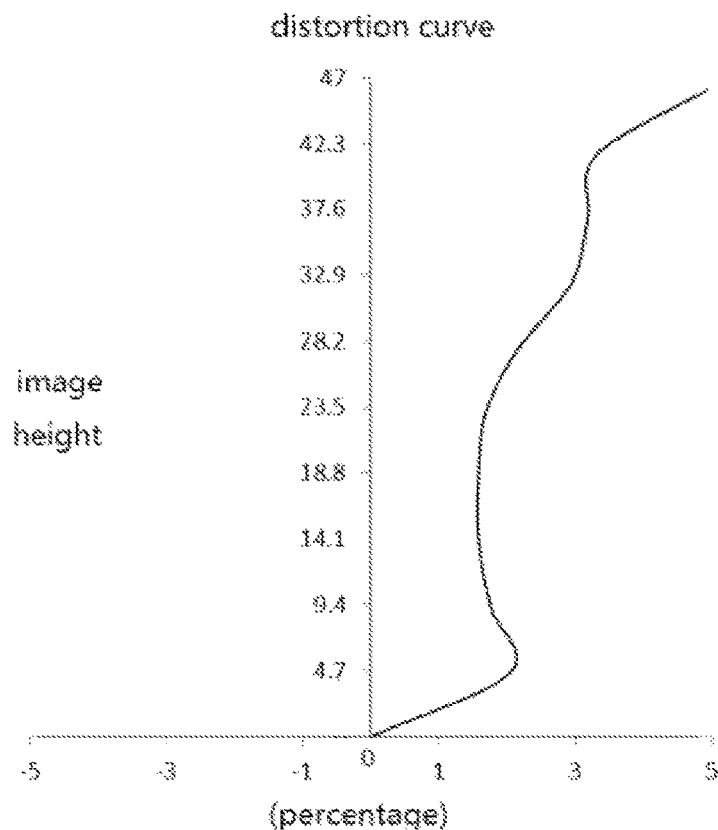
Figure 20D:
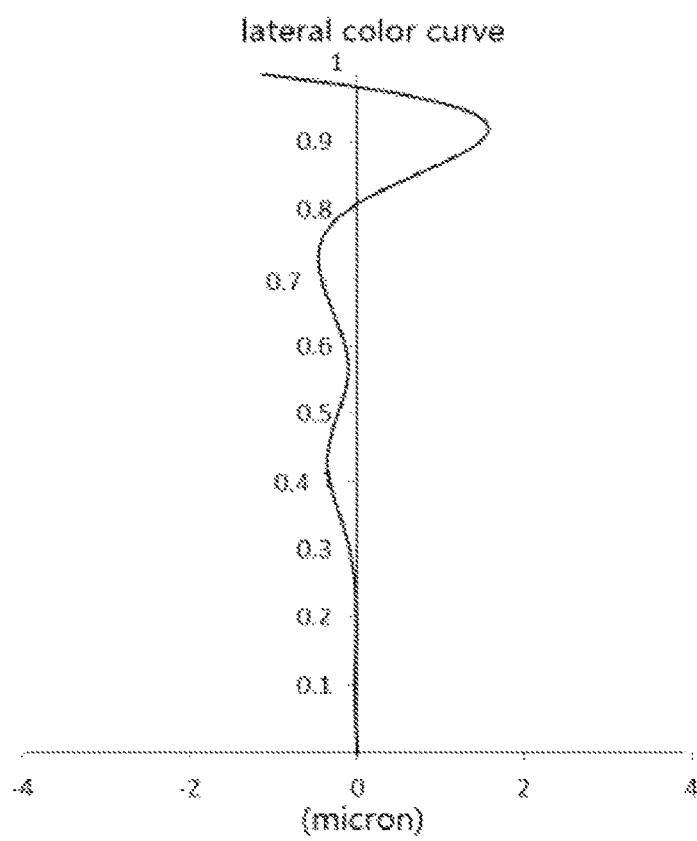

FIG. 20A illustrates a longitudinal aberration curve of the camera lens group according to embodiment 10 to represent deviation of a convergence focal point after light of different wavelengths passes through the lens. FIG. 20B illustrates an astigmatism curve of the camera lens group according to embodiment 10 to represent a meridian image surface curvature and a sagittal image surface curvature. FIG. 20C illustrates a distortion curve of the camera lens group according to embodiment 10 to represent a distortion value under different VOFs. FIG. 20D illustrates a lateral color curve of the camera lens group according to embodiment 10 to represent deviation of different image heights on the imaging surface after the light passes through the lens. According to FIG. 20A to FIG. 20D, it can be seen that high imaging quality of the camera lens group provided in embodiment 10 may be achieved.

Embodiment 11

Figure 21:
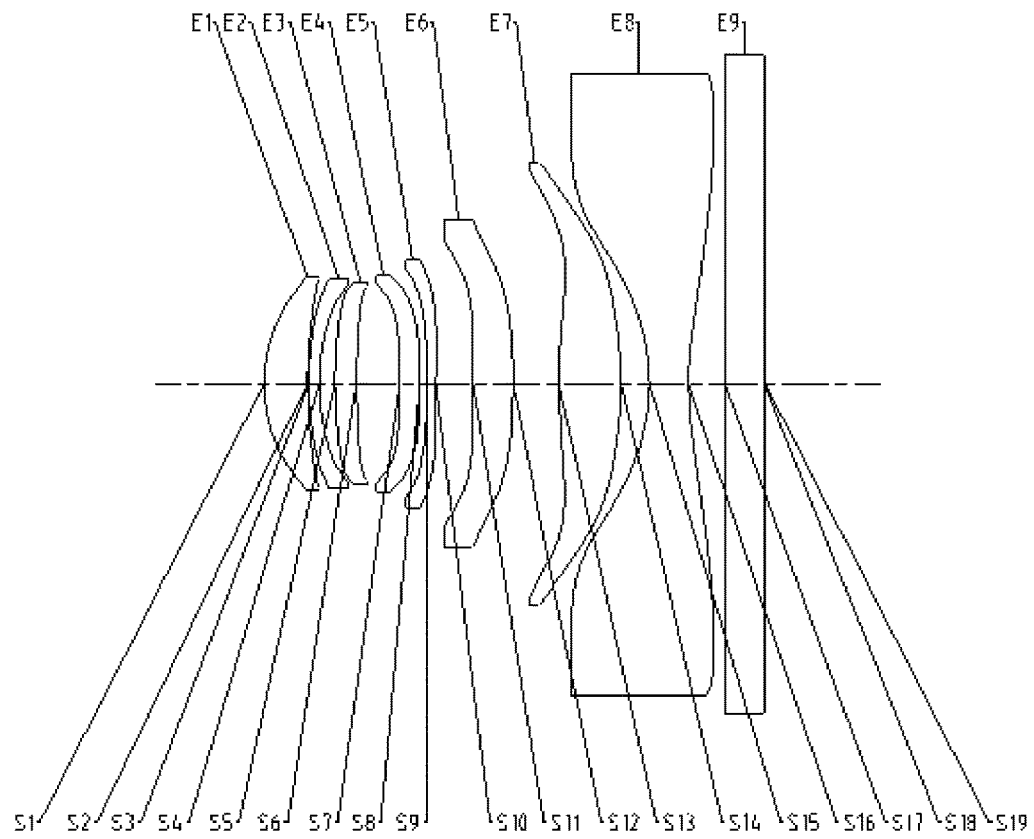
FIG. 21 shows a structure diagram of a camera lens group according to embodiment 11 of the disclosure.

A camera lens group according to embodiment 11 of the disclosure will be described below with reference to FIG. 21 to FIG. 22D. FIG. 21 is a structure diagram of a camera lens group according to embodiment 11 of the disclosure.

As shown in FIG. 21, the camera lens group sequentially includes, from an object side to an Image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an Image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a concave surface, and an image-side surface S8 is a convex surface. The fifth lens E5 has negative focal power, an object-side surface S9 thereof is a concave surface, and an image-side surface S10 is a concave surface. The sixth lens E6 has positive focal power, an object-side surface S11 thereof is a convex surface, and an image-side surface S12 is a convex surface. The seventh lens E7 has positive focal power, an object-side surface S13 thereof is a convex surface, and an image-side surface S14 is a convex surface. The eighth lens E8 has negative focal power, an object-side surface S15 thereof is a concave surface, and an image-side surface S16 is a concave surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further improve the imaging quality of a camera lens.

Table 21 is a basic parameter table of the camera lens group of embodiment 11, and units of the curvature radius, the thickness and the focal length therein are all millimeter (mm). Table 22 shows high-order coefficients applied to each aspherical mirror surface in embodiment 0.0. A surface type of each aspherical surface may be defined by formula (1) given in embodiment 1.

TABLE 21

Embodiment 11: f = 10.40 mm, TTL = 12.50 mm

| Surface number | Surface type | Curvature radius | Thickness | Material Refractive index | Material Abbe number | Focal length | Conic coefficient |
|---|---|---|---|---|---|---|---|
| OBJ | Spherical | Infinite | Infinite | | | | |
| STO | Spherical | Infinite | −1.0658 | | | | |
| S1 | Aspherical | 3.7249 | 1.0703 | 1.547 | 56.1 | 9.32 | 0.0339 |
| S2 | Aspherical | 12.4599 | 0.0300 | | | | 0.0000 |
| S3 | Aspherical | 8.5588 | 0.2693 | 1.680 | 20.4 | −26.22 | 0.4883 |
| S4 | Aspherical | 5.7078 | 0.3895 | | | | 0.1006 |
| S5 | Aspherical | 11.3421 | 0.5307 | 1.547 | 56.1 | 69.11 | 11.7354 |
| S6 | Aspherical | 15.9422 | 1.0896 | | | | −34.4843 |
| S7 | Aspherical | −35.4674 | 0.5003 | 1.571 | 37.3 | 49.75 | 0.0000 |
| S8 | Aspherical | −15.8585 | 0.1653 | | | | 0.0000 |
| S9 | Aspherical | −147.1629 | 0.2300 | 1.680 | 20.4 | −25.19 | 0.0000 |
| S10 | Aspherical | 19.3855 | 0.9341 | | | | 0.0000 |
| S11 | Aspherical | 303.7363 | 1.0000 | 1.571 | 37.3 | 34.53 | 0.0000 |
| S12 | Aspherical | −21.0692 | 1.1318 | | | | 0.0000 |
| S13 | Aspherical | 10.5688 | 1.5528 | 1.547 | 56.1 | 9.65 | −0.2356 |
| S14 | Aspherical | 9.9708 | 0.7070 | | | | −30.2121 |
| S15 | Aspherical | −4.9911 | 0.9705 | 1.537 | 55.7 | −5.57 | −1.5536 |
| S16 | Aspherical | 7.9938 | 0.9170 | | | | 0.0000 |
| S17 | Spherical | Infinite | 0.9817 | 1.517 | 64.2 | | |
| S18 | Spherical | Infinite | 0.0300 | | | | |
| S19 | Spherical | Infinite | | | | | |

TABLE 22

| Surface number | A4 | A6 | A8 | A10 | A12 | A14 | A16 | A18 | A20 |
|---|---|---|---|---|---|---|---|---|---|
| S1 | 2.4075E−04 | 1.8692E−04 | −2.0560E−04 | 1.4678E−04 | −6.4292E−05 | 1.6946E−05 | −2.6583E−06 | 2.2781E−07 | −8.2671E−09 |
| S2 | −6.5618E−03 | 9.6077E−03 | −7.0759E−03 | 3.1056E−03 | −8.5351E−04 | 1.4916E−04 | −1.6172E−05 | 9.9814E−07 | −2.7108E−08 |
| S3 | −6.1916E−03 | 9.9910E−03 | −6.9830E−03 | 2.9342E−03 | −7.5060E−04 | 1.1775E−04 | −1.0884E−05 | 5.3035E−07 | −1.0126E−08 |
| S4 | −4.9673E−04 | 2.7996E−03 | −1.5079E−03 | 5.4722E−04 | −1.0917E−04 | 1.4785E−05 | −2.2248E−06 | 3.3013E−07 | −2.2253E−08 |
| S5 | −40385E−03 | 9.1851E−04 | −4.1624E−04 | 2.9246E−04 | −1.3330E−04 | 4.4254E−05 | −9.2397E−06 | 1.0656E−06 | −5.0622E−08 |
| S6 | −1.6607E−03 | −6.0164E−04 | 1.4845E−03 | −1.2614E−03 | 6.5986E−04 | −2.0959E−04 | 4.0029E−05 | −4.2347E−06 | 1.9252E−07 |
| S7 | −7.1912E−03 | −1.4115E−03 | −4.7328E−04 | 5.3150E−04 | −2.5714E−04 | 7.1999E−05 | −1.1819E−05 | 1.0443E−06 | −3.8488E−08 |
| S8 | 2.2816E−03 | −6.5349E−03 | 1.9536E−03 | −3.3124E−04 | 8.9755E−06 | 8.2234E−06 | −1.6522E−06 | 1.2707E−07 | −3.3290E−09 |
| S9 | −7.2240E−03 | −2.8435E−03 | 1.0888E−03 | 3.7782E−05 | −1.0357E−04 | 2.7215E−05 | −3.4092E−06 | 2.1352E−07 | −5.3168E−09 |
| S10 | −1.4530E−02 | 1.2663E−03 | −2.1729E−04 | 2.0694E−04 | −8.2064E−05 | 1.5890E−05 | 1.6735E−06 | 9.1923E−08 | −2.0430E−09 |
| S11 | −5.5300E−03 | 7.0552E−04 | −2.8765E−04 | 4.7015E−05 | −1.4941E−06 | −6.6494E−07 | 1.0480E−07 | −6.1941E−09 | 1.3420E−10 |
| S12 | −6.8285E−03 | 1.4586E−03 | −3.9192E−04 | 6.1114E−05 | −5.2140E−06 | 1.8906E−07 | 4.0510E−09 | −5.3912E−10 | 1.1947E−11 |
| S13 | −6.9294E−03 | 1.3864E−03 | −2.3079E−04 | 2.0025E−05 | −8.6956E−07 | 9.0341E−09 | 7.3942E−10 | −2.9200E−11 | 3.2657E−13 |
| S14 | −6.4690E−03 | 1.8391E−03 | −2.7748E−04 | 1.6875E−05 | −2.5047E−08 | −5.1405E−08 | 2.8090E−09 | −6.3798E−11 | 5.5000E−13 |
| S15 | −3.0235E−03 | 1.0546E−03 | −2.2267E−04 | 2.4571E−05 | −1.5093E−06 | 5.4980E−08 | −1.1898E−09 | 1.4180E−11 | −7.1815E−14 |
| S16 | −2.6459E−03 | −1.7185E−04 | 3.0186E−05 | −1.9133E−06 | 6.7951E−08 | −1.4664E−09 | 1.9033E−11 | −1.3594E−13 | 4.0585E−16 |

Figure 22A:
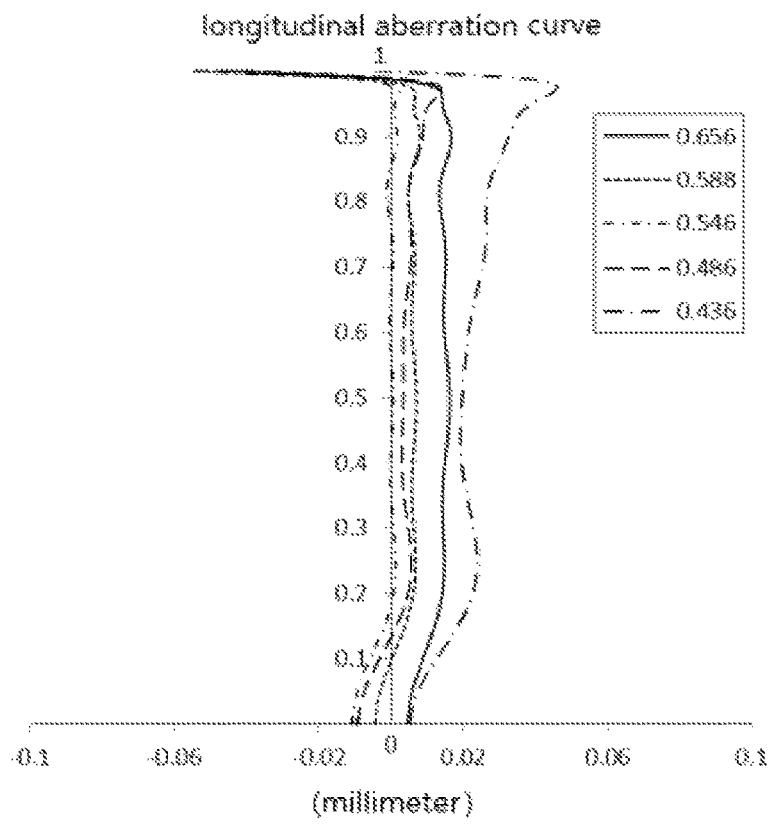
FIG. 22A to FIG. 22D show a longitudinal aberration curve, an astigmatism curve, a distortion curve and a lateral color curve of a camera lens group according to embodiment 11 respectively.
Figure 22B:
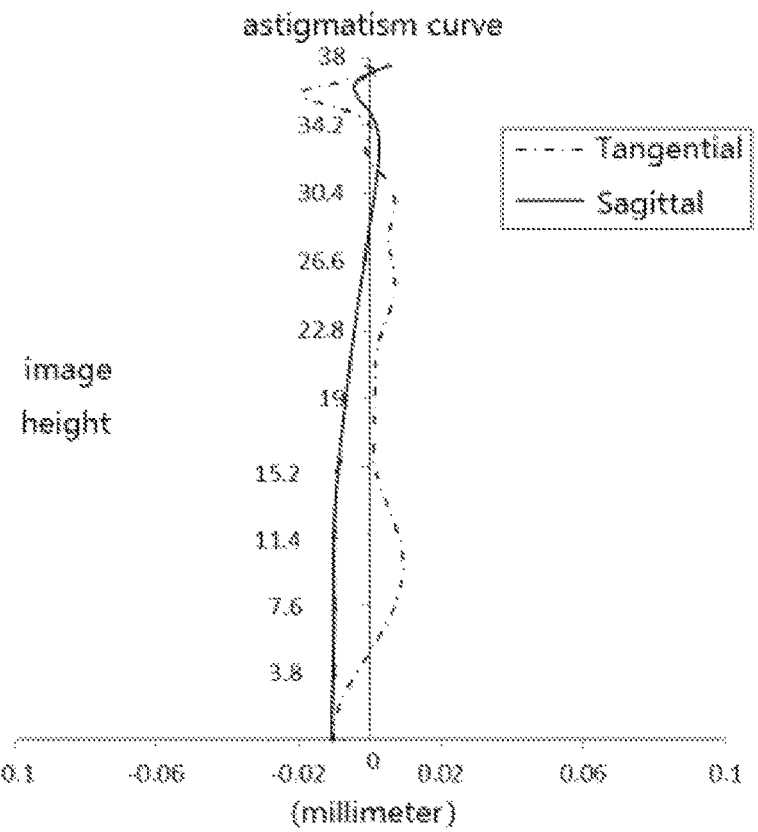
Figure 22C:
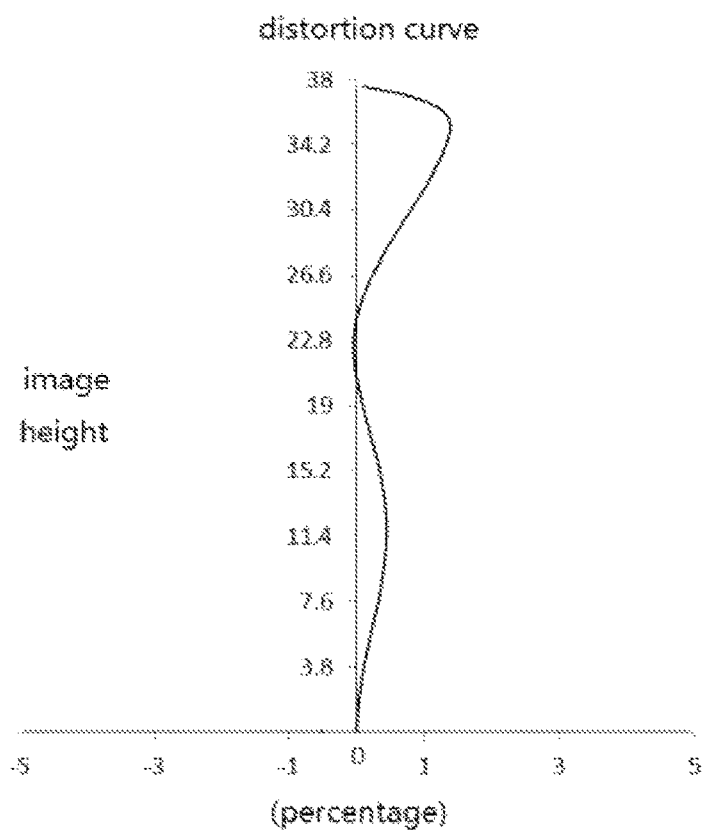
Figure 22D:
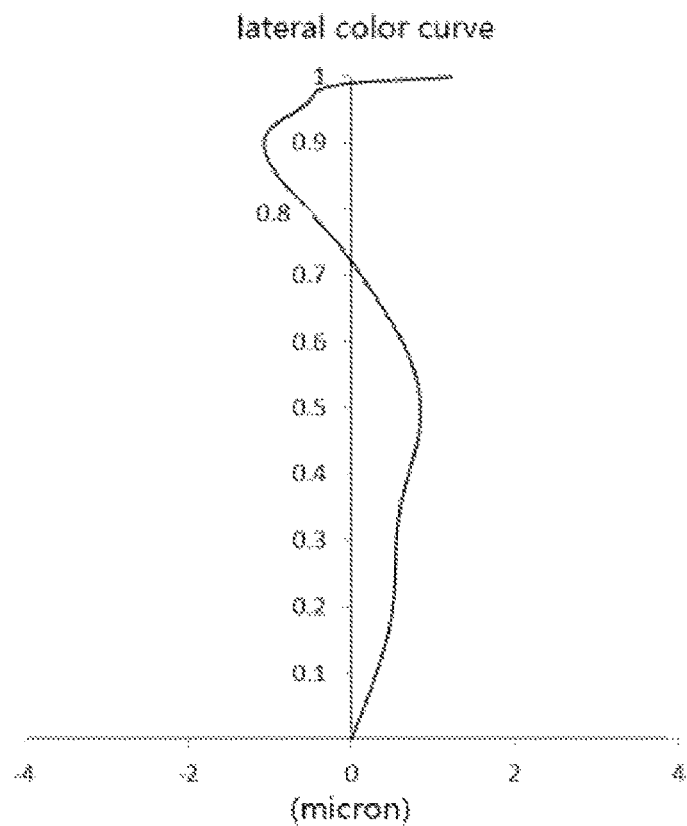

FIG. 22A illustrates a longitudinal aberration curve of the camera lens group according to embodiment 11 to represent deviation of a convergence focal point after light of different wavelengths passes through the lens. FIG. 22B illustrates an astigmatism curve of the camera lens group according to embodiment 11 to represent a meridian image surface curvature and a sagittal image surface curvature. FIG. 22C illustrates a distortion curve of the camera lens group according to embodiment 11 to represent a distortion value under different VOFs. FIG. 22D illustrates a lateral color curve of the camera lens group according to embodiment 11 to represent deviation of different image heights on the imaging surface after the light passes through the lens. According to FIG. 22A to FIG. 22D, it can be seen that high imaging quality of the camera lens group provided in embodiment 11 may be achieved.

Embodiment 12

Figure 23:
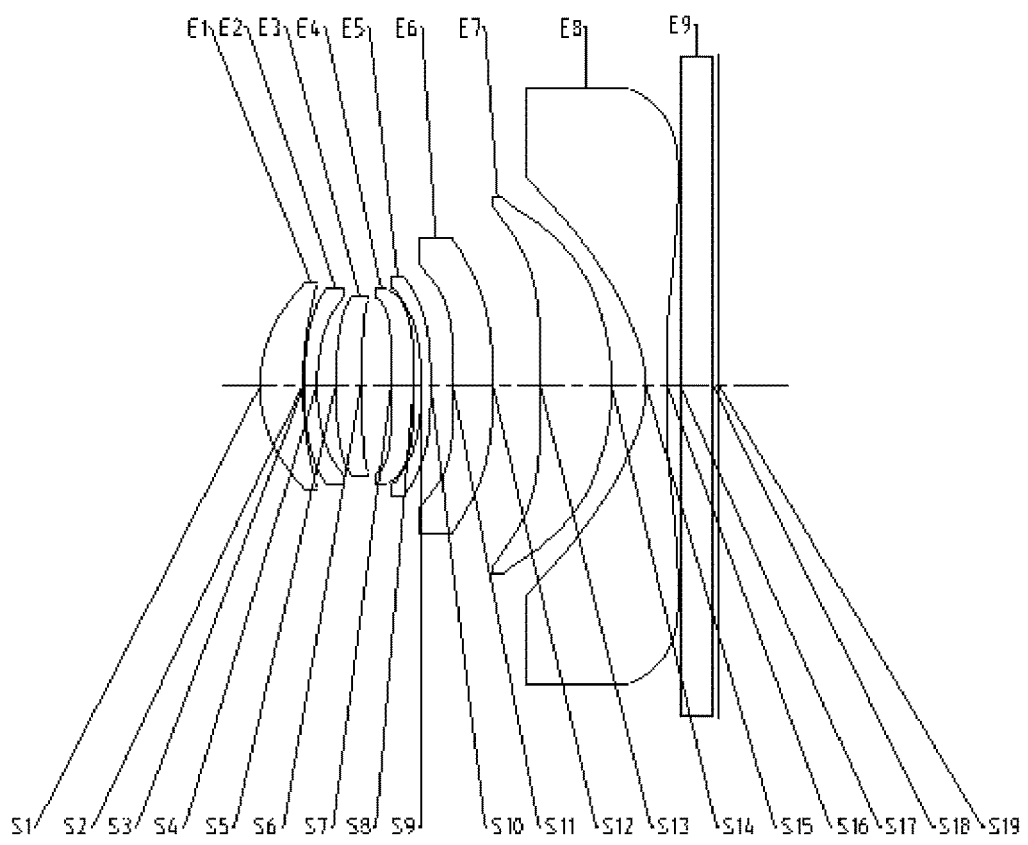
FIG. 23 shows a structure diagram of a camera lens group according to embodiment 12 of the disclosure.

A camera lens group according to embodiment 12 of the disclosure will be described below with reference to FIG. 23 to FIG. 24D. FIG. 23 is a structure diagram of a camera lens group according to embodiment 12 of the disclosure.

As shown in FIG. 23, the camera lens group sequentially includes, from an object side to an image side along an optical axis, a first lens E1, a second lens E2, a third lens E3, a fourth lens E4, a fifth lens E5, a sixth lens E6, a seventh lens E7, an eighth lens E8, an optical filter E9 and an imaging surface S19.

The first lens E1 has positive focal power, an object-side surface S1 thereof is a convex surface, and an image-side surface S2 is a concave surface. The second lens E2 has negative focal power, an object-side surface S3 thereof is a convex surface, and an image-side surface S4 is a concave surface. The third lens E3 has positive focal power, an object-side surface S5 thereof is a convex surface, and an image-side surface S6 is a concave surface. The fourth lens E4 has positive focal power, an object-side surface S7 thereof is a convex surface, and an image-side surface S8 is a convex surface. The fifth lens E5 has negative focal power, an object-side surface S9 thereof is a concave surface, and an image-side surface S10 is a convex surface. The sixth lens E6 has positive focal power, an object-side surface S11 thereof is a concave surface, and an image-side surface S12 is a convex surface. The seventh lens E7 has positive focal power, an object-side surface S13 thereof is a convex surface, and an image-side surface S14 is a convex surface. The eighth lens E8 has negative focal power, an object-side surface S15 thereof is a concave surface, and an Image-side surface S16 is a convex surface. The optical filter E9 has an object-side surface S17 and an image-side surface S18. Light from an object sequentially penetrates through each of the surfaces S1 to S18 and is finally image on the imaging surface S19.

Although not shown, a diaphragm may be arranged between the object side and the first lens E1 to further Improve the imaging quality of a camera lens.

Table 23 is a basic parameter table of the camera lens group of embodiment 12, and units of the curvature radius, the thickness and the focal length therein are all millimeter (mm). Table 24 shows high-order coefficients applied to each aspherical mirror surface in embodiment 12. A surface type of each aspherical surface may be defined by formula (1) given in embodiment 1.

TABLE 23

Embodiment 12: f = 9.50 mm, TTL = 11.50 mm

| Surface number | Surface type | Curvature radius | Thickness | Refractive index | Abbe number | Focal length | Conic coefficient |
|---|---|---|---|---|---|---|---|
| OBJ | Spherical | Infinite | Infinite | | | | |
| STO | Spherical | Infinite | −1.1210 | | | | |
| S1 | Aspherical | 3.3064 | 1.0561 | 1.547 | 56.1 | 9.22 | 0.0325 |
| S2 | Aspherical | 8.5376 | 0.0303 | | | | 0.4103 |
| S3 | Aspherical | 7.0810 | 0.3199 | 1.680 | 20.4 | −24.21 | 0.4510 |
| S4 | Aspherical | 4.8599 | 0.4715 | | | | 0.0140 |
| S5 | Aspherical | 8.1625 | 0.6434 | 1.547 | 56.1 | 32.28 | 11.5596 |
| S6 | Aspherical | 14.7703 | 0.7559 | | | | 76.7978 |
| S7 | Aspherical | 99.5626 | 0.5694 | 1.571 | 37.3 | 32.77 | 0.0000 |
| S8 | Aspherical | −23.0036 | 0.1891 | | | | 0.0000 |
| S9 | Aspherical | −8.5329 | 0.2300 | 1.680 | 20.4 | −21.15 | 0.0000 |
| S10 | Aspherical | −21.2338 | 0.5709 | | | | 0.0000 |
| S11 | Aspherical | −59.3567 | 1.0000 | 1.571 | 37.3 | 29.08 | 0.0000 |
| S12 | Aspherical | −13.0597 | 1.1825 | | | | 0.0000 |
| S13 | Aspherical | 136.0996 | 1.7817 | 1.547 | 56.1 | 13.18 | 1.0000 |
| S14 | Aspherical | −7.5705 | 0.8604 | | | | 0.0000 |
| S15 | Aspherical | −2.9260 | 0.5323 | 1.537 | 55.7 | −6.80 | 1.0028 |
| S16 | Aspherical | −15.6665 | 0.3191 | | | | 0.0000 |
| S17 | Spherical | Infinite | 0.8326 | 1.517 | 64.2 | | |
| S18 | Spherical | Infinite | 0.1549 | | | | |
| S19 | Spherical | Infinite | | | | | |

TABLE 24

| Surface number | A4 | A6 | A8 | A10 | A12 | A14 | A16 | A18 | A20 |
|---|---|---|---|---|---|---|---|---|---|
| S1 | 2.0461E−05 | 5.1315E−04 | −6.3765E−04 | 4.1664E−04 | −1.6779E−04 | 4.1095E−05 | −6.0150E−06 | 4.7864E−07 | −1.6040E−08 |
| S2 | −1.0118E−03 | −4.4209E−04 | 1.3186E−03 | −9.9907E−04 | 4.2446E−04 | −1.0973E−04 | 1.6770E−05 | −1.3825E−06 | 4.7109E−08 |
| S3 | −7.7691E−04 | 3.8393E−04 | 1.4262E−03 | −1.1872E−03 | 5.3970E−04 | −1.4700E−04 | 2.3298E−05 | −1.9542E−06 | 6.6197E−08 |

TABLE 24-continued

| Surface number | A4 | A6 | A8 | A10 | A12 | A14 | A16 | A18 | A20 |
|---|---|---|---|---|---|---|---|---|---|
| S4  | 1.3241E−03  | 1.1006E−03  | 6.5572E−04  | −6.2932E−04 | 3.3052E−04  | −9.6574E−05 | 1.4954E−05  | −1.0273E−06 | 1.1889E−08  |
| S5  | −5.3150E−03 | 2.2232E−03  | −3.0796E−03 | 2.9926E−03  | −1.7033E−03 | 5.9461E−04  | −1.2450E−04 | 1.4347E−05  | −7.0070E−07 |
| S6  | 3.6564E−04  | −2.3912E−03 | 3.9087E−03  | −3.6832E−03 | 2.1936E−03  | −8.0673E−04 | 1.7919E−04  | −2.2059E−05 | 1.1611E−06  |
| S7  | −6.9753E−03 | −1.1115E−03 | −1.7415E−03 | 2.3510E−03  | −1.6306E−03 | 6.5138E−04  | −1.5239E−04 | 1.9329E−05  | −1.0388E−06 |
| S8  | 4.5465E−03  | −1.0519E−02 | 3.9986E−03  | −6.6097E−04 | −4.6288E−04 | 1.7269E−04  | 4.0312E−05  | 4.4719E−06  | −1.9988E−07 |
| S9  | 6.2824E−03  | −1.9876E−02 | 1.0747E−02  | −3.3679E−03 | 5.5611E−04  | −1.2913E−05 | −1.1824E−05 | 1.9534E−06  | −1.0413E−07 |
| S10 | −1.7660E−03 | −1.4277E−02 | 9.1151E−03  | −3.7074E−03 | 1.0821E−03  | −2.2079E−04 | 2.9132E−05  | −2.1908E−06 | 7.0507E−08  |
| S11 | −5.4425E−03 | −1.1269E−03 | −1.3145E−04 | 6.7708E−05  | −1.2352E−06 | 2.8102E−06  | 4.9802E−07  | −3.2179E−08 | 7.0879E−10  |
| S12 | −3.8750E−03 | 1.0741E−03  | −6.3836E−04 | 1.4983E−04  | −1.8508E−05 | 1.2762E−06  | 4.3692E−08  | 3.6922E−10  | 9.7597E−12  |
| S13 | −9.0164E−03 | 2.2350E−03  | −3.8893E−04 | 1.8812E−05  | 2.8325E−06  | −4.7882E−07 | 2.9909E−08  | −8.8582E−11 | 1.0343E−11  |
| S14 | −1.6946E−02 | 5.1286E−03  | −6.6346E−04 | 9.4827E−06  | 6.5791E−06  | −7.7392E−07 | 4.0303E−08  | −1.0427E−09 | 1.0943E−11  |
| S15 | −6.6389E−03 | 8.2684E−03  | −2.2092E−03 | 3.0244E−04  | −2.4384E−05 | 1.2033E−06  | −3.5749E−08 | −5.8713E−10 | −4.0925E−12 |
| S16 | 1.8959E−02  | −2.9819E−03 | 2.5693E−04  | −1.3598E−05 | 4.5909E−07  | −9.9118E−09 | 1.3220E−10  | −9.9014E−13 | 3.1761E−15  |

Figure 24A:
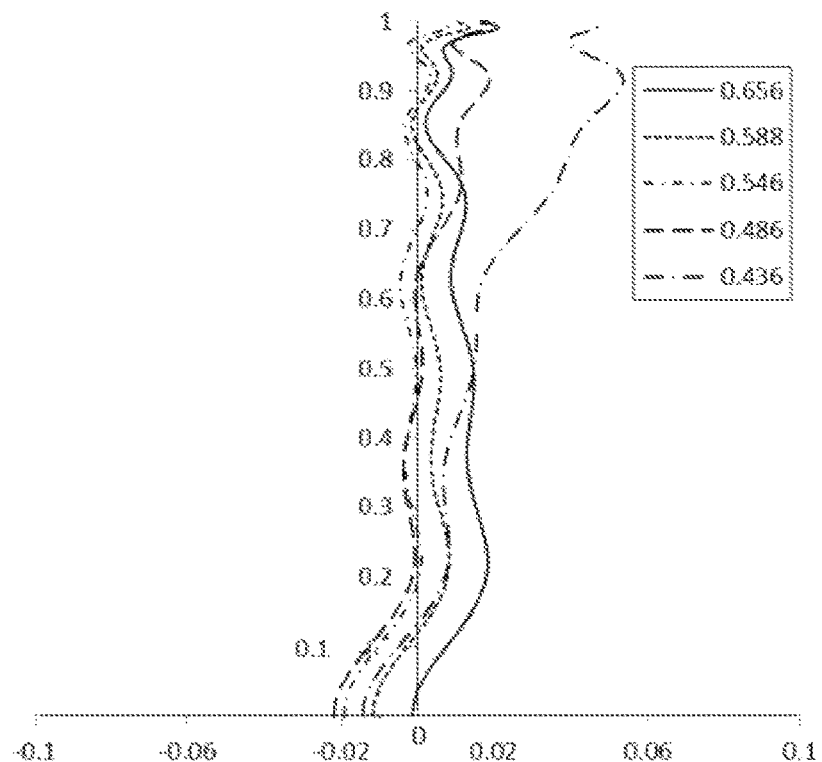
FIG. 24A to FIG. 24D show a longitudinal aberration curve, an astigmatism curve, a distortion curve and a lateral color curve of a camera lens group according to embodiment 12 respectively.
Figure 24B:
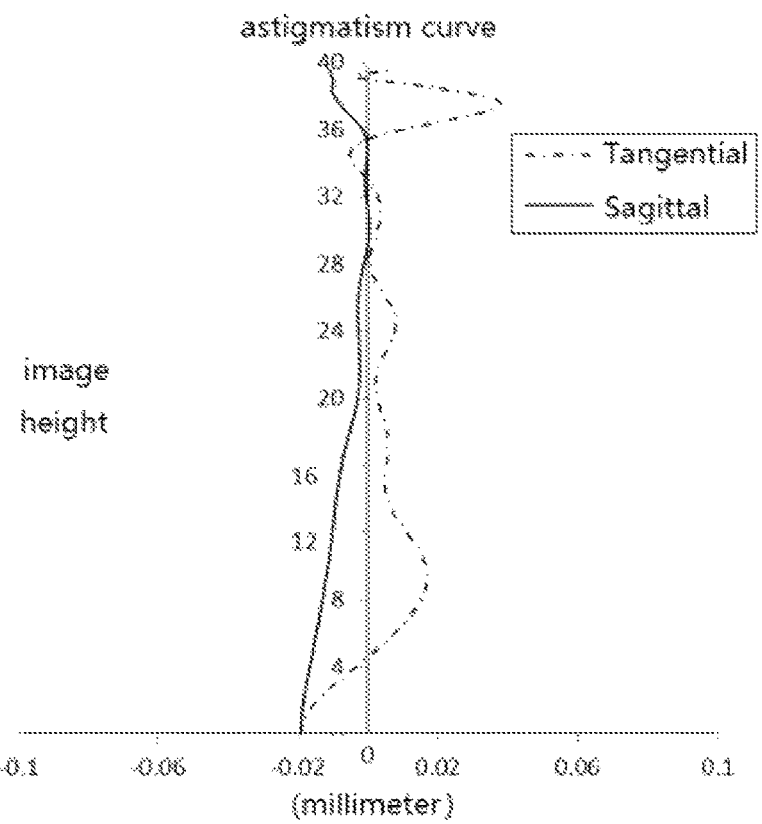
Figure 24C:
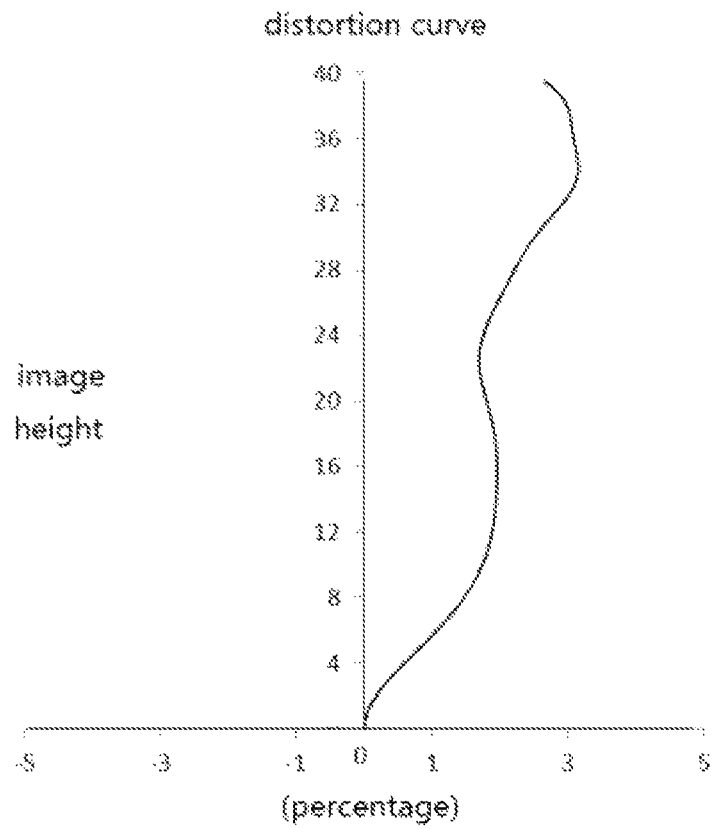
Figure 24D:
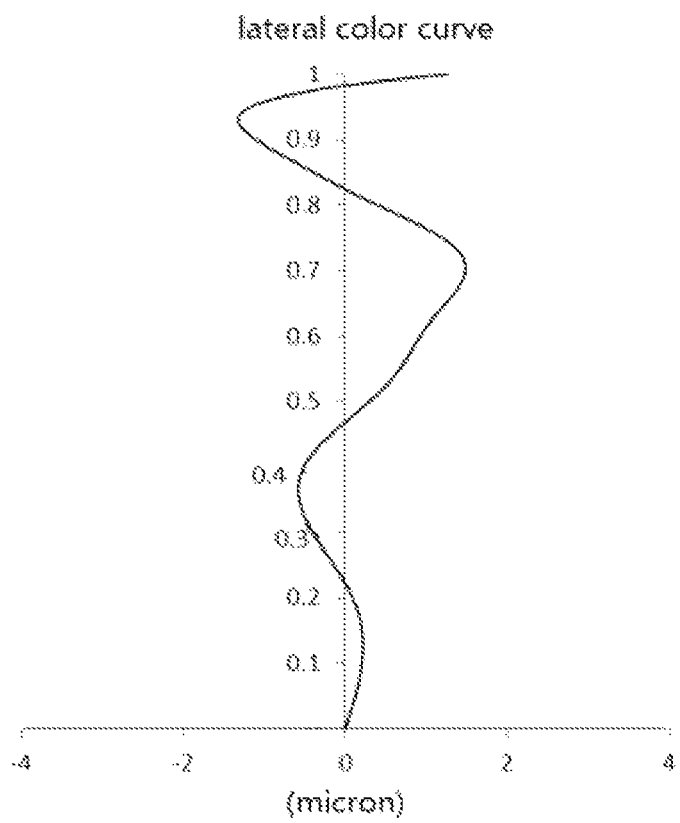

FIG. 24A illustrates a longitudinal aberration curve of the camera lens group according to embodiment 12 to represent deviation of a convergence focal point after light of different wavelengths passes through the lens. FIG. 24B illustrates an astigmatism curve of the camera lens group according to embodiment 12 to represent a meridian image surface curvature and a sagittal image surface curvature. FIG. 24C illustrates a distortion curve of the camera lens group according to embodiment 12 to represent a distortion value under different VOFs. FIG. 24D illustrates a lateral color curve of the camera lens group according to embodiment 12 to represent deviation of different image heights on the imaging surface after the light passes through the lens. According to FIG. 24A to FIG. 24D, it can be seen that high imaging quality of the camera lens group provided in embodiment 12 may be achieved.

From the above, embodiment 1 to embodiment 12 meet a relationship shown in Table 25 respectively.

TABLE 25

| Conditional expression/embodiment | 1 | 2 | 3 | 4 | 5 | 6 | 7 | 8 | 9 | 10 | 11 | 12 |
|---|---|---|---|---|---|---|---|---|---|---|---|---|
| TTL/ImgH | 1.11 | 1.14 | 1.09 | 1.11 | 1.17 | 1.12 | 1.15 | 1.22 | 1.07 | 1.09 | 1.56 | 1.42 |
| f × fan(Semi-FOV)(mm) | 7.53 | 7.24 | 7.65 | 7.48 | 7.25 | 7.31 | 7.27 | 7.15 | 7.52 | 7.48 | 8.01 | 7.85 |
| f/f1 | 1.00 | 1.04 | 0.97 | 1.00 | 1.02 | 0.99 | 1.04 | 1.06 | 0.90 | 0.88 | 1.12 | 1.03 |
| f/f7 | 0.47 | 0.45 | 0.48 | 0.46 | 0.57 | 0.46 | 0.68 | 0.59 | 0.45 | 0.46 | 1.08 | 0.72 |
| t2/f5 | 0.75 | 1.00 | 0.88 | 0.73 | 0.89 | 0.74 | 0.57 | 0.71 | 1.10 | 1.10 | 1.04 | 1.14 |
| f/f3 + f/f4 | 0.40 | 0.50 | 0.49 | 0.39 | 0.45 | 0.43 | 0.39 | 10 42 | 0.66 | 0.64 | 0.36 | 0.58 |
| f6/f8 | −3.66 | −3.11 | −4.98 | −3.66 | −5.70 | −4.14 | −3.58 | −7.51 | −3.51 | −3.59 | −6.20 | −4.28 |
| TTL/EPD | 2.21 | 2.28 | 2.28 | 2.22 | 2.31 | 2.24 | 2.29 | 2.33 | 2.24 | 2.30 | 2.38 | 2.26 |
| f/(T67 + T78) | 3.93 | 3.70 | 3.37 | 3.91 | 4.06 | 3.66 | 4.86 | 4.25 | 2.91 | 2.94 | 5.66 | 4.65 |
| f/T56 | 12.43 | 13.04 | 13.60 | 12.32 | 11.42 | 12.90 | 11.19 | 12.37 | 14.27 | 14.84 | 11.14 | 16.64 |
| f/(CT3 + CT4 + CT5) | 6.21 | 5.51 | 6.28 | 6.19 | 6.15 | 6.08 | 6.07 | 5.74 | 5.41 | 5.37 | 8.25 | 6.59 |
| ET7min/CT7 | 0.74 | 0.90 | 0.88 | 0.76 | 0.89 | 0.51 | 0.78 | 0.88 | 0.86 | 0.91 | 0.26 | 0.27 |
| R5/R6 | 0.63 | 0.61 | 0.59 | 0.64 | 1.04 | 0.61 | 0.56 | 0.93 | 0.48 | 0.48 | 0.71 | 0.55 |
| (R3 − R4)/(R34 + R4) | 0.21 | 0.23 | 0.19 | 0.21 | 0.22 | 0.21 | 0.23 | 0.21 | 0.19 | 0.18 | 0.20 | 0.19 |
| f/|R12| + f/R13 | 1.76 | 1.54 | 1.37 | 1.74 | 1.65 | 1.63 | 1.95 | 1.59 | 0.81 | 0.81 | 1.48 | 0.80 |
| f/R15 | −2.06 | −2.10 | −1.99 | −2.06 | −1.83 | −1.96 | −2.08 | −1.89 | −2.35 | −2.81 | −2.08 | −3.25 |

The disclosure also provides an imaging device, of which an electronic photosensitive element may be a Charge Coupled Device (CCD) or a Complementary Metal Oxide Semiconductor (CMOS). The imaging device may be an independent imaging device such as a digital camera, and may also be an imaging module integrated into a mobile electronic device such as a mobile phone. The imaging device is provided with the abovementioned camera lens group.

The above description is only description about the preferred embodiments of the disclosure and adopted technical principles. Those skilled in the art should know that the scope of disclosure involved in the disclosure is not limited to the technical solutions formed by specifically combining the technical characteristics and should also cover other technical solutions formed by freely combining the technical characteristics or equivalent characteristics thereof without departing from the inventive concept, for example, technical solutions formed by mutually replacing the characteristics and (but not limited to) the technical characteristics with similar functions disclosed in the disclosure.

What is claimed is:

1. A camera lens group, sequentially comprising, from an object side to an image side along an optical axis, a first lens, second lens, third lens, fourth lens, fifth lens, sixth lens, seventh lens and eighth lens with focal power, wherein
   the first lens, the fourth lens, the sixth lens and the seventh lens have positive focal power;
   the eighth lens has negative focal power;
   a total effective focal length f of the camera lens group and a maximum Semi-Field of View (Semi-FOV) of the camera lens group meet f×tan(Semi-FOV)>6.0 mm; and
   the total effective focal length f of the camera lens group and an effective focal length f7 of the seventh lens meet 0.4<f/f7<1.2;
   an effective focal length f2 of the second lens and an effective focal length f5 of the fifth lens meet 0.5<f2/f5<1.2.

2. The camera lens group as claimed in claim 1, wherein ImgH is a half of a diagonal length of an effective pixel region on an imaging surface of the camera lens group, TTL is a Total Track Length from an object-side surface of the first lens to the imaging surface of the camera lens group on the optical axis, and ImgH and TTL meet TTL/ImgH<1.6.

3. The camera lens group as claimed in claim 2, wherein ImgH is the half of the diagonal length of the effective pixel region on the imaging surface of the camera lens group, TTL is the Total Track Length from the object-side surface of the first lens to the imaging surface of the camera lens group on the optical axis, and ImgH and TTL meet TTL/ImgH<1.4.

4. The camera lens group as claimed in claim 1, wherein the total effective focal length f of the camera lens group and an effective focal length f1 of the first lens meet 0.8~f/f1<1.2.

5. The camera lens group as claimed in claim 1, wherein an effective focal length f3 of the third lens and an effective focal length f4 of the fourth lens meet 0.3<f/f3+f/f4<0.7.

6. The camera lens group as claimed in claim 1, wherein an effective focal length f6 of the sixth lens and an effective focal length f8 of the eighth lens meet −0.8<f6/f8<−3.0.

7. The camera lens group as claimed in claim 1, wherein the total effective focal length f of the camera lens group, an air space T67 of the sixth lens and the seventh lens on the optical axis and an air space T78 of the seventh lens and the eighth lens on the optical axis meet 2.5<f/(T67+T78)<6.

8. The camera lens group as claimed in claim 1, wherein the total effective focal length f of the camera lens group and an air space T56 of the fifth lens and the sixth lens on the optical axis may meet 11<f/T56<18.

9. The camera lens group as claimed in claim 1, wherein a minimum thickness ET7 min of the seventh lens in a direction parallel to the optical axis and a center thickness CT7 of the seventh lens on the optical axis meet 0.5<ET7 min/CT7<1.0.

10. The camera lens group as claimed in claim 1, wherein a curvature radius R5 of an object-side surface of the third lens and a curvature radius R6 of an image-side surface of the third lens meet 0.45<R5/R6<1.2.

11. The camera lens group as claimed in claim 1, wherein a curvature radius R3 of an object-side surface of the second lens and a curvature radius R4 of an image-side surface of the second lens meet 0<(R3−R4)/(R3+R4)<0.25.

12. The camera lens group as claimed in claim 1, wherein the total effective focal length f of the camera lens group, a curvature radius R12 of the image-side surface of the sixth lens and a curvature radius R13 of the object-side surface of the seventh lens meet 0.5<f/|R12|+f/R13<2.0.

13. The camera lens group as claimed in claim 1, wherein the total effective focal length f of the camera lens group and a curvature radius R15 of an object-side surface of the eighth lens meet −3.5<f/R15<−1.5.

14. The camera lens group as claimed in claim 1, wherein TTL is a Total Track Length from an object-side surface of the first lens to the imaging surface of the camera lens group on the optical axis, TTL and an Entrance Pupil Diameter (EPD) of the camera lens group meet 2.1<TTL/EPD<2.5.

15. The camera lens group as claimed in claim 1, wherein the total effective focal length f of the camera lens group, a center thickness CT3 of the third lens on the optical axis, a center thickness CT4 of the fourth lens on the optical axis and a center thickness CT5 of the fifth lens on the optical axis meet 5<f/(CT3+CT4+CT5)<9.

16. A camera lens group, sequentially comprising, from an object side to an image side along an optical axis, a first lens, second lens, third lens, fourth lens, fifth lens, sixth lens, seventh lens and eighth lens with focal power, wherein
the first lens, the fourth lens, the sixth lens and the seventh lens have positive focal power;
the eighth lens has negative focal power,
both an image-side surface of the sixth lens and an object-side surface of the seventh lens are convex surfaces; and
a total effective focal length f of the camera lens group and a maximum Semi-Field of View (Semi-FOV) of the camera lens group meet f×tan(Semi-FOV)>6.0 mm;
an effective focal length f2 of the second lens and an effective focal length f5 of the fifth lens meet 0.5<f2/f5<1.2.

17. The camera lens group as claimed in claim 16, wherein ImgH is a half of a diagonal length of an effective pixel region on an imaging surface of the camera lens group, TTL is a Total Track Length from an object-side surface of the first lens to the imaging surface of the camera lens group on the optical axis, and ImgH and TTL meet TTL/ImgH<1.6.

18. The camera lens group as claimed in claim 16, wherein an effective focal length f6 of the sixth lens and an effective focal length f8 of the eighth lens meet −8.0<f6/f8<−3.0.

19. The camera lens group as claimed in claim 16, wherein TTL is a Total Track Length from an object-side surface of the first lens to the imaging surface of the camera lens group on the optical axis, TTL and an Entrance Pupil Distance (EPD) of the camera lens group meet 2.1<TTL/EPD<2.5.

* * * * *